(12) United States Patent
Wacker et al.

(10) Patent No.: US 6,851,621 B1
(45) Date of Patent: Feb. 8, 2005

(54) PDA DIAGNOSIS OF THERMOSTATS

(75) Inventors: Paul C. Wacker, Plymouth, MN (US); Richard A. Wruck, Mount Prospect, IL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/643,430

(22) Filed: Aug. 18, 2003

(51) Int. Cl.[7] ............................................. G05D 23/00
(52) U.S. Cl. ............................ 236/51; 236/94; 62/127; 165/11.1; 340/585; 700/276
(58) Field of Search ................ 236/51, 94; 62/125, 62/127, 126, 129; 165/11.1; 340/585; 702/99, 116, 130, 183, 185; 700/276

(56) References Cited

U.S. PATENT DOCUMENTS

| | | | |
|---|---|---|---|
| 4,146,085 A | * | 3/1979 | Wills .......................... 165/11.1 |
| 4,332,352 A | | 6/1982 | Jaeger |
| 4,337,893 A | | 7/1982 | Flanders et al. |
| 4,373,664 A | | 2/1983 | Barker et al. |
| 4,379,483 A | | 4/1983 | Farley |
| 4,556,169 A | | 12/1985 | Zervos |
| 4,628,201 A | | 12/1986 | Schmitt |
| 4,646,964 A | | 3/1987 | Parker et al. |
| 4,685,615 A | * | 8/1987 | Hart ............................. 236/94 |
| 5,172,565 A | | 12/1992 | Wruck et al. |
| 5,404,934 A | | 4/1995 | Carlson et al. |
| 5,481,481 A | * | 1/1996 | Frey et al. ..................... 702/82 |
| 5,526,871 A | * | 6/1996 | Musser et al. ............. 165/11.1 |
| 5,732,691 A | | 3/1998 | Maiello et al. |
| 5,915,473 A | | 6/1999 | Ganesh et al. |
| 6,104,963 A | | 8/2000 | Cebasek et al. |
| 6,119,125 A | | 9/2000 | Gloudeman et al. |
| 6,141,595 A | | 10/2000 | Gloudeman et al. |
| 6,149,065 A | | 11/2000 | White et al. |
| 6,154,681 A | | 11/2000 | Drees et al. |
| 6,167,316 A | | 12/2000 | Gloudeman et al. |
| 6,324,854 B1 | * | 12/2001 | Jayanth ........................ 62/127 |
| 6,453,687 B2 | | 9/2002 | Sharood et al. |
| 6,518,953 B1 | | 2/2003 | Armstrong |
| 6,546,419 B1 | | 4/2003 | Humpleman et al. |
| 6,556,899 B1 | | 4/2003 | Pachet et al. |
| 6,615,594 B2 | * | 9/2003 | Jayanth et al. ............... 62/126 |
| 6,658,373 B2 | * | 12/2003 | Rossi et al. ................. 702/185 |
| 2002/0011923 A1 | | 1/2002 | Cunningham et al. |
| 2002/0022991 A1 | | 2/2002 | Sharood et al. |
| 2002/0138184 A1 | | 9/2002 | Kipersztok et al. |
| 2002/0173929 A1 | * | 11/2002 | Seigel .......................... 702/130 |
| 2003/0014179 A1 | | 1/2003 | Szukala et al. |
| 2003/0033156 A1 | | 2/2003 | McCall |
| 2003/0033230 A1 | | 2/2003 | McCall |
| 2003/0060933 A1 | * | 3/2003 | Sulfstede ..................... 700/276 |
| 2003/0074489 A1 | | 4/2003 | Steger et al. |
| 2003/0115890 A1 | * | 6/2003 | Jayanth et al. ............... 62/126 |

OTHER PUBLICATIONS http://www.tcsbasys.com/products/superstats.asp, TCS/Basys Controls: Where Buildings Connect With Business, 2 pages, printed Aug. 26, 2003.

http://www.tcsbasys.com/products/sz1009.asp, TCS/Basys Controls: Where Buildings Connect With Business, 1 page, printed Aug. 26, 2003.

(List continued on next page.)

*Primary Examiner*—Marc Norman

(57) ABSTRACT

A system PDA-based on line diagnostics for automatically discovering a thermostat configuration, turning off normal controller delays, temporary overriding sensor inputs and set points, and verifying proper output action including the monitoring the discharge air temperature for the resulting temperature behavior based on the equipment stages activated. The diagnosis may include the testing of sensors, set points, the fan, cooling equipment, heating equipment and the wiring connecting the controls with the fan, and the cooling and heating equipment. Problems discovered may be reported, automatically recorded and the original operating parameters may be restored.

20 Claims, 33 Drawing Sheets

OTHER PUBLICATIONS http://www.tcsbasys.com/products/sz1022.asp, TCS/Basys Controls: Where Buildings Connect With Business, 2 pages, printed Aug. 26, 2003.

http://www.tcsbasys.com/products/sz1024.asp, TCS/Basys Controls: Where Buildings Connect With Business, 2 pages, printed Aug. 26, 2003.

http://www.tcsbasys.com/products/sz1030series.asp, TCS/Basys Controls: Where Buildings Connect With Business, 2 pages, printed Aug. 26, 2003.

http://www.tcsbasys.com/products/sz1031.asp, TCS/Basys Controls: Where Buildings Connect With Business, 2 pages, printed Aug. 26, 2003.

http://www.tcsbasys.com/products/sz1033.asp, TCS/Basys Controls: Where Buildings Connect With Business, 2 pages, printed Aug. 26, 2003.

http://www.tcsbasys.com/products/sz1035.asp, TCS/Basys Controls: Where Buildings Connect With Business, 2 pages, printed Aug. 26, 2003.

http://www.tcsbasys.com/products/sz1017a.asp, TCS/Basys Controls: Where Buildings Connect With Business, 1 page, printed Aug. 26, 2003.

http://www.tcsbasys.com/products/sz1041.asp, TCS/Basys Controls: Where Buildings Connect With Business, 1 page, printed Aug. 26, 2003.

http://www.tcsbasys.com/products/sz1050series.asp, TCS/Basys Controls: Where Buildings Connect With Business, 2 pages, printed Aug. 26, 2003.

http://www.tcsbasys.com/products/sz1051.asp, TCS/Basys Controls: Where Buildings Connect With Business, 2 pages, printed Aug. 26, 2003.

http://www.tcsbasys.com/products/sz1053.asp, TCS/Basys Controls: Where Buildings Connect With Business, 2 pages, printed Aug. 26, 2003.

http://www.tcsbasys.com/products/sz1020nseries.asp, TCS/Basys Controls: Where Buildings Connect With Business, 2 pages, printed Aug. 26, 2003.

http://www.tcsbasys.com/products/sz1017n.asp, TCS/Basys Controls: Where Buildings Connect With Business, 1 page, printed Aug. 26, 2003.

* cited by examiner

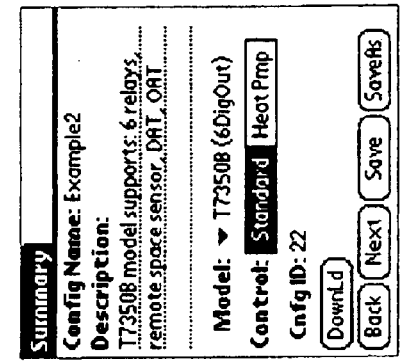
Figure 3A
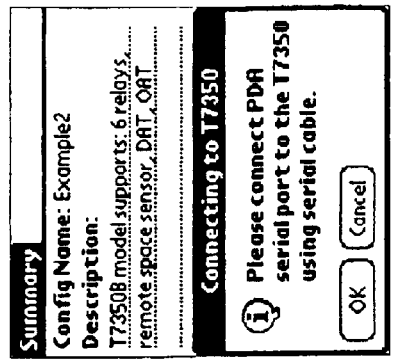
Figure 3B
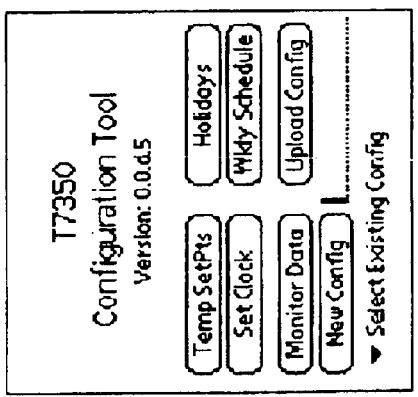
Figure 4A
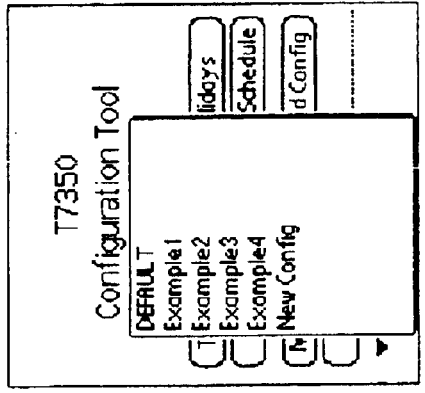
Figure 4B
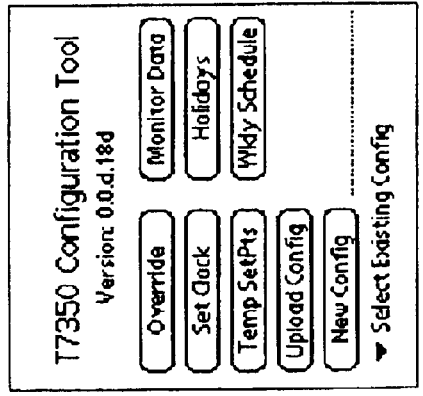
Figure 4C
Figure 4D

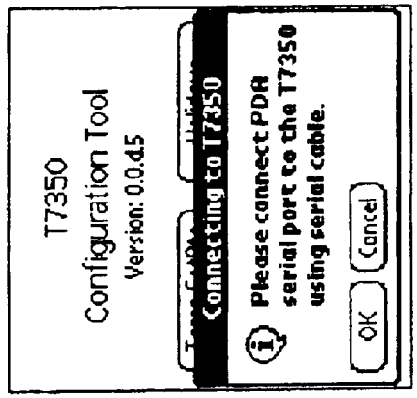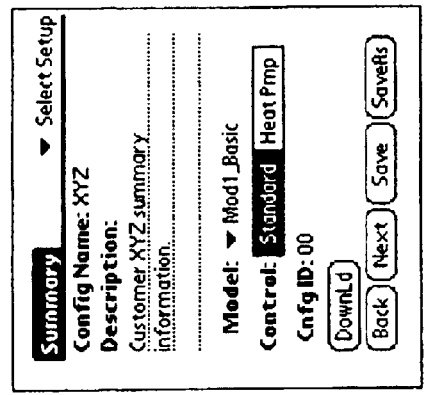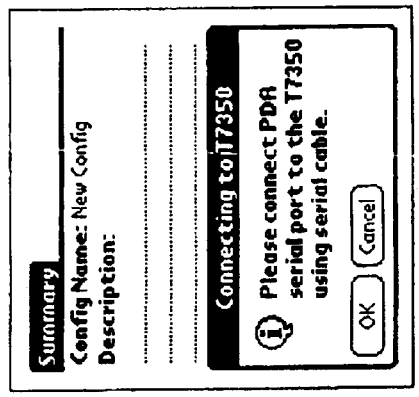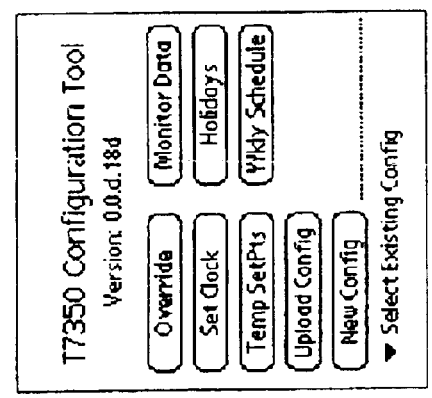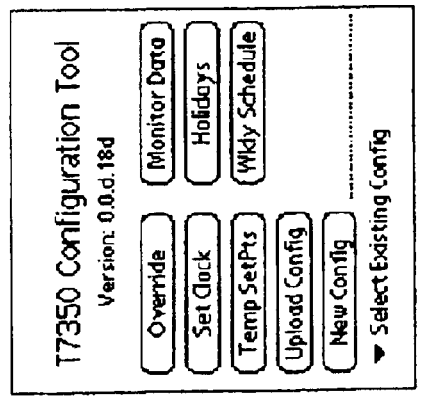

Heating Equipment
ManualMode: OFF
Fan Status: OFF     Valid
Htg Stage1 – W1: OFF    ☐
[Back] [Next] [Update] [Test]

Figure 32B

Heating Equipment
ManualMode: OFF
Fan Status: OFF     Valid
Testing Heating Operation
Fan Status: OFF
Please confirm Fan air flow is required for stage 1 heating.
[Yes] [No]

Figure 32C

Heating Equipment
ManualMode: OFF
Fan Status: OFF     Valid
Testing Heating Stages
Htg Stage 1: OFF
Please confirm it is safe to activate Heating Stage contact.
[Yes] [No]

Figure 32D

Heating Equipment
ManualMode: OFF
Testing Heating Stages
Htg Stage 1: ON
Please confirm Heating Stage 1 operation. For example, room baseboard heat is activated.
[Pass] [Fail]

Figure 32E

Heating Equipment
ManualMode: OFF
Fan Status: OFF     Valid
Htg Stage1 – W1: OFF    ☑
[Back] [Next] [Update] [Test]

PDA DIAGNOSIS OF THERMOSTATS

BACKGROUND

The present invention pertains to thermostats and particularly to the control of air management systems. More particularly, it pertains to the testing and diagnosis of programmable thermostat operation in conjunction with the air management systems.

Commissioning, testing and diagnosis of thermostat systems may be time consuming and confusing. The thermostat configuration must first be understood and then the commissioning process may be run through valid operational modes with inputs and set points temporarily manipulated while waiting for the delays built into the controller to verify operation. The setting and adjusting of air management system thermostats, especially programming thermostats, to control air conditioning, heating, humidity, volume of moved air, and the like, may have settings and conditions that determine which equipment is turned on or off, and for when and what duration. Many commercial and residential places may have complex and confusing controls for air management systems which have features such as programmable thermostats. Some proprietors may obtain a programmable control system for controlling heating and cooling in their buildings. However, they may have frustrations with the adjusting and operating those kinds of systems and often stop trying to take advantage of certain control features of the systems. An installer may initially set a system up and get it operating satisfactorily; however, the adjusting and setting the system may not be easy for the new recipient or owner of the system because of the apparent complexity, user unfriendliness, and the lack of convenient and sufficient time to learn, set and adjust various parameters of the system for controlling, for instance, heating, ventilation and air conditioning (HVAC).

SUMMARY

The present invention minimizes the issues of complexities, user unfriendliness, and the amount of time and inconvenience involved in commissioning, testing and diagnosing a thermostat system. A personal digital assistant (PDA) may be used significantly easing such activities. PDA-based on line diagnostics may automatically discover the thermostat configuration, turn off normal controller delays, temporary override sensor inputs and set points, and verify proper output action including the monitoring the discharge air temperature for the resulting temperature behavior based on the equipment stages activated. Problems discovered are reported, automatically recorded and the original operating parameters can be restored. This means that less expertise may be required the technicians sent to install and trouble shoot thermostat installations.

The diagnostic application may minimize the issues of complexities, user unfriendliness, and the amount of time and convenience involved in setting up, adjusting and controlling an air management system, such as an air handling and conditioning system. Additionally, it is possible for one at a convenient time at any place to set and adjust a thermostat, controller or computer having numerous parameters and options that may be selected for a desired operation of the air management system. One does not need to be at the thermostat, controller or computer of the air management system to configure, set or adjust the parameters of it. The parameters may include, but not be limited to, temperatures, humidity, sensor selection, volume of air movement, fan or air mover behavior such as continuous or intermittent and speed, the percentage of added fresh air, stages of cooling and heating at various zones, control of heat pumps, heaters and air conditioners, modes of occupied, unoccupied or standby of respective spaces in a building, for day and night, between specific times, at certain days, for certain buildings at specific locations. The system may enable one to easily and conveniently achieve these tasks with an interfacing of a PDA (viz., a personal digital assistant) to the control system. These tasks may be accomplished on a PDA in an armchair remote from the facility ith the air management system.

A program with configuration information may be uploaded to the PDA from a controller of an air handling and conditioning system, such as the HVAC. Such controller may be similar to a programmable thermostat having adjustment and settings for controlling the parameters of the system. All of the items that need to be done for configuring, setting, adjusting and controlling a system via the thermostat, controller or computer may be done on a PDA at any time at a location as desired, possibly remote from the building having the system. Whether at the office, home or other place, one may configure, set and adjust, among other things, with the PDA, parameters and actions of a controller relative to various air management systems at different facilities. Programmed configurations, settings, adjustments and the like may be done with the PDA. Then one may take the PDA and go to the various thermostats, controllers, computers or other air management system control devices and upload the programs specific to the respective systems. These may be placed in memory. One interface connection for the uploading and downloading between the PDA and the thermostat, controller or computer of the air management system may be an infrared (1R) connection. One may obtain a PDA that is readily available in stores, such as a Palm™, or the like, and take it to a thermostat, controller, computer or control module of the air management system and upload a program, including the configuration and the settings the system. Then one may deal with various configurations, settings, adjustments and related activities as desired relative to the parameters of the air management system and then download any changes to the respective thermostat, controller, computer or control module of the system.

The interfacing between the PDA or similar commercially available device and the controller or thermostat may also be done via radio frequency communications (such as Bluetooth or Wi-Fi), electrical lines such as the telephone, or optical-fiber systems. The internet, Ethernet, or intranet in its various aspects may be used for interfacing between the PDA and the controller or thermostat. Other forms of interfacing between the PDA and the system may be implemented.

A technical person, installer, representative or technician, trained for configuring, setting and adjusting control mechanisms of air management system thermostats, may go to various buildings such as stores, factories or offices and do control changes for the air management systems of those places. The control mechanism of the air management system of each place may have its own specific configuration and settings which may be different from the others. The technician may go from place to place and download specific configurations and settings with the PDA very quickly and efficiently to the air management system thermostats at these places.

Even though there are many ways that programmable thermostats, controllers, control mechanisms, computers, control modules or their equivalents (hereinafter each of these may be referred to as a "thermostat") of air management systems may be communicated with, relative to the setting and configuration inputs, the PDA using the infrared interface is inexpensive and easily adaptable. Many individuals have a PDA of one kind or another which may have an infrared or direct connection port. No modification is of these devices needed to use them with the present system. One merely may go to the respective thermostat of the PDA and upload a program that has the appropriate protocol, configuration and setting information of the system.

Then one may enter the desired settings, adjustments and schedule information relative to the control of the air management system. The information is presented on the PDA in a clear and step by step instructive manner. And as indicated above, the PDA may contain numerous and differing configurations and settings applicable to specific systems at different places. Anyone with a PDA or the like may participate in this program. However, there may be security measures requiring codes or other permission granting procedures so that the integrity of the control of air management systems may be maintained.

An installer's configuring of high end programmable commercial thermostats has become very complex due to all of the features that can be implemented by low cost microprocessors. There is a trade-off between the ease of use and the complexity of the user interface. Configuring might be done only once by the installer and then usually is not required again for the life of the thermostat, whereas for settings and adjustments, the operator interface may be used periodically and should be as user friendly as possible. In the past, the installer configuration process was very obscure and error prone since it had been a secondary function of the operator user interface that partially reused some of the operator interface features in an obscure secondary manner so as to attempt reducing costs associated with the device. This approach was time consuming and error prone, had to be repeated for each installation, and was still costly.

By removing the thermostat configuration installer interface from the thermostat operator interface to a PDA, as in the present system, the following benefits are noted. There is an easy to use configuration process with context checking on previous selections so only valid options are presented and errors cannot be made, and also easy to use navigation of thermostat configuration screens. Novice users may be directed to the next appropriate parameter entry screen based on the context of previous configuration selections. Configurations can be done ahead of time and downloaded quickly at installation time. Similar configurations do not have to be repeated on every device but simply recalled from storage and downloaded. The PDA based thermostat configuration application may generate a code that represents the raw configuration. This code can be recorded (for example on paper) and entered by hand quickly into the thermostat keyboard if a PDA is not available at the job site. There is context dependent control loop tuning. The thermostat PID (viz., proportional, integral and derivative gains) control loop tuning parameters may be automatically adjusted as a function of equipment type, number of output stages, output type (modulating or discrete), the HVAC process, and other factors as desired.

A PDA and its interfacing with the thermostat of an air management system may also be used for automatic testing, checkout, analysis and diagnosis of the system. Testing and troubleshooting a complex fully featured commercial thermostat may be time consuming and confusing since the configuration must first be understood and then the operation must be run through valid modes with inputs and set points temporarily manipulated, plus waiting for the delays built into the controller, to verify operation.

Commissioning a complex fully featured commercial thermostat also may be time consuming and confusing. The thermostat configuration should first be understood and then the commissioning process may be run through valid operational modes with inputs and set points temporarily manipulated while waiting for the delays built into the controller to verify operation.

The PDA based online diagnostics may automatically discover the thermostat configuration, turn off normal controller delays, temporarily override sensor inputs and set points, verify proper output action including monitoring the discharge air temperature for the resulting temperature behavior based on the equipment stages activated. Problems discovered may be reported, automatically recorded and the original operating parameters may be restored. This means that less expertise may be required by the technicians sent to install and trouble shoot thermostat installations.

A thermostat may be designed to interface to a PDA or other handy low cost device with an easy wire, IR or RF connection that will allow it do fast, accurate automatic thermostat testing, diagnosing and trouble-shooting. The PDA may automatically obtain the thermostat configuration, turn off normal controller delays, temporarily override sensor inputs and set points, and verify proper output action including monitoring the entry and discharge air temperatures for the resulting temperature behavior based on the equipment stages activated. Problems discovered can be reported, automatically recorded and the original operating parameters can be restored. This means that less expertise is required by the technicians sent to install and trouble shoot thermostats. Smart status reporting simplifies the thermostat installers' field-commissioning task of selecting and monitoring the appropriate real time data. The smart status report content and layout may be based on a theme of management by exclusion. The report generator may respond to real time parameter and data changes in the thermostat environment. There may be a possible web-based system in which the installer or technician need not to go out to the site of the air management system. The installer or technician may be able to diagnose and can fix the system over the internet, Ethernet or the like. However, using the PDA and its infrared interface may be as or more reasonable than the configuring or diagnosing a thermostat, its sub-base and corresponding air management system. PDA configuring and diagnostics may be utilized in residential homes as well as commercial facilities.

Programmable commercial thermostat systems have also been gaining in popularity due to the energy savings associated with programmable schedules and set points. Most small commercial buildings with one or two zones typically may have rooftop equipment controlled through relay contacts such as heat stage 1, heat stage 2, cooling stage 1, cooling stage 2, and fan.

These controls may be interfaced through remote wiring from the zone thermostat to the associated rooftop unit. As commercial thermostat requirements and thermostats become more sophisticated, there may be a need to control heating and cooling coils at control ranges in between specific stage loads. This could be particularly important as chilled water systems and partial load or oversized systems are used. Further, there appears to be a need to control modulating zones and a need for a commercial modulating thermostat that is able to support both traditional staged and modulating outputs.

This system may solve the problems associated with control issues by implementing a true analog heating and cooling signal to be implemented by the roof top control system. Several enhancements and options exist in the algorithm and thermostat configuration to assist and lead to control of water valves and oversized heating coils and loads. Under staging conditions, traditional control algorithm techniques may be used to control the on/off control to the heating coils, cooling coils and fan. When used in a modulating configuration, special analog driver circuits may allow the output from the thermostat to provide 4 to 20 milliamps and 2 to 10 volts for direct interfacing for the control of modulated components. These control parameters are popular ranges for many modulated dampers and valves used in air management systems, such as HVACs.

The thermostat may contain a software component that allows automatic configuration of the output actuation type (modulation and discrete) identified by the sub-base with preset configuration resistors. The hardware component of the output actuation may be implemented through an analog interface set from the thermostat. Analog control and interface to the modulation may be controlled through software algorithm PID and staging information. If additional heating is desired after a stage is added at low load, additional supply is available through increasing of the analog heating signal. Applications of this modulating thermostat may be used for boiler firing rate controls and other energy supply or cooling type equipment. Through the use of programmable memory, additional algorithms can be developed to apply to a wide range and variety of control applications besides air management system control.

The present thermostat may provide modulated/analog control of an air management system and discrete/digital control of the same or another air management system. This thermostat may provide modulating control of a single stage of heating and/or cooling. On the other hand, this thermostat may provide modulating control of multiple stages of heating and cooling. The modulating output to one cooling or heating stage may result in an efficient level of output of the controlled stage. If more output is needed from that stage, the thermostat may with the modulating output call on another stage and control it for more heating or cooling, so as to maintain the better efficiency of the first stage. Also, modulated control may result in the next stage's approaching an efficient level of output. This approach may continue for more output or less output as needed form the respective stages. The thermostat may provide analog or digital signals for controlling single or multiple cooling or heating stages. Humidity control may also be implemented by the thermostat and associated air management equipment. A group of thermostats may be connected to a common communications bus. Such bus may have a sequencer connected to the bus. Instructions, software changes, commands, parameters and other information may be communicated among the thermostats and the sequencer. Operations of the thermostats may be sequenced. Information about an example sequencer may be disclosed in U.S. Pat. No. 6,536,678 B2, entitled "Boiler Control System and method", issued Mar. 25, 2003, and by inventor Michael A. Pouchak, which is hereby incorporated herein by reference. Information about an example humidity controller may be disclosed in U.S. patent application Ser. No. 10/314,604, entitled "Humidity Controller", filed on Dec. 4, 2002, and by inventor Paul C. Wacker, which is hereby incorporated herein by reference. Information about an example HVAC may be disclosed in U.S. Patent No. 5,172,565, entitled "Air Handling System Utilizing Direct Expansion Cooling", issued Dec. 22, 1992, and by inventors Richard A. Wruck et al., which is hereby incorporated herein by reference.

BRIEF DESCRIPTION OF THE DRAWING

FIGS. 3a and 3b show screens of a personal digital assistant (PDA) for entering a new thermostat configuration.

FIGS. 4a–4d show PDA screens for selecting an existing configuration and connecting the PDA to the thermostat for uploading the configuration.

FIGS. 5a–5c reveal screen for downloading a new configuration to the thermostat.

FIGS. 6a–6d are screens that relate to uploading and modifying an existing configuration, and downloading it.

FIGS. 8a–8e are screens showing a process for connecting to a thermostat, reading information and saving it, and monitoring data.

FIGS. 9a–9j illustrate steps of reviewing the configuration of a thermostat, making possible changes and saving them.

FIGS. 10a–10l show the screens and steps for an advanced configuration review, possible modification, and saving of any modification.

FIGS. 28a–28c show PDA screen steps to attain a commission summary screen of a test and diagnosis of a thermostat system.

FIGS. 29a–29f show screens for a diagnosis of temperature and other sensors, and set points.

FIG. 30 is a screen for a fan check.

FIGS. 31a–31h are screens showing steps for cooling equipment testing and diagnosis.

FIGS. 32a–32e show PDA screens for testing heating equipment of the thermostat system.

DESCRIPTION

Figure 1:
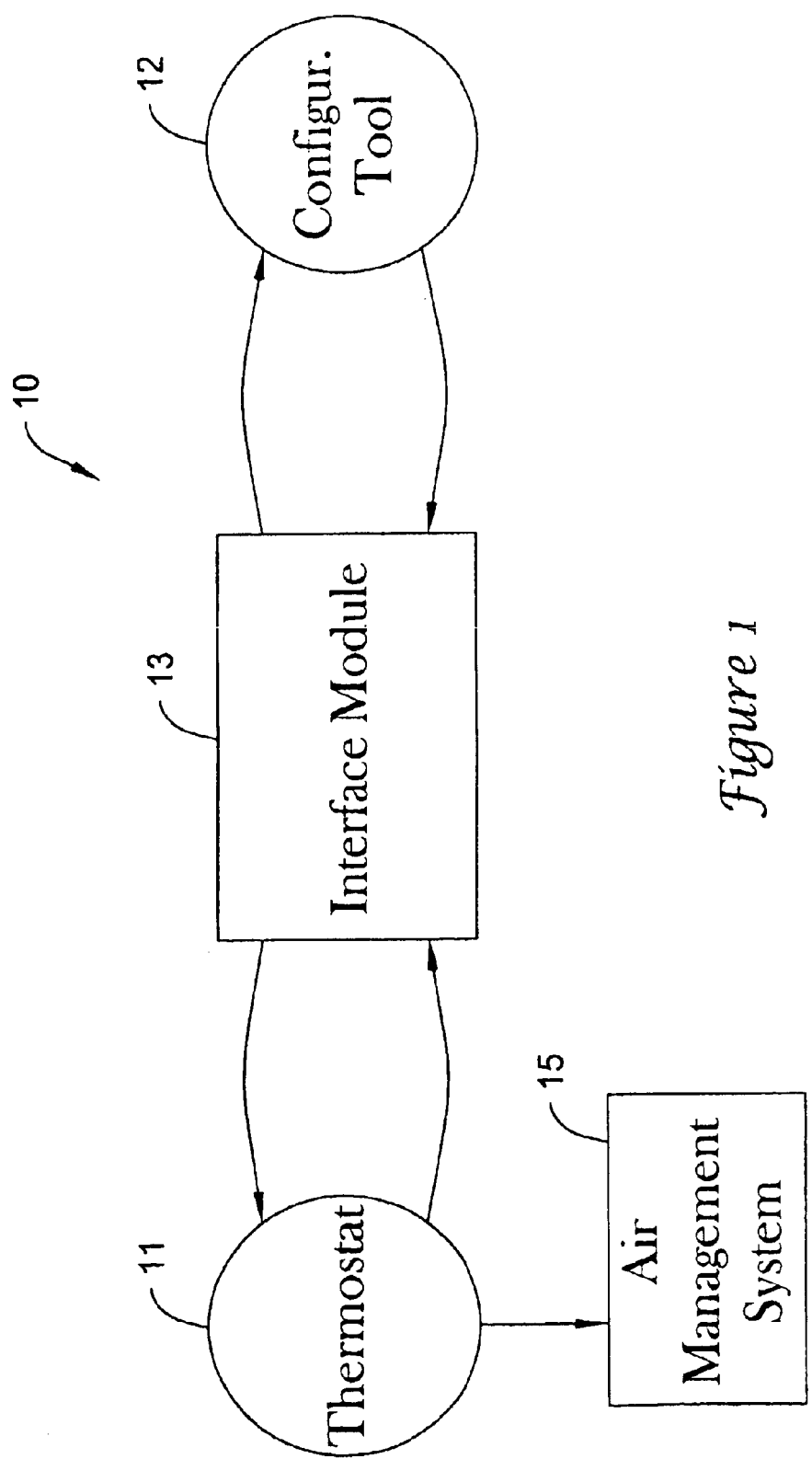
FIG. 1 shows a configuration tool for a thermostat of an air management system.
Figure 2:
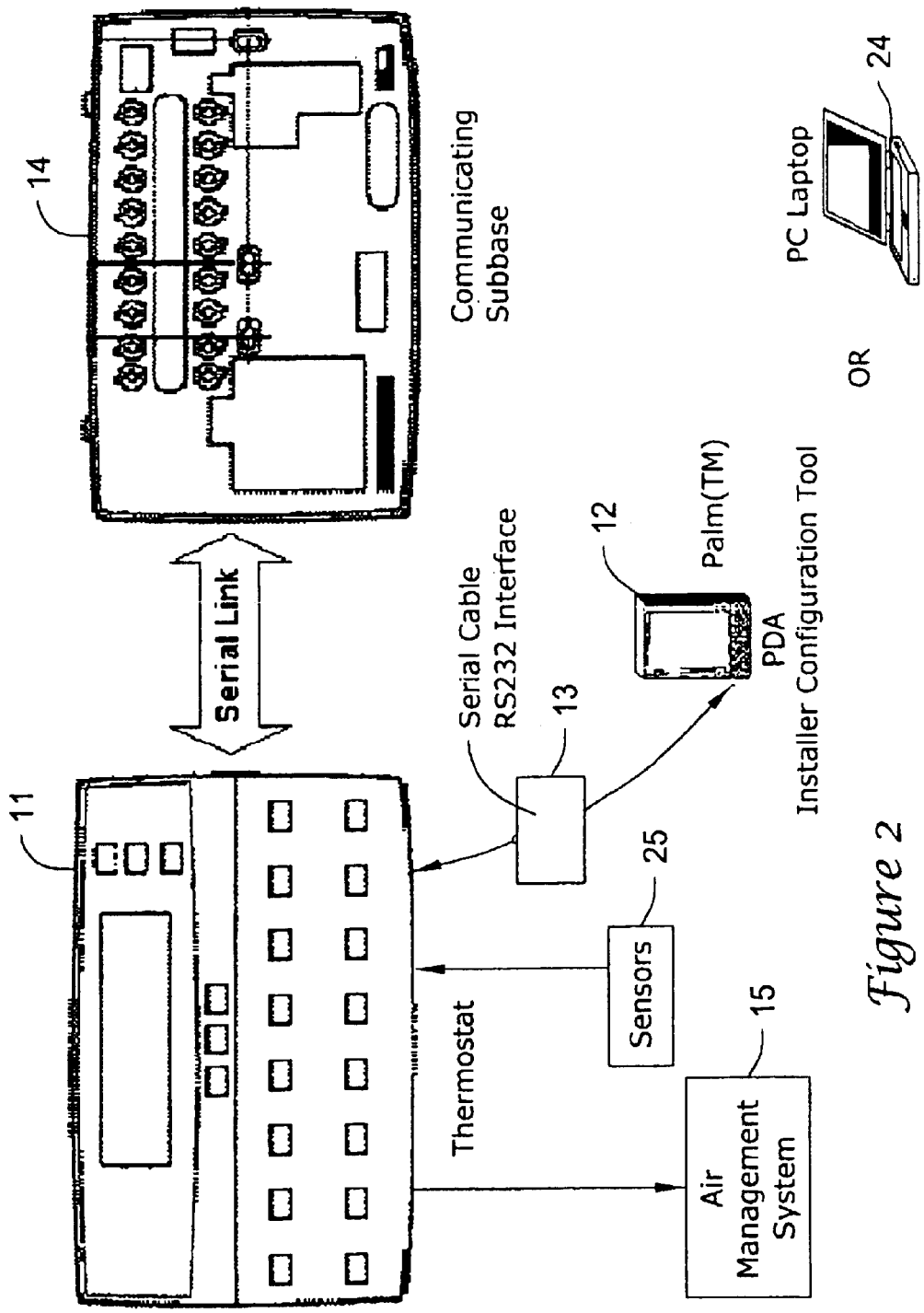
FIG. 2 shows the configuration tool of FIG. 1 in conjunction with a sub-base.

The system may be an installation and/or configuration tool 10 for a programmable thermostat 11, or the like, of an air management system 15, as shown in FIGS. 1 and 2. Thermostat configuration tool and system 10 may consist of application code and two hardware devices. A PDA application code may be used to configure the thermostat. The first hardware device may be a tool platform 12, that is, a PDA hand held device. The second device may be an RS232 interface module 13 including a connection cable. Sensors 25 may be connected to thermostat 11. Configuration tool and system 10 may provide the following value added features: an armchair thermostat 11 setup; a saving of tested thermostat configurations for reuse; a reduction of configuration errors; a reduction in warranty returns and customer callbacks; an updating of control setpoints (for example room temperature occupied, unoccupied and standby setpoints); weekly and holiday schedules; and user defined default configuration values. A PDA hardware platform is preferred over a laptop personal computer (PC) 24 for several reasons including, but not limited to, lower initial cost and smaller size.

An illustrative example of thermostat 11 may be a prototype programmable thermostat, model T7350, built by Honeywell International Inc. in Minneapolis, Minn. The configuration tool 12 application software and a 10 pin serial interface module may be compatible with the following PDA hardware platforms: Palm™ m105; Palm™ m100; Palm™ Vx Series; Palm™ VII Series; Palm™ III Series; Palm™ i705; Palm™ Zire71; Palm™ TungstenT; and TRG-Pro™. The application code may be compatible with PALM OS™ software version 3.5.x. "OS" is an operating system of a Palm™ platform. The OS version compatibility may be for all versions greater than or equal to 3.5x, such as OS 5.2.1. The system may also be hosted on a Microsoft Windows™CE OS PDA platform. Configuration tool serial interface 13 module may be compatible with the various models and versions of thermostat 11. The thermostat serial interface module may support IR, WiFi, Bluetooth and other wireless communications media. Thermostat 11 may have serial communications to allow communications with installer configuration tool 12 and a sub-base 14. Thermostat 11 may be configured using an installer setup through the thermostat keys 15 for basic setup functions. Advanced features may be available through installer configuration tool 12.

Thermostat configuration tool 12 may be used in the context of the following scenarios. In configuring offline, the user may arrange and save various named thermostat configurations with tool 12 disconnected from the thermostat 11. The user may have the option to note a configuration identification code and manually set the code using tool or user interface 12. Then interface 12 may connected to a thermostat 11 and air management system 15 may be configured with an existing named arrangement of parameters. Configuration tool 12 may read and verify the existing arrangement of parameters. Virtually all of the parameters may be changed resulting in a modified or new configuration. Also, the temperature display of thermostat 11 may be calibrated. The user may have an option to save the modified or new configuration file under another name.

Tool 12 may be utilized for performing online diagnostics. For example, tool 12 may be connected to thermostat 11 and diagnostic information such as the thermostat firmware version, the thermostat hardware version, the sub-base hardware version, and run time error messages may be read.

The thermostat configuration tool 12 may have a configuration which may include third party PDA hardware platform supporting application software and serial connection cable with the RS232 interface of module 13. The Palm™ PDA, as an illustrative example, may be used in conjunction with the serial interface having connections as noted in the following table 1 showing the terminals for a Palms PDA serial connection.

TABLE 1

| Pin # | Signal Name & Direction | Function |
|---|---|---|
| 1 | DO (out) | DTR |
| 2 | VCC (out) | +3.30 V Palm ™III through a 330 ohm resistor. |
|   |   | +4.07 V Palm ™V |
| 3 | RXD (in) | Receive Data. |
| 4 | RTS (out) | Request to send. |
| 5 | TXD (out) | Transmit Data. |
| 6 | CTS (in) | Clear to send. |
| 7 | HS IRQ (in) | Interrupt line for waking the device, Palm OS ™ default is to initiate the HotSync process. |
| 8 | ID (in) | Peripheral ID line. |
| 9 | unused | Not connected |
| 10 | SG | Signal Ground |

One may note that pin 10 is located at left as viewed from the back of the Palm™ PDA. The HotSync cradle button shorts pins 2 & 7. Palm™ devices i705, m125, m130 m500, m505, m515 require a 16 pin connector. One may refer to http://www.palmos.com/dev/tech/hardware/palmhardware/electrical interface(16-pin)signals.pdf for details regarding the Palm™ 16 pin connector.

Thermostat 11 configuration may be changed or varied according to certain aspects which are provided as an illustrative example in the following tables. There are setup parameters and default values which may be noted. Table 2 may reveal some display/user interface options.

TABLE 2

| Config Option | Default | Min | Max | Res | Units | Description |
|---|---|---|---|---|---|---|
| Degree temperature display | 0 | 0 | 1 | 1 |  | Temperature display 0: ° F. 1: ° C. |

TABLE 2-continued

| Config Option | Default | Min | Max | Res | Units | Description |
|---|---|---|---|---|---|---|
| Maximum Occupied Cooling Setpoint stop | 85 | 45 | 99 | 1 | F. | Highest the occupied cooling setpoint can be adjusted. MaxCoolStPt >= OccCl >= OccHt + 2 Display Resolution: 1 (F./C.) |
| Minimum Occupied Heating Setpoint stop | 55 | 40 | 90 | 1 | F. | Lowest the occupied heating setpoint can be adjusted. MinHeatStPt <= OccHt <= OccCl − 2 Display Resolution: 1 (F./C.) |
| Unoccupied Heat Setpoint | 55 | 40 | 90 | 1 | F. | |
| Standby Heat Setpoint | 67 | 40 | 90 | 1 | F. | |
| Standby Heat Setpoint | 67 | 40 | 90 | 1 | F. | |
| Occupied Heat Setpoint | 70 | 40 | 90 | 1 | F. | |
| Occupied Cool Setpoint | 75 | 45 | 99 | 1 | F. | |
| Standby Cool Setpoint | 78 | 45 | 99 | 1 | F. | |
| Unoccupied Cool Setpoint | 85 | 45 | 99 | 1 | F. | |
| Clock format | 0 | 0 | 1 | 1 | | 0: 12-hour clock format 1: 24-hour clock format |
| Keypad lockout level | 0 | 0 | 2 | 1 | | Keypad lockout enable/disable through special keypad sequence. 0: No lockout. 1: Lockout all keys except Temporary Occupied, increase, decrease and information**. 2: Lockout all keys except information**. **Do not allow adjustments on dehumidification high limit setpoint. |
| System Switch | 0 | 0 | 3,7 | 1 | | 0: Auto 1: Cool 2: Heat 3: Emergency Heat 7: Off |

Table 3 shows an input/output configuration.

TABLE 3

| Config Option | Default | Min | Max | Res | Units | Description |
|---|---|---|---|---|---|---|
| Remote space temperature sensor | 0 | 0 | 2 | 1 | | 0: Local sensor only. 1: Remote sensor only. 2: Network Rm Sensor (Sub-base) |
| Space humidity sensor | 0 | 0 | 3 | 1 | | 0: No space humidity sensor. 1: Local space humidity sensor enabled. 2: Remote space humidity sensor enabled. 3: Network room RH sensor (Sub-base) |
| Discharge air sensor | 0 | 0 | 1 | 1 | | 0: No discharge air sensor. 1: Discharge air sensor enabled. |
| Outside air sensor | 0 | 0 | 2 | 1 | | 0: No outside air sensor. 1: Outside air sensor enabled 2: Network OAT sensor (Sub-base) |
| Auxiliary contact operation | 0 | 0 | 3 | 1 | | 0: Time of day contact. 1: Economizer contact. 2: Dehumidification hot gas bypass contact 3: Simple Dehumidification contacts. Notes: Aux contact not available if heat pump selected and Sub-base #1. |
| Occupancy Sensor | 0 | 0 | 2 | 1 | | 0: No Occupancy sensor. 1: Use Remote Occupancy sensor. 2: Use Network Occupancy sensor (future). |

Table 4 reveals the fan operation options.

TABLE 4

| Config Option | Default | Min | Max | Res | Units | Description |
|---|---|---|---|---|---|---|
| Fan Switch | 0 | 0 | 1 | 1 | | 0: On 1: Auto |
| Fan Operation | 0 | 0 | 1 | 1 | | 0: Conventional applications where equipment controls fan operation in heat mode. That is, the plenum switch controls the fan when in heat mode and the Thermostat controls the fan when in cool mode. 1: Electric heat applications where thermostat controls fan operation in heat mode. |
| Extended fan operation in heating | 1 | 0 | 1 | 1 | | 0: No extended fan operation after call for heat ends. 1: Fan operation extended 90 seconds after call for heat ends. |
| Extended fan operation in cooling | 0 | 0 | 1 | 1 | | 0: No extended fast operation after call for cooling ends. 1: Fan operation extended 45 seconds after call for cool ends. |

Table 5 shows the control tuning options.

TABLE 5

| Config Option | Default | Min | Max | Res | Units | Description |
|---|---|---|---|---|---|---|
| Cycler Authority | 4 | 2 | 15 | 1 | R | Thermostat Cycler Authority (Theta). |

Table 6 reveals the cooling operation options.

TABLE 6

| Config Option | Default | Min | Max | Res | Units | Description |
|---|---|---|---|---|---|---|
| Cooling Output | 2 | 0 | 4 | 1 | | Stages of cooling. 0: No cooling. 1: One cooling stage. 2: Two cooling stages. 3: Three cooling stages. 4: Four cooling stages. |
| Cooling system response | 0 | 0 | 1 | 1 | Cph | 0: Standard response 3 cph. 1: Fast response 4 cph |
| Cooling TR | 4 | 1 | 30 | 1 | R | Cooling proportional gain (deg F.) |
| Cooling IT | 2500 | 0, 10 | 5000 | 1 | Sec | Cooling integral time (seconds). 0 = disable. |
| Cooling DT | 0 | 0 | 3000 | 1 | Sec | Cooling derivative time (seconds). 0 = disable. |
| Cooling Action | 0 | 0 | 1 | 1 | | Cooling action. Applies only to proportional outputs. 0 = direct acting. 1 = reverse acting |
| Cooling Lockout | 0 | 0 | 1 | 1 | | 0: No OAT lockout 1: cooling locked out if Outdoor air valid and OAT < ClgLockoutSP |
| Cooling Lockout SP. | 35 | −40 | 120 | 1 | F. | |
| DAT Low Limit | 45 | 35 | 60 | 1 | F. | Discharge Air Temperature Low Limit. |
| Minimum cool recovery ramp rate | 3 | 0 | 20 | 1 | F./Hr | Minimum cooling recovery ramp rate, 0–36° F./hr. |
| Min cool OAT | 90 | −20 | 100 | 1 | F. | Minimum cooling outdoor air temperature |
| Max cool recovery rate | 6 | 0 | 20 | 1 | F./hr | Maximum cooling recovery ramp rate |
| Max cool OAT | 70 | −20 | 100 | 1 | F. | Maximum cooling outdoor air temperature |

Table 7 shows the heating operation options.

TABLE 7

| Config Option | Default | Min | Max | Res | Units | Description |
|---|---|---|---|---|---|---|
| Heating output stages | 2 | 0 | 3 | 1 | | Stages of heating 0: No heating. 1: One heating stage. 2: Two heating stages. 3: Three heating stages. (Not available if configured for 4 stages of cooling) |
| Auxiliary heating stages | 0 | 0 | 2 | 1 | | 0: No auxiliary heating 1: one stage of auxiliary heat 2: two stages of auxiliary heat |
| Heating system response | 1 | 0 | 3 | 1 | | 0: Standard response 3 cph. 1: Medium response 6 cph. 2: Fast 9 cph 3: Super fast response 20 cph |
| Heating TR | 4 | 1 | 30 | 1 | R | Heating proportional pin (deg F.) |
| Heating IT | 2500 | 0,10 | 5000 | 1 | Sec | Heating integral time (seconds). 0 = disable. |
| Heating DT | 0 | 0 | 3000 | 1 | Sec | Heating derivative time (seconds). 0 = disable. |
| Heating Action | 1 | 0 | 1 | 1 | | Heating action. Applies only to proportional outputs. 0 = direct acting. 1 = reverse acting. |
| Heating Lockout | 0 | 0 | 1 | 1 | | 0: no lockout 1: heat locked out if OAT valid and (OAT > HtgLockoutSP) |
| Heating Lockout SP. | 70 | −40 | 120 | 1 | F. | |
| DAT High Limit | 110 | 65 | 140 | 1 | F. | Discharge Air Temperature High Limit |
| Minimum heat recovery ramp rate | 5 | 0 | 20 | 1 | F./hr | Minimum heating recovery ramp rate |
| Min heat OAT | 0 | −20 | 100 | 1 | F. | Minimum heating outdoor air temperature |
| Maximum heat recovery ramp rate | 8 | 0 | 20 | 1 | F./hr | Maximum heating recovery ramp rate |
| Max heat OAT | 40 | −20 | 100 | 1 | F. | Maximum heating ramp rate outdoor air temperature |

Table 8 shows the heat pump options.

TABLE 8

| Config Option | Default | Min | Max | Res | Units | Description |
|---|---|---|---|---|---|---|
| Heat Pump Control | 0 | 0 | 1 | 1 | | 0: Conventional Control 1: Heat Pump Control |
| Heat Pump Reversing Valve | 1 | 0 | 1 | 1 | | 0: energize O/B on call for Heat 1: energize O/B on call for Cooling |

Table 9 reveals the relative humidity control options.

TABLE 9

| Config Option | Default | Min | Max | Ret | Units | Description |
|---|---|---|---|---|---|---|
| RH high limit | 65 | 10 | 90 | 1 | % | Relative Humidity high limit setpoint. |
| Dehumidify using minimum ON time | 0 | 0 | 1 | 1 | | 0: None<br>1: Dehumidification using minimum on time |
| Dehumidify Min On Time | 5 | 5 | 15 | 1 | min | This is the minimum on time used for if the user chose "Dehumidify Minimum On". |
| Dehumidify using reset | 0 | 0 | 1 | 1 | | 0: None<br>1: Dehumidification using Room Temperature SetPoint reset |
| Dehumidify using reheat | 0 | 0 | 1 | 1 | | 0: None<br>1: Dehumidification using reheat |
| HumTemp Reset | 2 | 1 | 5 | 1 | R | Humidity temperature reset<br>The dehumidify reset must be smaller than the occupied zero energy band (ZEB) or standby ZEB. |

Table 10 is a list of energy management options.

TABLE 10

| Config Option | Default | Min | Max | Res | Units | Description |
|---|---|---|---|---|---|---|
| Demand limit control bump | 3 | 0 | 10 | 1 | R | Demand limit control set point bump |
| Sequential start | 0 | 0 | 15 | 1 | | Delay in 10 second increments. 0 is no delay. Delays start of equipment after power restored to thermostat. For example, setting of 3 is a 30 second delay.<br>0 - 0 seconds<br>1 - 10 seconds<br>2 - 20 seconds<br>. . .<br>15 - 150 seconds |

Table 11 indicates the calibration options.

TABLE 11

| Config Option | Default | Min | Max | Res | Units | Description |
|---|---|---|---|---|---|---|
| Temperature display adjustment | 0 | 0 | 7 | 1 | | Room Temperature display adjustment<br>0: No difference in displayed temperature and actual room temperature.<br>1: Display adjusts to 1° F. (0.6° C.) higher than actual room temperature.<br>2: Display adjusts to 2° F. (1.1° C.) higher than actual room temperature. |

TABLE 11-continued

| Config Option | Default | Min | Max | Res | Units | Description |
|---|---|---|---|---|---|---|
| | | | | | | 3: Display adjusts to 3° F. (1.7° C.) higher than actual room temperature.<br>4: Display adjusts to −4° F. (0.6° C.) lower than actual room temperature.<br>5: Display adjusts to −3° F. (1.1° C.) lower than actual room temperature.<br>6: Display adjusts to −2° F. (1.7° C.) lower than actual room temperature.<br>7: Display adjusts to −1 F. lower than actual room temperature. |

Table 12 shows the override and bypass options.

TABLE 12

| Config Option | Default | Min | Max | Res | Units | Description |
|---|---|---|---|---|---|---|
| Temporary override duration | 2 | 0 | 7 | 1 | Hr | Override duration in hours.<br>0: 1 hour<br>1: 2 hours<br>. . .<br>7: 8 hours |

Table 13 shows a time schedule with default time schedule settings. The time resolution may be one minute. The limit may be no more than two occupied or two unoccupied or two standby events per day.

TABLE 13

| Day | Event | Mode | Time |
|---|---|---|---|
| Sun | 1 | | |
| 0 | 2 | | |
| | 3 | | |
| | 4 | | |
| Mon | 1 | Occupied | 8:00 AM |
| 1 | 2 | Unoccupied | 10:00 PM |
| | 3 | | |
| | 4 | | |
| Tue | 1 | Occupied | 8:00 AM |
| 2 | 2 | Unoccupied | 10:00 PM |
| | 3 | | |
| | 4 | | |
| Wed | 1 | Occupied | 8:00 AM |
| 3 | 2 | Unoccupied | 10:00 PM |
| | 3 | | |
| | 4 | | |
| Thr | 1 | Occupied | 8:00 AM |
| 4 | 2 | Unoccupied | 10:00 PM |
| | 3 | | |
| | 4 | | |
| Fri | 1 | Occupied | 8:00 AM |
| 5 | 2 | Unoccupied | 10:00 PM |
| | 3 | | |
| | 4 | | |
| Sat | 1 | | |
| 6 | 2 | | |
| | 3 | | |
| | 4 | | |
| Hol | 1 | | |
| 7 | 2 | | |
| | 3 | | |
| | 4 | | |

Table 14 shows daylight savings schedule settings. The default range may be from the first Sunday in April to the last Sunday in October.

TABLE 14

| Config Option | Default | Min | Max | Res | Units | Description |
|---|---|---|---|---|---|---|
| DisStartDay | 33 | 0 | 74 | 1 | | 0: None<br>1, 2, 3, ... 31,<br>32: LastDayOfMonth<br>33: FIRST_SUN<br>34: FIRST_MON<br>...<br>67: FIFTH_SAT<br>...<br>74: LAST_SAT |
| DisStopDay | 68 | 0 | 74 | 1 | | 0: None<br>1, 2, 3, ... 31,<br>32: LastDayOfMonth<br>33: FIRST_SUN<br>34: FIRST_MON<br>...<br>67: FIFTH_SAT<br>...<br>74: LAST_SAT |
| DisStartMonth | 4 | 0 | 12 | 1 | | 0: None<br>1: Jan, ... 12:Dec<br>Default Value:April |
| DisStopMonth | 10 | 0 | 12 | 1 | | 0: None<br>1: Jan, ... 12:Dec<br>Default Value: October |

Table 15 relates to holiday schedule settings. This table shows one typical schedule of ten schedules.

TABLE 15

| Config Option | Default | Min | Max | Res | Units | Description |
|---|---|---|---|---|---|---|
| Holiday Schedule Month | 0 | 0 | 12 | 1 | | 0: Unprogrammed<br>1: January<br>12: December |
| Holiday Schedule Day | 0 | 0 | 74 | 1 | | 0: Unprogrammed<br>1, 2, 3, ... 31,<br>32: LastDayOfMonth<br>33: FIRST_SUN<br>34: FIRST_MON<br>...<br>67: FIFTH_SAT<br>...<br>74: LAST_SAT |
| Holiday duration | 0 | 0 | 99 | 1 | days | 0: No holiday<br>1: 1 day holiday<br>...<br>99: 99 day holiday |

Table 16 is a default holiday schedule. Configuration tool may provide the following default holidays.

TABLE 16

| Holiday | Month | Day | Duration |
|---|---|---|---|
| New Year's Day | 1 | 1 | 1 |
| Memorial Day | 5 | Last Monday | 1 |
| Independence Day | 7 | 4 | 1 |
| Labor Day | 9 | First Monday | 1 |
| Thanksgiving | 11 | Fourth Thursday | 1 |
| Christmas | 12 | 25 | 1 |

Table 17 relates to a real time configuration with real time clock settings.

TABLE 17

| Config Option | Default | Min | Max | Res | Units | Description |
|---|---|---|---|---|---|---|
| Clock Year | 255 | 0 | 175, 255 | 1 | | Valid range is Jan. 1, 2000 to Dec. 31, 2175<br>0: 2000<br>1: 2001<br>2: 2002<br>...<br>175: 2175<br>255: Invalid/Not Used |
| Clock Month | 0 | 0 | 12 | 1 | | 0: UnProgrammed<br>1: January<br>...<br>12: December |
| Clock Day | 0 | 0 | 31 | 1 | | 0: UnProgrammed<br>1: 1<br>2: 2<br>31: 31 |
| Clock Minutes | 720 | 0 | 1439 | 1 | | 0: Midnight = first minute of the day<br>720: noon.<br>1439: 11:59 p.m. |
| Clock Seconds | 0 | 0 | 59 | 1 | | 0: 0 = first second of the minute<br>1: 1<br>...<br>59: 59 = last second of the minute |

Configuration tool 12 may calculate a configuration identification as a function of a selected group of thermostat 11 configuration parameters, using an algorithm. Configuration tool 12 may display the computed thermostat 11 configuration 15 identification. There are configuration parameter dependencies. Here are summarized configuration rules governing limits on parameter data entry and display in the context of thermostat 11 functional sub-base configured inputs, configured outputs and occupancy mode. There may be a temperature setpoint and mode dependency. Configuration tool default time values may be initialized based on the context of the user selected occupancy mode. Table 18 shows default schedule time values. Events 1 and 3 may be either occupied or standby. Events 2 and 4 may be either standby or unoccupied. It may be that there should be no more than two occupied or two unoccupied events per day.

TABLE 18

| Mode Selected | Default Time |
|---|---|
| Occupied | 8:00 AM |
| Standby | 11:30 AM |
| Unoccupied | 10:00 PM |

Table 19 reveals the set point range and resolution. Setpoint constraints may include MinHeatStPt<=OccHt<=OccCl-2, MaxCoolStPt>=OccCl>=OccHt+2, UnoccHt<=OccHt<=OccCl-2, UnoccHt<=StdByHt<=StdByCl-2, UnoccCl>=OccCl>=OccHt+2, UnoccCl>=StdByCl>=StdByHt+2.

TABLE 19

| Config Option | Min | Max | Res | Units |
|---|---|---|---|---|
| Cooling Setpoint | 45 | 99 | 1 | F. |
| | 7 | 37 | 1 | C. |
| Heating Setpoint | 40 | 90 | 1 | F. |
| | 5 | 32 | 1 | C. |

A heat pump configuration screen context rule may be to enable a heat pump configuration if the sub-base type is 1, 2 or 3. A standard control configuration screen context rule may be to enable a standard control configuration if the sub-base type 1, 2, 3 or 4. A dehumidification configuration screen context rule may be to enable if the sub-base type is 3 or 4 and the relative humidity sensor is configured. A variable recovery rate configuration screen context rule may be to enable if the sub-base type is 2, 3 or 4 and the outside air temperature (OAT) sensor is enabled. The relative humidity sensor configuration screen context rule may be to enable if the sub-base type is 3 or 4. The discharge air temperature (DAT) and OAT sensor configuration screen context rule may be to enable if the sub-base type 2, 3 or 4.

Sub-base 1 may be a base wall plate configuration. A total of four relays may be available with the thermostat and sub-base. An auxiliary relay may be configured for an economizer, the time of the day, dehumidification, or an additional stage of heating or cooling. The selections that may be disabled are the relative humidity Sensor, the DAT sensor, the OAT sensor, the occupancy sensor and the remote room sensor. Table 20 shows an installer configuration option for sub-base 1.

TABLE 20

| Installer Configuration Option | Sub-base 1 |
| --- | --- |
| Heating output stages | 1 |
| Cooling output stages | 1 |
| Room humidity sensor | 0 |

Sub-base 2 may be a two heat stage/two cool stage basic configuration. A total of six relays may be available with the thermostat and sub-base. The auxiliary relay may be configured for an economizer, time of the day (TOD), dehumidification, or an additional stage of heating or cooling. The selections that may be disabled are the network input options, the relative humidity sensor and the occupancy sensor. Table 21 shows an installer configuration option for sub-base 2.

TABLE 21

| Installer Configuration Option | Sub-base 2 |
| --- | --- |
| Heating output stages | 2 |
| Cooling Output stages | 2 |
| Room humidity sensor | 0 |

Sub-base 3 may be a three heat stage/three cool stage configuration. This sub-base may allow for conventional or heat 15 pump operation. A total of 8 relays may be available with the thermostat and sub-base. The auxiliary relay may be configured for an economizer, the time of the day, or dehumidification.

This sub-base may be configured for a two heat stage/four cool stage configuration by using the third stage of heat for an additional stage of cooling. The selections that may be disabled are the network input options. Table 22 shows an installer configuration option for sub-base 3.

TABLE 22

| Installer Configuration Option | Sub-base 3 |
| --- | --- |
| Heating output stages | 3 |
| Cooling Output stages | 3 |
| Room humidity sensor | 1 |

Sub-base 4 may be a modulating configuration. Relative to the modulating sub-base configuration screen context rules, a total of 4 relays may be available with the thermostat and sub-base. The auxiliary relay may be configured for an economizer, time of the day, dehumidification or an additional stage of heating or cooling. The cooling and heating action (direct and reverse) may be shown. Table 23 shows an example installer configuration option for the various sub-bases.

TABLE 23

| Installer Configuration Option | Sub-base 1 | Sub-base 2 | Sub-base 3 | Sub-base 4 |
| --- | --- | --- | --- | --- |
| Heating output stages | 1 | 2 | 3 | 0 |
| Cooling Output stages | 1 | 2 | 3 | 0 |

PDA configuration tool 12 may arrange and store user preferences. A preference selection for units may include SI (C) and US conventional (F). There may be a preference for alert messages such as an enable/disable alert warning regarding unsupported PDA OS™ versions. User preferences may be stored in a dedicated file. There may be one user preference set per PDA platform.

Preferences for regional design parameters may be stored in a default thermostat configuration. New configuration files may be instantiated with the default thermostat configuration. The user may modify the default thermostat configuration. One may lock configuration default files. The user preferences may support functions for locking and unlocking the default configuration files including the general thermostat configuration, the weekly schedule and the holiday schedule.

The configuration tool database manager may support 250 named configuration files in a space of 500 K bytes of PDA memory. The tool application software may use up to 500 K bytes of PDA memory.

The following figures effectively show what may be displayed on a PDA when configuring or doing settings. FIG. 3a may be the opening screen of configuration tool 12 of programmable thermostat 11. One may configure offline by selecting a new configuration. Then, in the next screen, illustrated in FIG. 3b, one may enter a description of the new configuration under "Description".

One may connect and configure with an existing arrangement on the PDA. Various versions of firmware and software in thermostat 11 may support the processes in the following figures. FIG. 4a is an opening screen where one may click "Select Existing Config". The next screen in FIG. 4b shows existing configurations on which one may click "Example2", which may result in the next screen as illustrated in FIG. 4c. Here, one may click "Downld", which may bring a screen as shown in FIG. 4d. Then one may click "OK" to connect the PDA serial port to the T7350 thermostat. On the other hand, one may configure a new arrangement and then connect in FIGS. 5a, 5b and 5c. One may click a "New Config" on the opening screen of FIG. 5a and enter the new configuration name and its description on the next screen in FIG. 5b. The thermostat may be configured clicking the "Next" button to navigate it for entering the new configuration selections, features and settings. Clicking the "DownLd" button may result in the screen of FIG. 5c for the opportunity of serially connecting the PDA 12 port to thermostat 11.

Figure 6D:
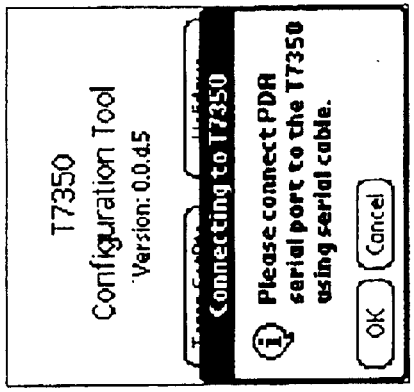

FIGS. 6a through 6c relate to connecting and modifying the existing configuration. On the opening screen of FIG. 6a, one may click "Upload Config" and get the connecting screen in FIG. 6b where one may connect the PDA to the thermostat by clicking "OK". In FIG. 6c, customer XYZ configuration may be loaded. Using the "Next" button, one may navigate and modify the loaded configuration. After modification of the configuration, one may click the "DownLd" button of screen in FIG. 6c to get the box for connecting PDA 12 to the thermostat 11 for downloading the modified configuration. FIG. 6d shows a dialog box for connecting PDA 12 to the thermostat 11.

Figure 7B:
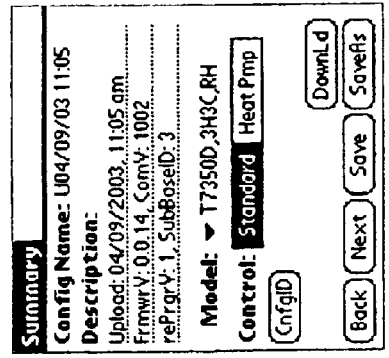
FIGS. 7a and 7b are screens showing a download and upload connection selection to a thermostat and a room temperature calibrate, respectively.
Figure 7A:
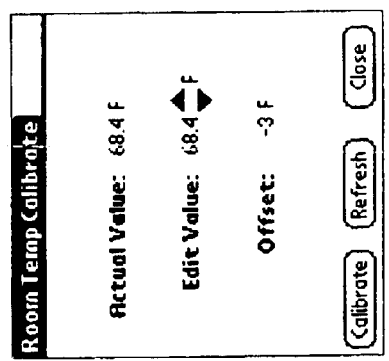
Figure 8A:
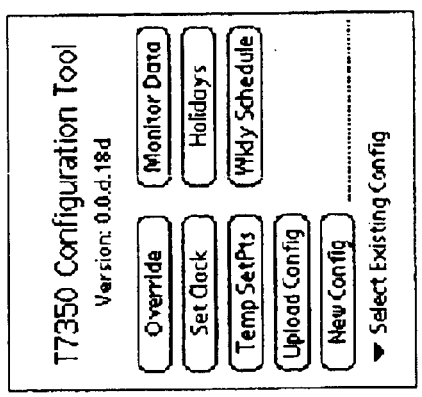
Figure 8B:
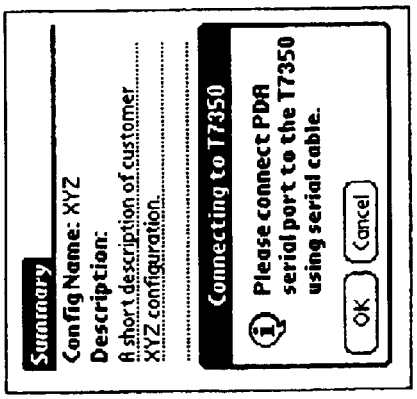
Figure 8C:
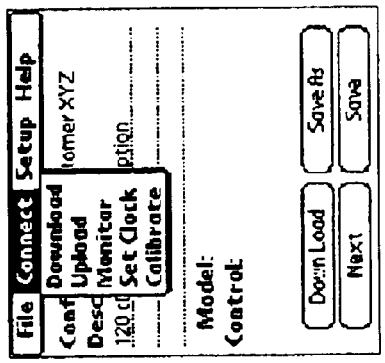
Figures 8D, 8E, 9A, 9B, 9C, 9D:
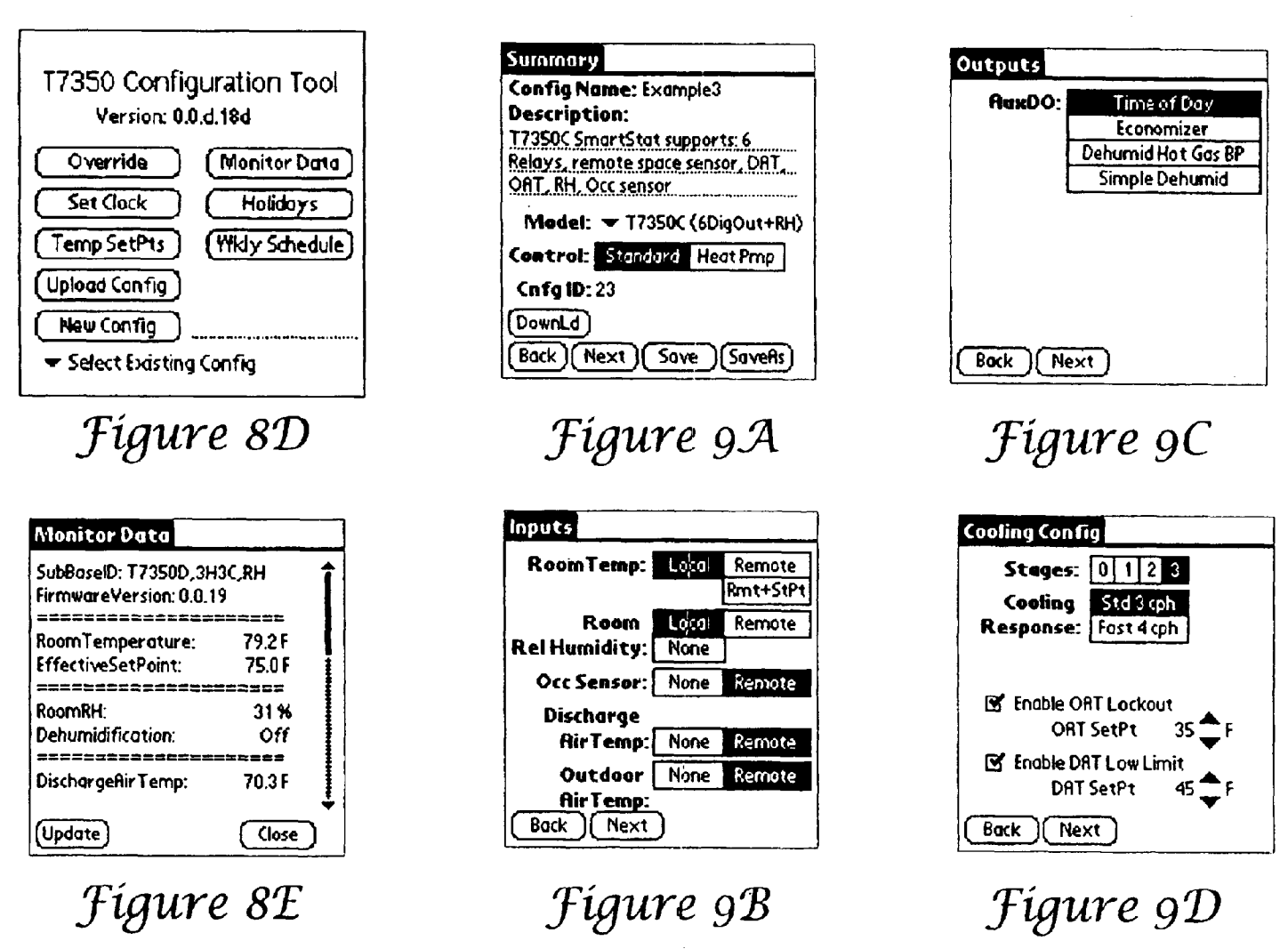

FIGS. 7a and 7b show screens that may be used for connecting and calibrating the thermostat. FIGS. 8a, 8b and 8c illustrate the sequence for connecting, reading and saving, that is one may click "Upload Config" on the opening screen and connect in the box that comes up and when ready to save, click the "Save" button in the screen of FIG. 8c. Figures 8d and 8e relate to monitoring data.

Figures 9E, 9F, 9G, 9H, 9I, 9J:
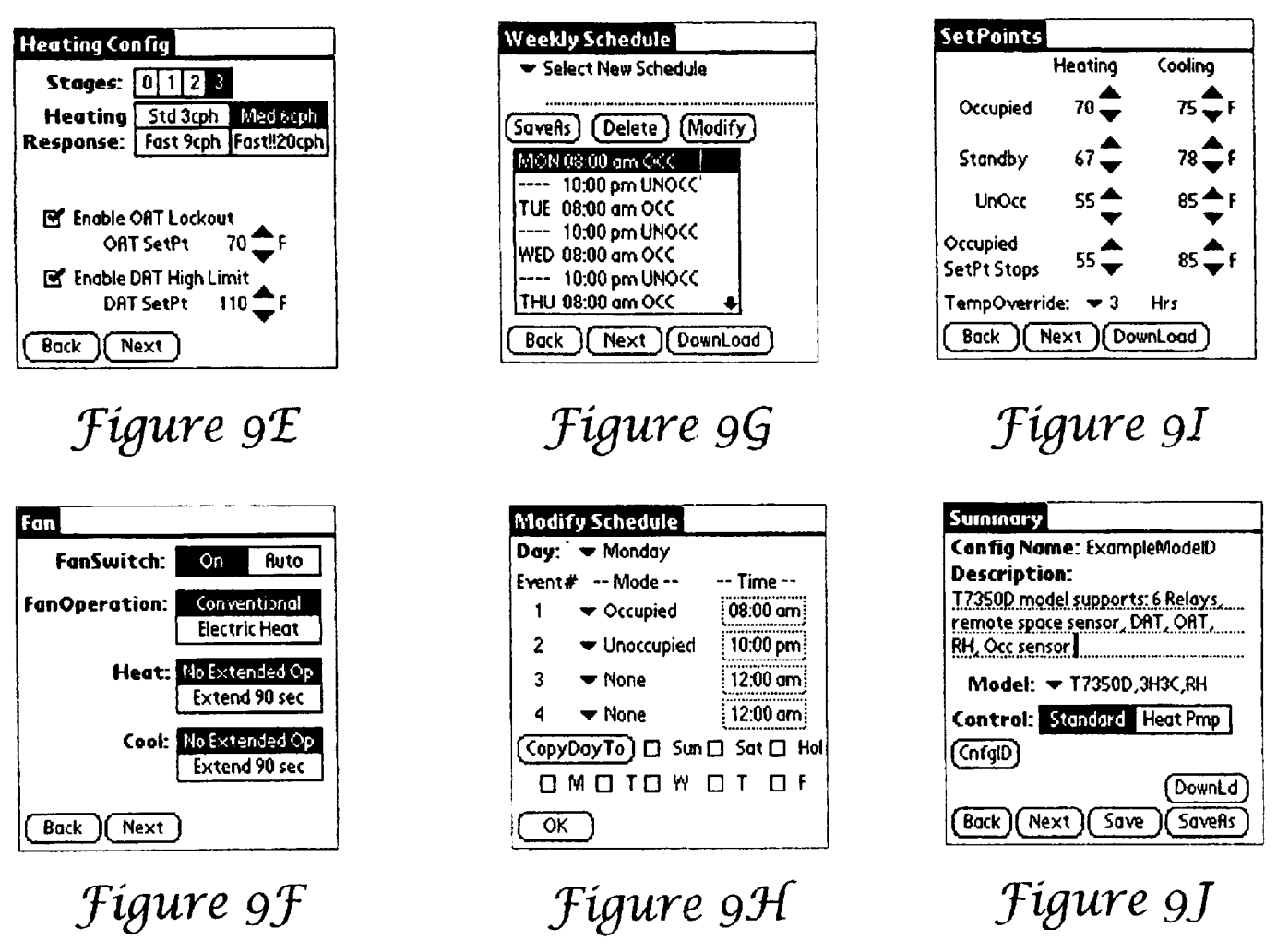

FIGS. 9a through 9j illustrate novice configuration and navigation. One, i.e., the user, may click on the "Next" button of the screen of the selected existing configuration, viz., Example 3, in FIG. 9a to navigate it. FIG. 9b shows a selection of sources of inputs for room temperature, room relative humidity, discharge air temperature and outdoor temperature. After clicking the selections, the user may click "Next" and go to another screen for an output selection of "AuxDO" of the time of the day, economizer or the dehumid hot gas BP shown in FIG. 9c. A next screen may be the cooling configuration in FIG. 9d for a selection of the number of stages, cooling response, lockout, and set point degrees F. FIG. 9e shows a similar screen for heating configuration with a selection for stages, auxiliary stages, heating response, lock out and OAT. FIG. 9f is a screen that relates to features of the fan such as the switch of "On" or "Auto", operation of conventional or electric heat, extended operation or not for heat and cool. An events schedule screen in FIG. 9g provides for the modification of the schedule relative to unoccupied and occupied times of each day of the week. To insert changes, the user may click on "Modify", which may bring up the screen shown in FIG. 9h, where the user may enter the times of occupancy for the various days of the week. FIG. 9i shows the screen where one may enter the temperature set points for heating and cooling for the events of a space that is occupied, unoccupied and the standby mode. Also, a temperature override interval in terms of hours may be entered. The "Summary" screen of FIG. 9j may be returned to upon which the user may save the changes to the configuration.

Figures 10A, 10B, 10C, 10D, 10E, 10F:
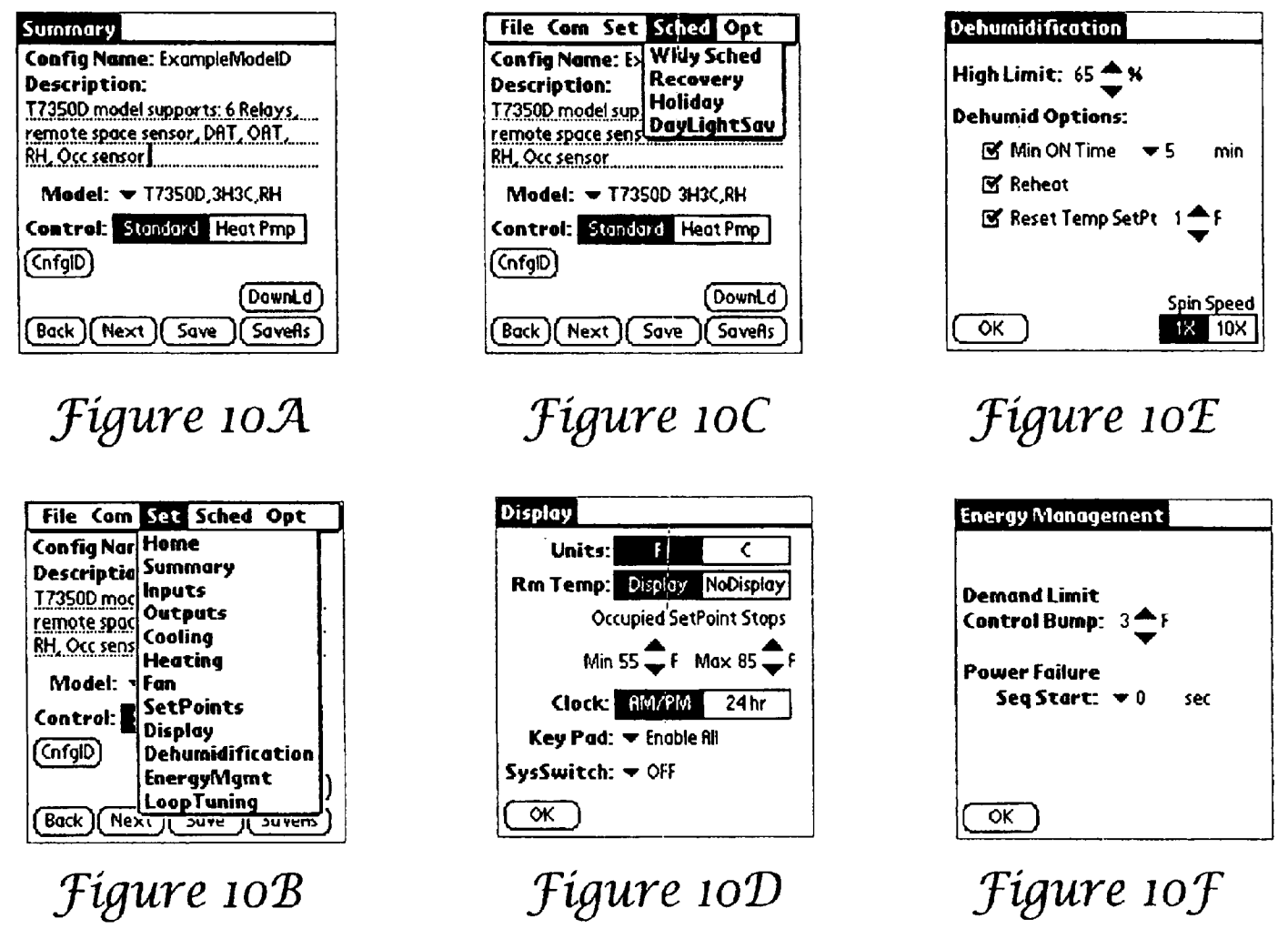
Figure 10K:
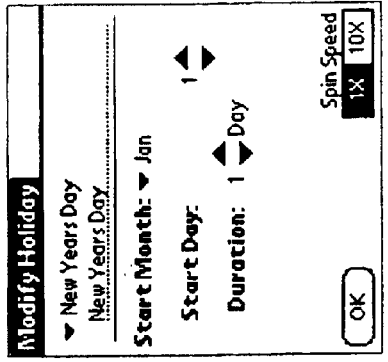
Figure 10L:
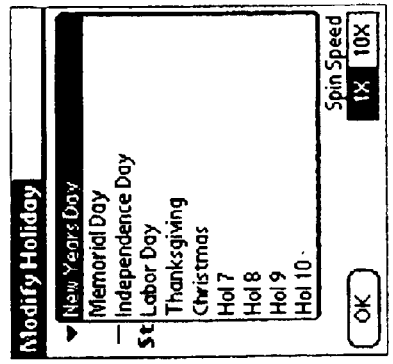

FIGS. 10a through 10m reveal a sequence for an advanced user configuration. FIG. 10a is a summary screen of the selected configuration. The user may click the "Summary" tab or menu and one gets the menu across the top of the screen as shown in Figure 10b. "Set" may be clicked for a menu of items that may be set. "Sched" may be clicked as in FIG. 10c for a menu of scheduling items. One may click "Display" under "Set" in Figure 10b and get the screen of FIG. 10d where certain display options can be selected.

Figure 10I:
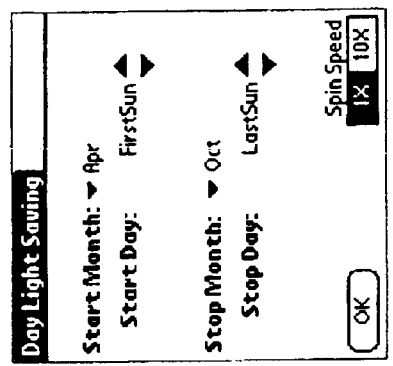
Figure 10J:
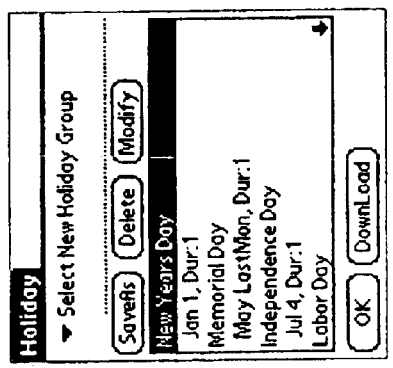
Figure 10G:
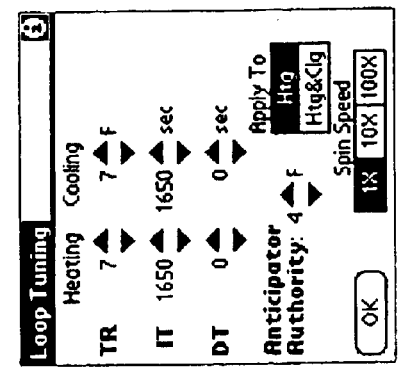
Figure 10H:
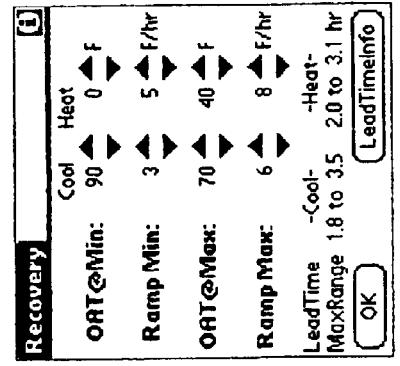
Figure 11A:
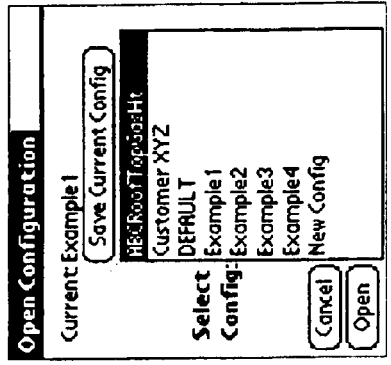
FIGS. 11a and 11b show screens for selecting units and locking default configuration files.
Figure 11B:
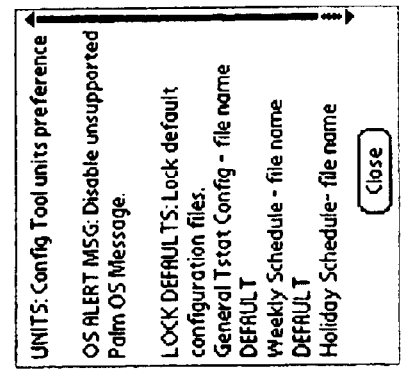

Clicking on dehumidification in Figure 10b, one may get the screen of FIG. 10e where one may select dehumidification options. Clicking on "EnergyMgmt" under "Set" may result in several choices in FIG. 10f, such as the demand limit control bump and the power failure sequence start. Loop tuning under set may bring forth a screen in Figure 10g where one may select appropriate set points. "Recovery" may be selected under "Sched" on the screen of FIG. 10c where one may select temperatures for starting cooling and heating based on outside air temperatures and ramping up and down rates, as in FIG. 10h. The daylight saving time selected under schedule may result in the screen as shown in FIG. 10i where the start and stop of daylight saving is to start and stop for the year. The "Holiday" selection under schedule may result in the list of holidays in FIG. 10j or 10l of which one may want to click on "Modify" to get the screen in FIG. 10k and thereby select the start time and duration of the selected holiday. The user may click on "Opt" in FIG. 10c and then click on "User Pref". Then one may select units, the OS alert message and the lock of defaults as shown in FIGS. 11a and 11b.

Figure 12C:
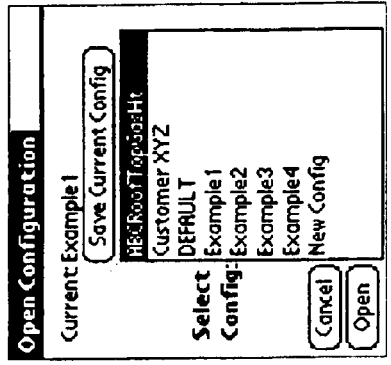
FIGS. 12b–12e are screens that show various actions that may be taken relative to a configuration.
Figure 12D:
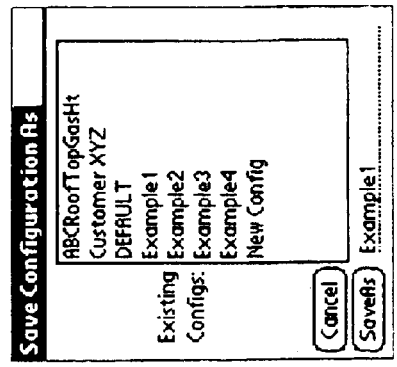
Figure 12A:
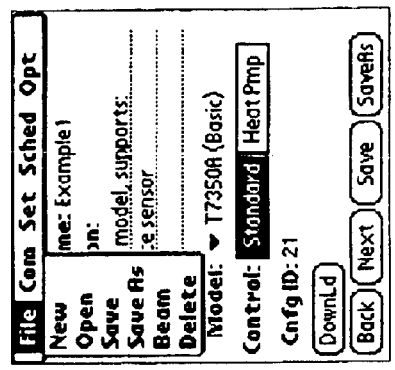
FIG. 12a shows a file command screen.
Figure 12B:
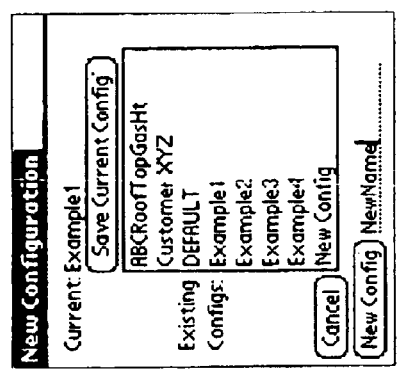

FIGS. 12a through 12c show file commands. One may click on "Summary" to get the menu which includes "File". A click may be applied to "New", "Open", "Save", "Save As", "Beam" or "Delete" relative to a configuration. FIGS. 12b, 12c, 12d and 12e show the resulting screens, respectively, to start a new configuration, open a current configuration, save a configuration as and delete a configuration.

Figure 13:
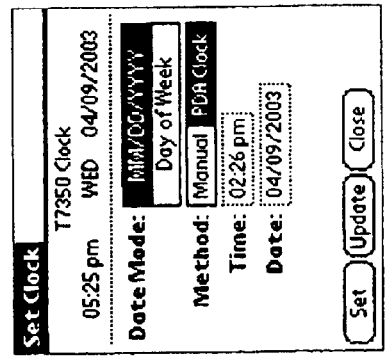
FIG. 13 relates to setting the time and date of the thermostat being configured.

The time clock may be set with configuration tool 12. However, the configuration tool should be connected to thermostat 11 so that the thermostat real time clock may be set. The calendar year, month and day may also be set. These settings may be effected by using the PDA 12 time or it may be entered manually. FIG. 13 shows the screen for the set clock mode.

Figure 14C:
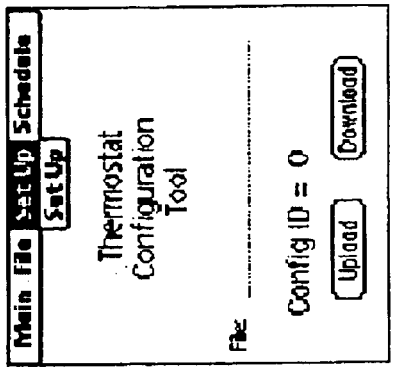
FIGS. 14a–14m are screens showing steps for scheduling various temperature set points on different days, selecting fan operation, selecting heating and cooling stages, selecting sensor location, loading the program for a particular facility and saving the current thermostat configuration.
Figure 14D:
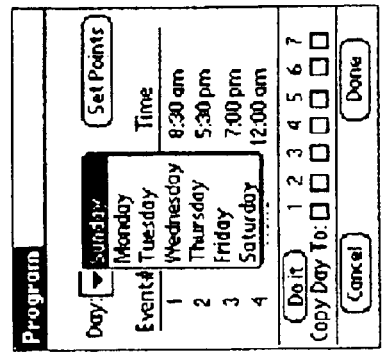
Figure 14A:
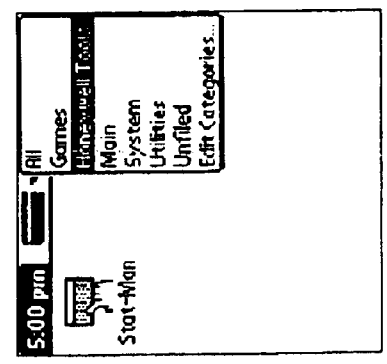
Figure 14B:
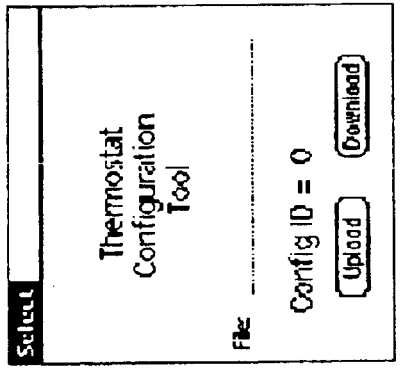
Figure 12E:
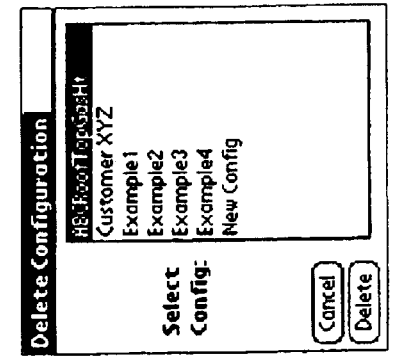
Figure 14E:
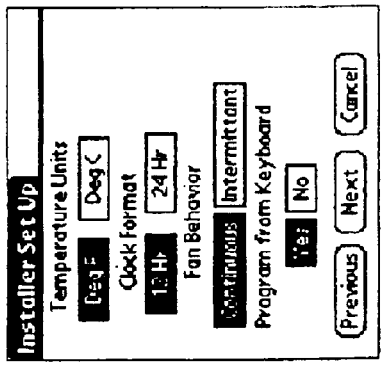
Figure 14F:
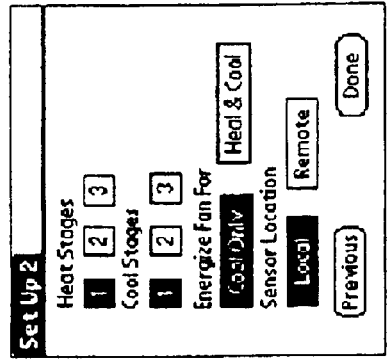
Figure 14G:
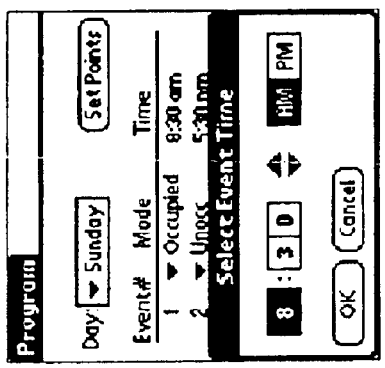
Figure 14H:
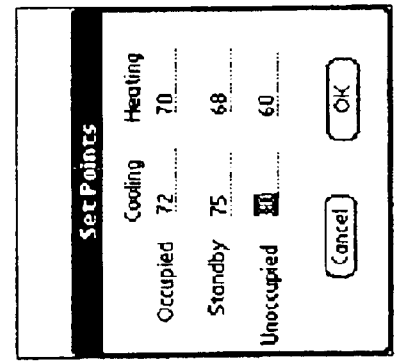
Figure 14I:
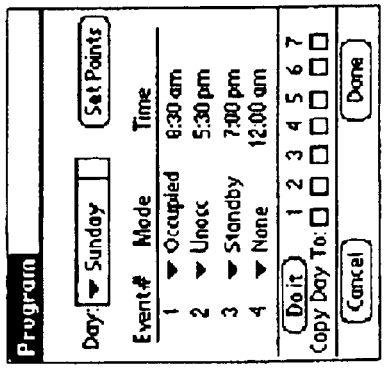
Figure 14J:
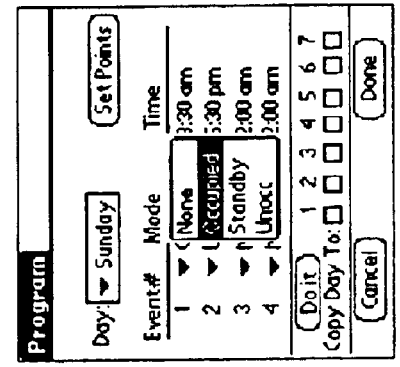

FIG. 14a shows a start-up screen for a tool on a Palm™ PDA 12. The main screen appears in FIG. 14b and one may upload a program from thermostat 11. Then "set up" may be selected in FIG. 14c and get to a program in FIG. 14d. One may select a day such as Sunday to schedule. FIG. 14e shows a schedule of Sunday and the occupied time may be selected, as in FIG. 14f. One may select the even time or time period for that occupied time in the screen of FIG. 14g and do the set points in the screen of FIG. 14h. One may also do the installer set up, for example, relative to the display in FIG. 14i. Setup 2 may include selecting the heat and cool stages, for energization selection and sensor location, as shown in FIG. 14j. Then one may load the program for a particular file, to be for the HVAC system for a particular location, such as a merchant, like "Standard 1", as indicated in FIG. 14k. The configuration for Standard 1 may be downloaded to the respective thermostat 11, as in FIG. 14l. This configuration may also be saved under a file name in FIG. 14m.

Figure 14O:
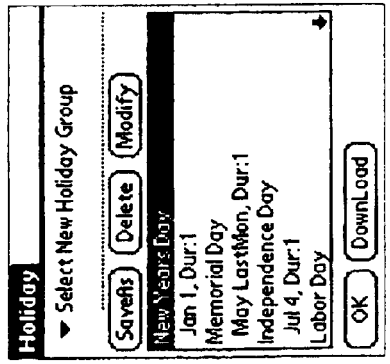
FIGS. 14n–14r are screens relating to the enabling of partial downloads after the opening screen.
Figure 14P:
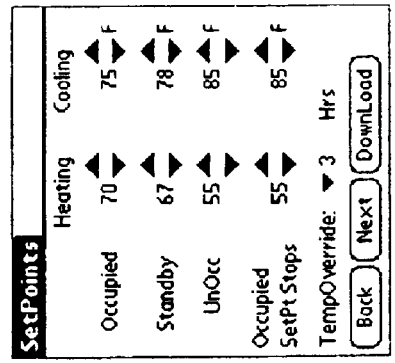
Figure 14M:
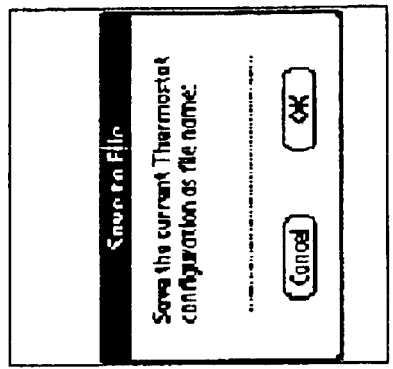
Figure 14N:
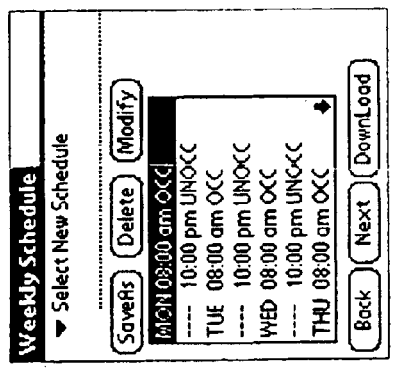
Figure 14K:
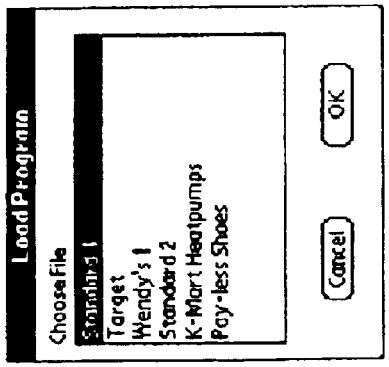
Figure 14L:
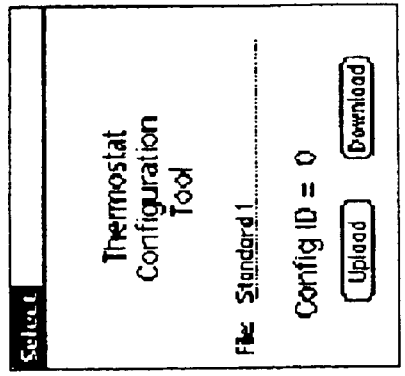
Figure 14Q:
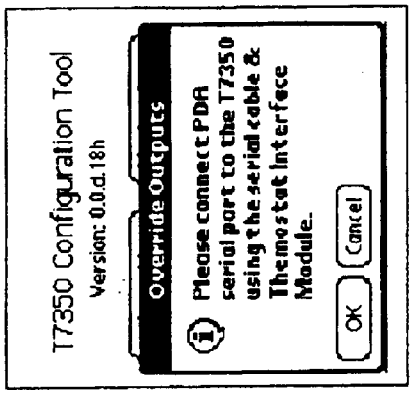
Figure 14R:
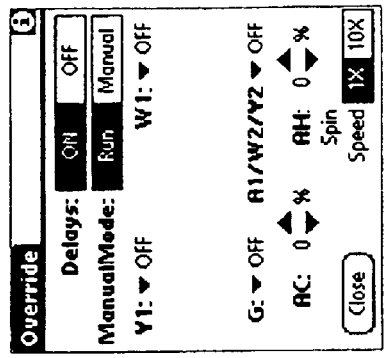
Figure 14S:
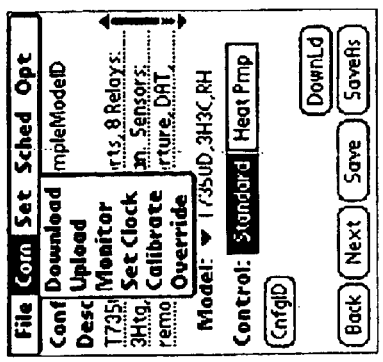
FIGS. 14s–14z are screens pertaining to various override options.
Figure 14T:
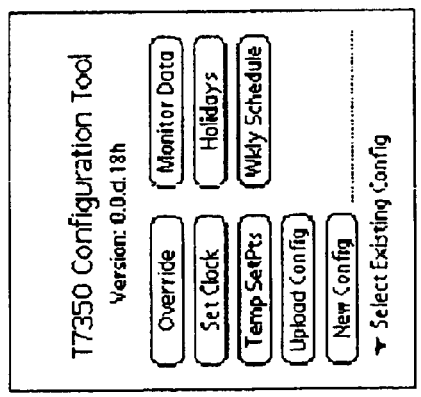

FIGS. 14n, 14o and 14p show screens about the enabling of partial downloads after the opening screen. Partial downloads may include weekly schedule, holiday and set points. FIG. 14q has "Home" added to the Set menu for returning to the opening screen in FIG. 14r. The user may be asked to save the current configuration before moving on.

Figure 14U:
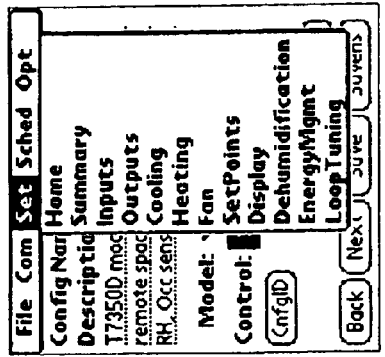
Figure 14V:
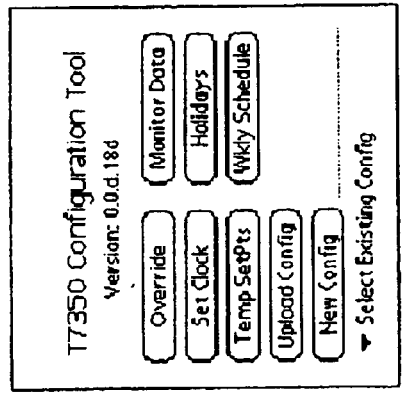
Figure 14Y:
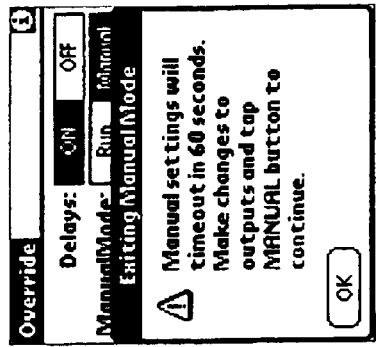
Figure 14Z:
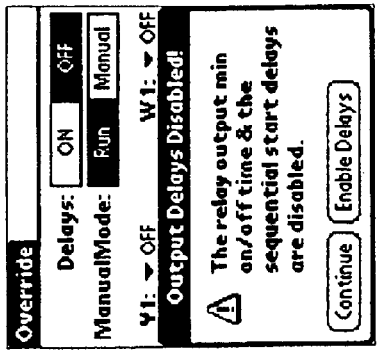
Figure 14W:
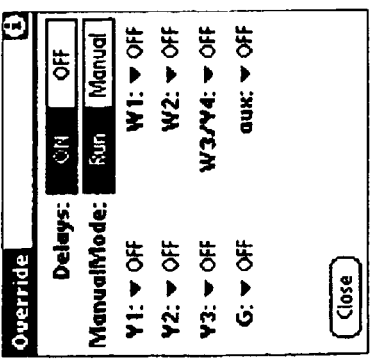
Figure 14X:
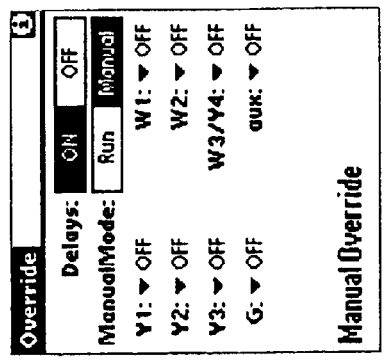

PDA tool 12 may support thermostat field commissioning tasks including a temporary checkout mode (such as eliminating time delays) as well as a manual output mode. FIGS. 14s–14z are screens supporting an override option scenario. The screen of FIG. 14s or 14t may provide the menu or home screen, respectively, for selecting an override option. FIG. 14u shows the connection message. FIGS. 14v and 14w reveal override screens for "Mod SubBase" and "3H3C SubBase", respectively. In the override screen of FIG. 14x, the user may tap the manual button. Tapping the screen of FIG. 14y may let the user exit the manual mode. The screen of FIG. 14z may warn the user if there is an exit with delays off or disabled.

Configuration tool 12 may be connected to thermostat 11 to read an online status report. The status report may include data, but not limited to, such as the thermostat firmware version, thermostat hardware version, sub-base hardware version, run time error messages, space temperature, remote temperature set point input, discharge air temperature, outside air temperature, number of heating stages active, heating capacity output in percent, number of cooling stages active, cooling capacity in terms of percent, remote space relative humidity in percent, occupancy status (on or off), effective fan setting (on, off or auto), fan status (on or off), mode (heating or cooling), economizer logic state (on or off), occupancy override status, and run time data. The configuration arrangement and/or the online status report may be transferred (HotSync) to, for instance, a Palm™ or desktop PC application or to another PDA 12, via light beam technology or other ways. Thermostat configuration summaries may be saved to a Palm™ memo, which may also be similarly transferred. There may be a password or other security approach to prevent other PDA users from changing the default files established by the local control manager.

PDA 12 may be connected to thermostat 11 to make limited changes, such as one or several configuration parameters, holiday schedules, weekly schedules, operating mode, temperature settings, and so forth. The PDA 12 tool may support thermostat field commissioning tasks including a check-out mode (eliminating time delays during check-out). The check-out mode may be automatic or manual. Table 24 shows a configuration option with related information.

TABLE 24

| Config Option | Default | Min | Max | Res | Units | Description |
|---|---|---|---|---|---|---|
| DisableDelays | 0 | 0 | 1 | 1 | | 0: Not in system Checkout Mode 1: In System Checkout Mode (disable delays on relays, sequential start, . . . etc) |
| ManualMode | 0 | 0 | 2 | 1 | | There may be a couple of bits for mode: 0 = Run, 1 = manual, 2 = Factorytest. |
| ManualMode | 0 | 0 | 2 | 1 | | Each relay/AO labeled on the Palm like it is on the Stat. So the Palm would determine if it is a Heat pump or conventional and then display the labels. |
| ManualMode | 0 | 0 | 2 | 1 | | Will provide a Manual Mode to turn on/off each output. The user enters and exits manual mode using the Palm™ OS Configuration Tool. |

TABLE 24-continued

| Config Option | Default | Min | Max | Res | Units | Description |
|---|---|---|---|---|---|---|
| | | | | | | The T7350 automatically terminates manual mode if periodic updates are not received or the user disconnects the serial cable from the Palm™ OS Configuration Tool. |
| ManualMode | 0 | 0 | 2 | 1 | | Manual Mode is not a flashed "permanent" state. Manual mode or test-speedup mode is not remembered through a power down or restart. |
| Relay1 | 0 | 0 | 1 | 1 | | There will be 8 bits (1 byte) for the 8 relays. 0 = off 1 = On |
| Relay2 | 0 | 0 | 1 | 1 | | |
| Relay3 | 0 | 0 | 1 | 1 | | |
| Relay4 | 0 | 0 | 1 | 1 | | |
| Relay5 | 0 | 0 | 1 | 1 | | |
| Relay6 | 0 | 0 | 1 | 1 | | |
| Relay7 | 0 | 0 | 1 | 1 | | |
| ModOut1 | 0 | 0 | 100 | 1 | % | There will be 2 bytes for the modulating outputs: 0–100% each. When thermostat sees mode change to manual, it may set the outputs to the values specified. |
| ModOut2 | 0 | 0 | 100 | 1 | % | |

One may monitor thermostat operating data to determine the health of the thermostat. Tables 25 and 26 indicate the various configuration items and parameters that may be monitored. Table 25 shows the input data that may be monitored.

TABLE 25

| Min | Max | Res | Units | Description |
|---|---|---|---|---|
| | | | | Space Temperature Remote temperature setpoint input DAT OAT Space RH % Occupancy sensor Satus (on/off) Fan status (on/off) Occupancy override status |

Table 26 shows the items and output data that may be monitored. Operating modes may likewise be monitored.

TABLE 26

| Min | Max | Res | Units | Description |
|---|---|---|---|---|
| | | | | # of heating stages active Heating capacity output % # of cooling stages active Cooling capacity output % Economizer logic state (on/off) |

Table 27 lists some models and their data that may be monitored.

TABLE 27

| Min | Max | Res | Units | Description |
|---|---|---|---|---|
| | | | | Dehumidification: Reheat |
| | | | | Dehumidification: SetPoint Reset |
| | | | | Dehumidification: Min On Time |
| | | | | Extended |
| | | | | Recovery Mode |
| | | | | Operational Mode: Heating/Cooling |
| | | | | Effective Setpoint |
| | | | | DLC |
| | | | | Real Time |
| | | | | Operating Date |
| | | | | Heating Lockout Mode |
| | | | | Cooling Lockout Mode |

Thermostat operating data may be monitored. A table 28 may provide data values with display dependency rules.

TABLE 28

| Thermostat Data | Display | Display Dependency | Report Test Description | Comments |
|---|---|---|---|---|
| version.major | A | | FirmwareVersion:0.0.19 | |
| version.minor | | | | |
| version.bug | | | | |
| version.commVer | V | | ComVersion: 1 | |
| version.rePgmrVer | V | | ReProgrammerVersion: | |
| status3.subBaseType | A | | SubBaseID: T7350D,3H3C | |
| subBase.connected | V | | CommunicatingSubBase:Yes | |
| statusAnalog.spaceTemp | A | | RoomTempemture: 75 F. | |
| statusAnalog.dischTemp | D | configured | DischargeAirTemp: 105 F. | config.discAirSensor |
| statusAnalog.spaceHumidity | D | configured | Room RH: 33% | config.humiditySensor |
| statusAnalog.oDTemp | D | configured | OutdoorAir: 25 F. | config.oDAirSensor |
| statusAnalog.remoteStPtOffset | D | configured | RemoteSetPtOffset: 2 F. | config.remoteSetPoint |
| statusAnalog.temporarySetPt | D | value <> 0 | TemporarySetPt: 76 F. | Display actual temporary setpoint if Delta value <> 0 |
| status1.totalError | N | | | Total error reported by the control loop. |
| status1.bypassTime | D | value > 0 | BypassTime: 180 min | |
| status1.tuncos | N | | | Time until next scheduled change of occupancy state: |
| status1.DaysLeftKeypadHoliday | D | value > 0 | HolidayDaysRemaining: 7 | |
| status1.currentState | A | | TimeSchedule: OCC | Current scheduled occupancy state 0: OCC 1: UNOCC 2: BYPASS 3: STANDBY 7: OCCNUL |
| status1.nextState | N | | | |
| status1.occSensor | D | configured | OccSensor: 0 | config.occSensor = 1 |
| status1.holiday | N | | | |
| status2.heatStgsOn | A | configured | HeatingStagesActive: 2 | |
| | D | configured | AuxHeatingStagesActive: 2 | Control = HeatPump |
| status2.coolStgsOn | A | configured | CoolingStagesActive: 1 | |
| status2.percentCmdHeat | D | configured | HeatingOutput: 57% | SubBaseID = M |
| status2.percentCmdCool | D | configured | CoolingOutput: 33% | SubBaseID = M |
| status2.outFan | N | | | |
| status2.outCool1 | N | | | |
| status2.outCool2 | N | | | |
| status2.outCool3 | N | | | |
| status2.outAux | A | | | |
| status2.outHeat1 | D | configured | O/BChangeoverOver: ON | Control = heatpump config.heatPump |
| status2.outHeat2 | N | | | |
| status2.outHeat3 | N | | | |
| status2.effMode | A | | EffectiveMode: Cool | Effective operating mode: 0: OFF_MODE 1: COOL_MODE 2: HEAT_MODE 3: EMERG_HEAT_MODE 4: REHEAT 5: MANUAL 6: FACTORY TEST |
| status2.fan | A | | FanStatus: ON | |
| status2.auxRelay | D | configured | Economizer: ON | NotHeatPump AND Subbase > 1 config.auxOpMode = 1 |
| | D | configured | HotGasDehumidification: ON | config.auxOpMode = 2 |

TABLE 28-continued

| Thermostat Data | Display | Display Dependency | Report Test Description | Comments |
|---|---|---|---|---|
| | D | configured | SimpleDehumidification: ON | config.auxOpMode = 3 |
| | D | configured | TimeOfDayContact: ON | config.auxOpMode = 0 |
| status2.unused1 | N | | | |
| status2.stagesActive | N | configured | | |
| status2.noAuxHeat1 | N | | | |
| status2.noAuxHeat2 | N | | | |
| status2.dehumidActive | N | configured | Dehumidification: ON | RH sensor configured |
| status2.DALimit | D | configured | DishargeAirLimiting: ON | config.enableDALotLimit = 1 OR config.enableDAHLimit = 1 |
| status2.unused2 | N | | | |
| status3.effOccTuncos | N | | | |
| status3.effSetPt_s6 | A | | EffectiveSetPoint: 72 F. | |
| status3.effOccCurrentState | A | | EffectiveOccupancy: OCC | |
| status3.unused1 | N | | | |
| status3.effOccNextState | N | | | |
| status3.unused2 | N | | | |
| status4.erminalLoad | V | | | |

Display Key:
A - Always display
D - Display based on context Dependency
N - Never displayed
V - Verbose mode only One may backup thermostat configuration files from PDA 12 to a PC. These PDA configuration files may be restored in the event of battery failure or PDA demise or loss. If the latter occurs, one may go to a store and purchase another PDA and upload the files from the PC, and continue about the business with the new PDA.

A PC archive of thermostat configuration information may have several benefits. The PC archive database may support multiple PDA users. Individual thermostat configuration files may be organized in groups by customer building or project name. PDA users may from such database select individual configurations and incrementally install them on a specific PDA using the PC hot sync function. The function may be hardwired or be an IR or other wireless method. Other connective functions may be implemented. There may be last session information. In other words, the PDA or PC user may be returned to the last edited configuration file and last used configuration screen. Also, a list of the last five or so configuration files opened by the user may be presented upon going into the configuration program. There may also be various warnings about the adequacy of the PDA hardware and software.

The PDA user may be able to field calibrate analog outputs. For high accuracy on the analog outputs or inputs, the user may modify gain and offset constraints. For instance, the user may field calibrate the humidity sensor. The user may be able to add an offset to the sensor reading. Various abbreviated titles, terms and acronyms may be connected by PDA 12 with a button toggle to obtain the full title or meaning. For instance, one may toggle on "LeadTimeInfo" to get "Lead Time Table of Information."

PDA 12 may not only upload a configuration from thermostat 11, but it may be able to upload a contractor's name, logo and telephone number. This information may be presented on the screen of PDA 12. Also, it may likewise be displayable on thermostat 11. Such information may be useful in case there is a thermostat problem, regular preventive maintenance or routine check scheduled, filter change needed, a seasonal configuration change, or other items in which contacting a contractor could be helpful.

Figure 15:
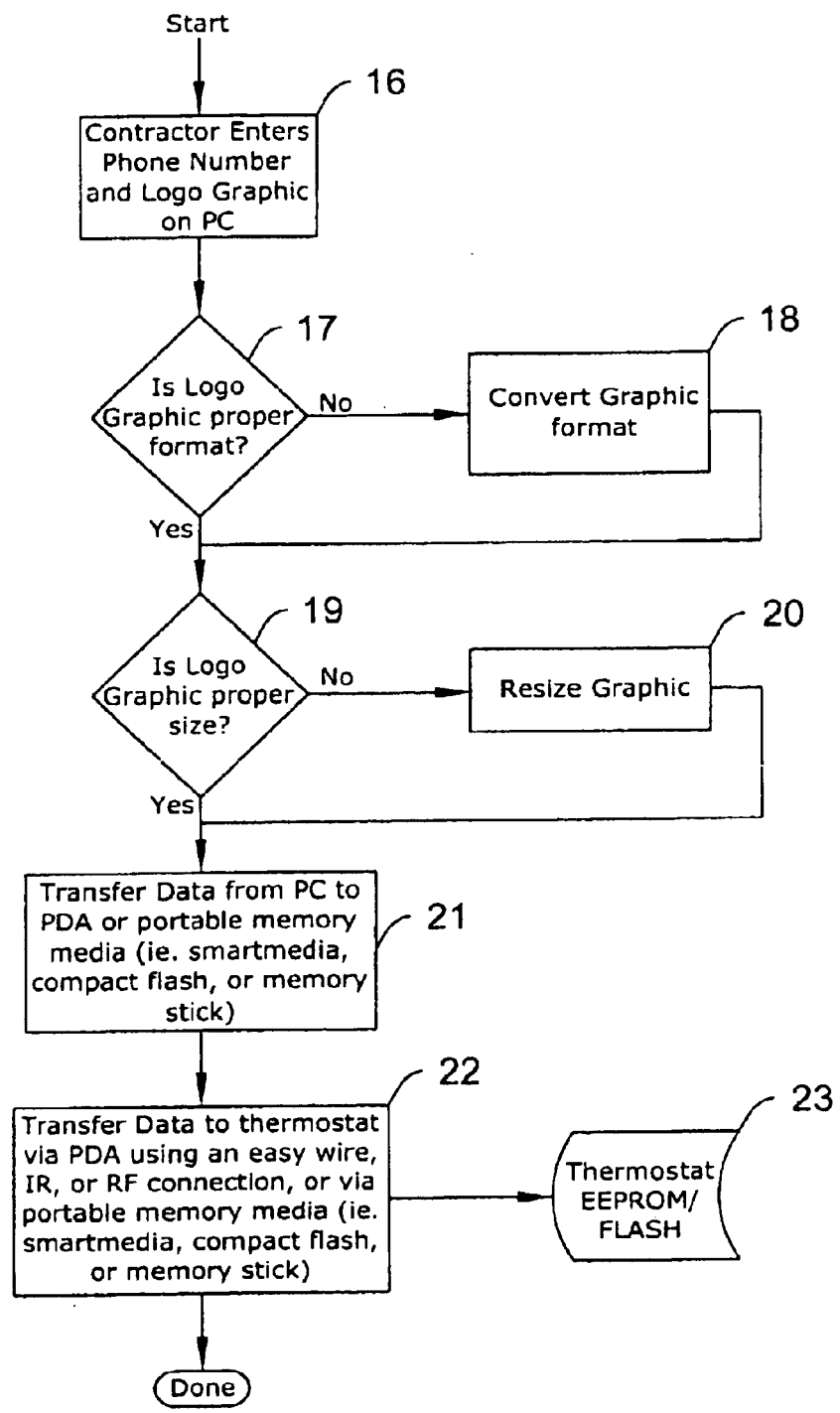
FIG. 15 is a flow chart of formation and downloading contractor information to a thermostat.

FIG. 15 is a flow diagram of an entry of a contractor's phone number and logo graphic (and possibly additional information) on a PC at block 16. The format of the logo graphic may be checked at junction 17. If the format is not proper, then it may be converted at block 18. If or when the format is proper, then it may be checked for size at junction 19. If the logo is not the correct size, then it is not resized at block 20. If and when the logo is of acceptable size, then the contractor information may be stored in the PC. At block 21, the contractor information may be transferred as data from the PC to a PDA or portable memory media (e.g., smart media, compact flash or a memory stick). At block or step 22, the contractor information data may be transferred to thermostat 11 EEPROM/FLASH 23 via PDA 12 using an easy wire, IR or RF connection, or via a portable memory.

The electronic thermostat assembly may consist of two pieces, the cover assembly 30 and sub-base 14. The cover assembly may include, but is not limited to, the MMI and a display 38 for 7-day programming. Assembly 30 and display 38 are shown in FIGS. 17b and 17a, respectively. The sub-base(s) include the equipment control connections. The sub-base is mounted on the wall and the thermostat cover assembly is mounted on the sub-base. Different sub-bases will be used for different applications including; up to 3 heating stages/3 cooling stages or 2 heating stages/4 cooling stages, modulating outputs, and dehumidification high limit control. Each sub-base is compatible with the common cover assembly.

There may be a disable delay/sequential start option. This may allow faster testing in the field by disabling the minimum on/off time delays for relay outputs a nd the sequential start delay. The rate at which the control algorithm runs (once every 10 seconds) determines the rate at which stages cycle on and off. Other test options may include the following.

The installer may enter the disable delay option by pressing a special combination of keys and selecting "intest" and then pressing the "run" key. The installer may exit the disable delay option by pressing a special combination of keys and selecting "no-test" and then pressing the run key.

There may be a capability to field flash thermostat 11 from the serial port. This may allow the user to upgrade the firmware in the field. Initially, a lap-top PC 24, running a special program may be used to connect to the thermostat serial port. Later, a program may be developed to do this through the Palm™ OS configuration tool. Schedule programming, installer configuration options, set points, system switch, fan switch, and keypad lockout may all be field adjustable through the thermostat keypad/LCD or a Palm™ OS configuration tool. Some parameters may be configured and monitored only through the Palm™ OS configuration tool. Others can be configured and so monitored from both the keypad/LCD and Palms OS configuration tool 12.

Figure 16:
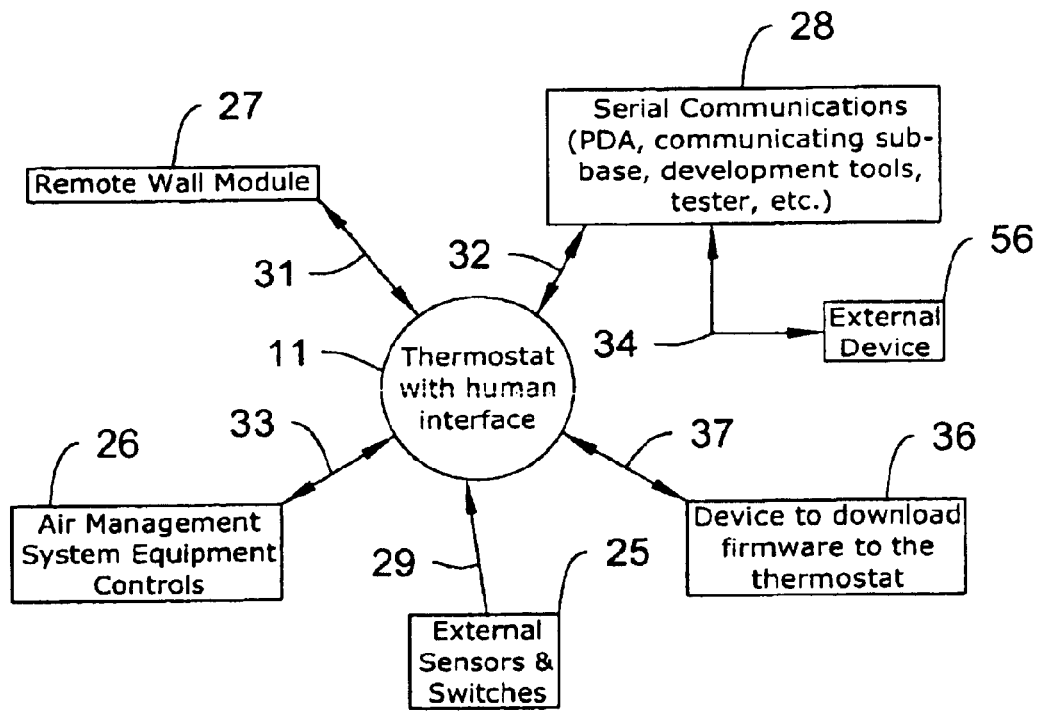
FIG. 16 is a diagram showing the major components and communication channels of the thermostat.

FIG. 16 is a thermostat system level diagram with major components and a system communications overview. Thermostat 11 may interface with remote air management system or HVAC equipment controls 26, external sensors and switches 25, and a remote wall module 27. Signals, including commands to equipment, between thermostat 11 and air management or HVAC controls 26 may be via connection 33. External sensors and switches 25 may include discharge air temperature, outdoor air temperature, humidity and occupancy sensor. Information from sensors and switches 25 may be conveyed along connection 29 to thermostat 11. Remote wall module 27 may include a temperature sensor, an override switch with an LED and a warmer/cooler (set point offset) knob, with related information being conveyed between module 27 and thermostat 11 along connection 31.

Thermostat 11 may have a serial communications set-up or interface module 28 to allow inboard and outboard information to go between thermostat 11 and set-up 28 along a connection 32. Communications between set-up or module 28 and an external device 56, such as an installer configuration tool 12 and a communicating sub-base 14, may be via a connection 34. Firmware to thermostat 11 may be downloaded form an appropriate device 36 via a JTAG interface connection 37.

Thermostat 11 may be configured using an "Installer Setup" through the thermostat keys on cover assembly 30 for basic setup functions. More advanced features may be available through installer configuration tool 12. Installer configuration tool 12 may be compatible with a Palm™ OS handheld computer.

There may be a thermostat 11 output modulation control. This approach may solve problems associated with control issues by sending analog heating and cooling signals to be implemented by controls of an air management system or roof top unit 40 of FIG. 21. System or unit 40 may have a duct 39 for taking in outside air (OA), a duct 41 for taking in return air (RA) of a space, and a duct 42 for discharging air (DA). Unit 40 includes a cooling unit 43 and a heating unit 44. Several enhancements and options may exist in the algorithm and thermostat configuration to assist and lead to control of water valves and oversized heating coils and loads. There may be various approaches for implementing analog output and modulation in a thermostat. One may use configuration codes in the sub-base combined with a configuration tool and interchangeable sub-bases.

The present electronic thermostat system may consist of two components, thermostat 11 and the sub-base 14. The thermostat may include a human interface and display for user programming, the microprocessor, four relays, a space sensor and a power supply. The sub-base may include equipment control connections, additional relays, optional analog output, and some power supply components. The sub-base may be mounted on the wall and the thermostat may be mounted on the sub-base. Different sub-base types may be used for different applications including up to three heat/three cool or two heat/four cool, modulating outputs, dehumidification high limit control, and communications with a building automation system. All sub-base types may be compatible with the thermostat.

A Palm™ PDA may be connected to the thermostat and be used to configure or program the thermostat. The communications port may be used by the factory to test the hardware features of the device. An optional remote wall module may be attached to the device to sense space temperature, control the set point, initiate a schedule override timer, and display the status of the override timer.

Thermostat 11 of FIG. 1 may contain a software component in the thermostat that allows automatic configuration of the output actuation type (modulation and discrete) identified by the sub-base with preset configuration resistors. Additional configuration information may be provided in the Palm™ configuration tool that allows setting of the parameters related to the modulating outputs. The following table reveals the various options for the sub-bases.

TABLE 29

| Installer Configuration Option | Sub-base 1 | Sub-base 2 | Sub-base 3 | Sub-base 4 |
| --- | --- | --- | --- | --- |
| Heating output stages | 1 | 2 | 3 | 0 |
| Cooling Output stages | 1 | 2 | 3 | 0 |
| Heating Throttling Range ® | 3 | 4 | 7 | 5 |
| Cooling Throttling Range ® | 3 | 4 | 7 | 5 |

The next table relates to modulating system valve control.

TABLE 30

| Cooling Valve | Applies to the modulating Cooling valve<br>0 = direct acting.<br>1 = reverse acting. |
| --- | --- |
| Heating Valve | Applies to the modulating Heating valve<br>0 = direct acting.<br>1 = reverse acting. |

The hardware component of the output actuation may be implemented though an analog output set. The microprocessor may output the signal as a duty cycle signal that is driven into a digital to analog conversion circuit.

This system may solve the problems associated with control issues by implementing a true analog heating and cooling signal to be implemented by the roof top 40 control system. Several enhancements and options exist in the algorithm and thermostat configuration to assist and lead to control of water valve control and oversized heating coils and loads. Under staging conditions, traditional control algorithm techniques may be used to control the on/off control to the heating coils, cooling coils and fan. When used in a modulating configuration, special analog driver circuits may allow the output from the thermostat to provide 4 to 20 milliamps and 2 to 10 volts for direct interfacing for the control of modulated components. These control parameters are popular ranges for many modulated dampers and valves used in air management systems, such as HVACs.

The thermostat may contain a software component that allows automatic configuration of the output actuation type (modulation and discrete) identified by the sub-base with preset configuration resistors. The hardware component of the output actuation may be implemented through an analog interface set from the thermostat. Analog control and interface to the modulation may be controlled through software algorithm PID and staging information. If additional heating is desired after a stage is added at low load, additional supply is available through increasing of the analog heating signal. Applications of this modulating thermostat may be used for boiler firing rate controls and other energy supply or cooling type equipment. Through the use of programmable memory, additional algorithms can be developed to apply to a wide range and variety of control applications besides air management system control.

The present thermostat may provide modulated/analog control of an air management system and discrete/digital control of the same or another air management system. This thermostat may provide modulating control of a single stage of heating and/or cooling. On the other hand, this thermostat may provide modulating control of multiple stages of heating and cooling. Using a modulating signal to control each cooling or heating stage may result in maintaining the outputs of the controlled stages at efficient levels. If more output is needed from that stage, the thermostat may, with a modulating output, call on another stage and control it for more heating or cooling, so as to maintain the better efficiency of the first stage by not increasing the modulating output to the first stage to increase its output. Also, modulated control may result in the next stage's approaching an efficient level of output. This approach may continue for more or less output as needed from the respective stages. The thermostat may provide analog or digital signals for controlling single or multiple cooling or heating stages. The thermostat may have any combination or all of these features.

Figure 17:
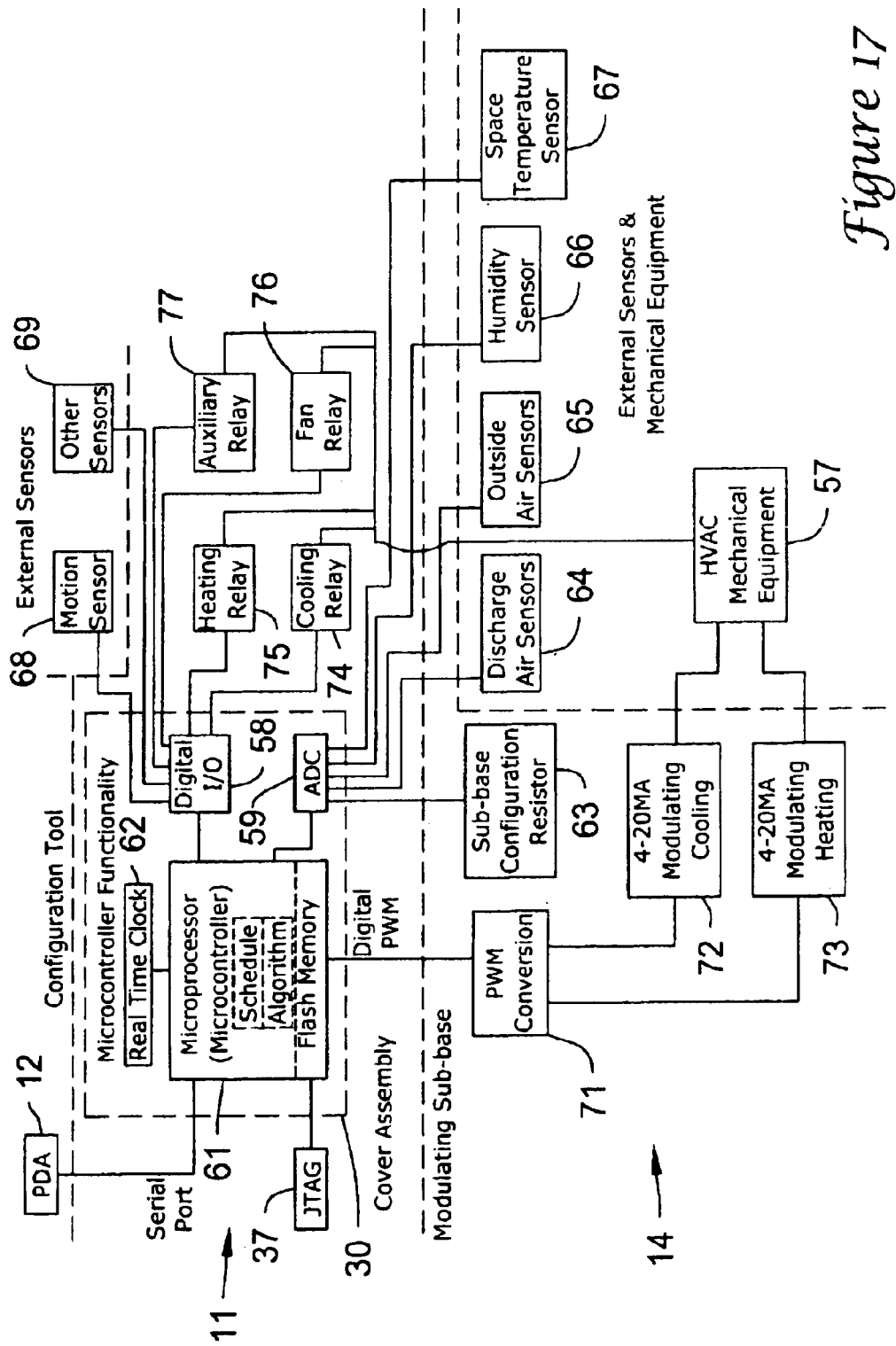
FIG. 17 is a block diagram of a modulating thermostat system.

FIG. 17 is a block diagram of a modulating commercial thermostat system. The system is composed of several major components including a Honeywell™ T7350 thermostat 11, a configuration tool (PDA) 12, and external mechanical equipment 57. Thermostat 11 may be composed of several major sections including a cover assembly 30, modulating sub-base 14 and external sensors. External sensors may include discharge air sensors 64, outside air sensors 65, a humidity sensor 66, and a space temperature sensor 67. These sensors may be connected to an analog-to-digital converter (ADC) 59. Within a cover assembly 30, a microprocessor 61 may contain the software instructions that control the interface between the control algorithm and the ADC and digital input/output (I/O) blocks 59 and 58, respectively. Microprocessor 61 may be a microcontroller having a schedule and an algorithm, and a flash memory. A JTAG connection 37 to microprocessor 61 may allow upgradeable field programming and real time emulation of operation. A real-time clock 62 may be connected to processor 61. Sub-base 14 configuration resistor 63 may be read on power-up and provide an indication of a unique resistor value that indicates the presence of a modulating sub-base.

ADC block 59 may convert the incoming analog resistance values into digital values that can be read by microprocessor 61. The analog resistors values to ADC 59 may come from discharge air sensors 64, outside air sensors 65, humidity sensor 66, space temperature sensor 67, motion sensor 68, and other sensors 69. Another analog input to ADC 59 may be from sub-base configuration resistor 63. A modulation signal may be derived from a pulse width modulated (PWM) signal conversion circuit which converts the time-multiplexed duty cycled signal from the algorithm of processor 61 into a 4–20 milliampere (mA) modulating signal. The 4–20 mA signals may be fed, via the modulating cooling interface 72 and modulating heating interface 73, to HVAC mechanical equipment 57 and may be used to control space temperature with analog control dampers among other HVAC mechanical equipment 57, as needed. A digital I/O 58 may be connected to microprocessor 61. A motion sensor 68 and other external sensors 69 may provide signals to processor 61 via digital I/O 58. Processor 61 may provide signals to cooling relay 74, heating relay 75, fan relay 76 and auxiliary relay 77. The outputs of these relays may be connected to HVAC mechanical equipment 57.

Since modulating control of both heating and cooling valves may be under microprocessor 61 control via modulating cooling and heating interfaces 72 and 73, respectively, and since thermostat 11 may be capable of humidity control, the thermostat can in general control or limit humidity effectively through the use of modulating the cooling as necessary to reduce the humidity of the outside air that typically accounts for most of the humidity load in a commercial building. Different strategies may be used to do dehumidification control including the use of both heating and cooling relays and heating and cooling modulating valves in different ratios. Modulation of dampers to control the volume of air per unit of time through the cooling mechanism may also be used for dehumidification control.

Figure 18:
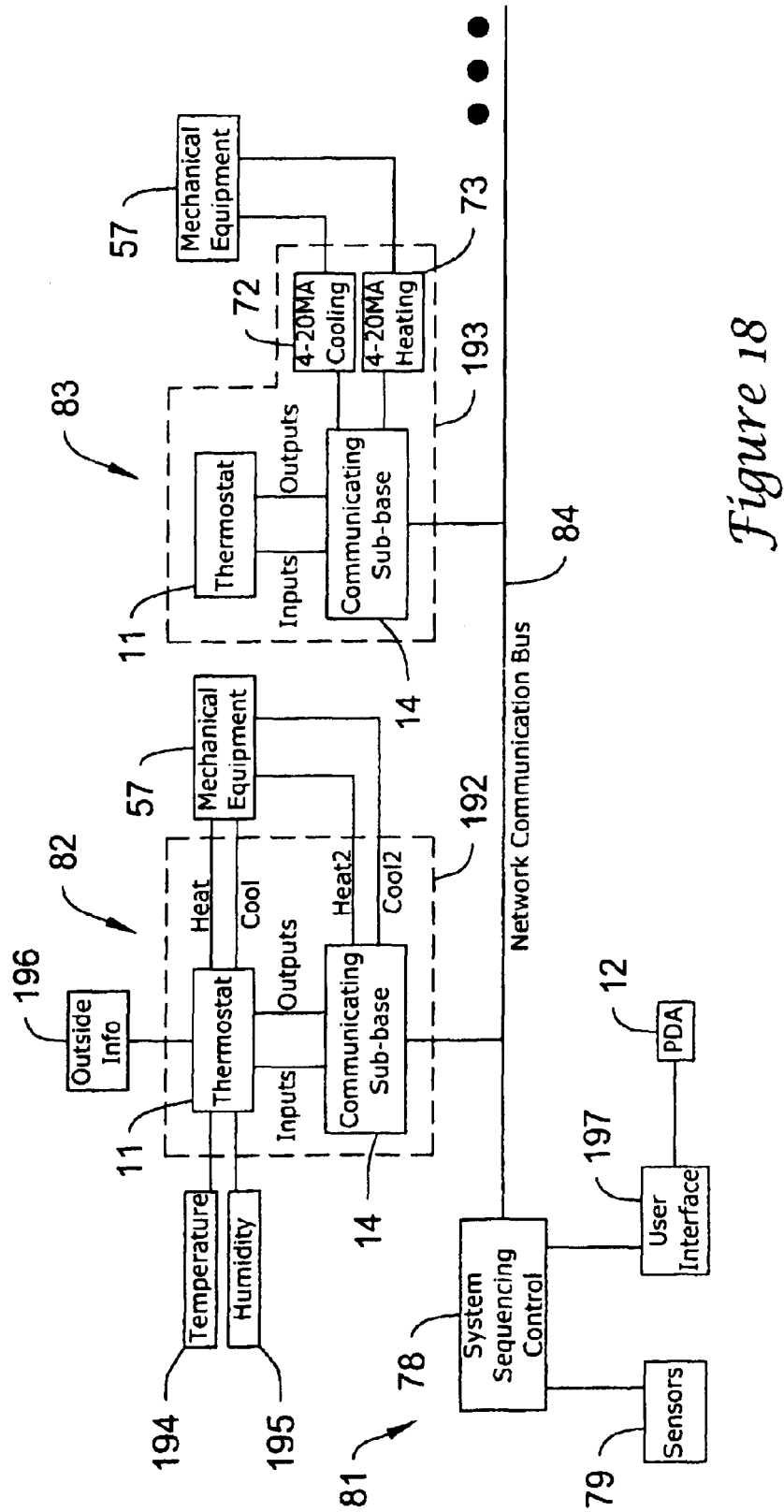
FIG. 18 is a block diagram of a networked modulating and non-modulating thermostat system.

FIG. 18 is a block diagram of the networked modulating thermostat. Components associated with thermostat 11 may include the system sequencing control 78, which may be a Lonworks™ communicating node that allows network information to be shared on a network communications bus 84 in the form of "network variables". Standard network variables may exist for standard representations of temperature, humidity, and digital on/off and analog values. Sequencer 78 may have a local sensors 79 connection. The availability of modulating controls may allow for a master sequencing control 78 node to make staging and modulating decisions for the whole system based on local sensors. Also, local sensor information may be shared on a one-to-one, or one-to-many basis using a Lonworks™ process called "binding". It may allow, for instance, the outside air temperature and outside humidity signals to be shared across multiple controllers, including information for temperature and humidity control for individual nodes 82 and 83. Controller 192 may be associated with node 82. Controller 192 may have a thermostat 11 and a sub-base 14 which are set up for two stage cooling and two stage heating. Mechanical equipment 57 may be driven with digital-like, discrete, non-modulated signals from controller 192. Sources 194, 195 and 196 connected to thermostat 11 may provide temperature, humidity and outside parameter information, respectively, to controller 192. Other controllers on bus 84 may likewise have such sources connected to them. Also, a controller 193 may be associated with node 83. Controller 193 may have a thermostat 11 and a sub-base 14 which are set up for modulated one stage cooling and heating. Mechanical equipment 57 may be driven with analog, modulated signals from controller 193. Thermostat 11 of controllers 192 and 193 may be the same thermostat or different thermostats. If these controllers have the same thermostat, that thermostat may have the capability of controlling both non-modulated air management systems and modulated air management systems.

In FIG. 18, there may be numerous other nodes having additional controllers (though not explicitly shown) associated with them, respectively. The controllers may output non-modulated or modulated control signals to their respective mechanical equipment which may consist of HVACs, respectively, having valves and/or dampers controlled by signal outputs from their corresponding controllers. Often, the air management systems, such as HVACs, that are recipients of the non-modulated control signals, are multiple stage cooling and heating systems. And often, the air management systems, such as HVACs, that are recipients of the modulated control signals, are single unit cooling and heating systems. However, in lieu of the latter single unit systems, there may be modulated multiple stage cooling and heating systems. Both modulated and non-modulated systems may also have humidity control.

Sequencing information may be collected from sensors 79 on node 81 or network binding sensors to allow for sequential staging and algorithm enhancements. Local and non-local sensors may be those for measuring temperature and humidity, and other parameters. The sensors may be situated in various locations such as outside, the controlled space and in or proximate to the air management equipment. Since the individual nodes may command analog and digital values from both the local node and the system node, the system node can command individual node analog and digital values as required in temperature (and sometimes humidity and other parameter) control systems, such as HVACS.

System sequence control 78 may be a controller configured as a sequencer with controllers 192, 193 and others added and connected to the network communications bus 84. Controllers 192, 193 and the like may act as individual controllers which periodically send status messages to sequencer 78. Also, sequencer 78 may periodically send information, instructions and commands to controllers 192, 193 and other like controllers, if any. Such information, instructions or commands may affect the respective controller's control of mechanical equipment 57 of an HVAC or other air management equipment.

Sequencer 78 may also control a multi-stage heating and cooling system via thermostat(s). That is, there may be modulated control of each stage of heating and cooling. The percentage a stage's maximum output may be somewhat less than 100 percent. That percentage may be determined, for example, by an effective operating efficiency singly or in combination with one or more other stages. Other bases may be used for determined the percentage of maximum operation of a stage. The percentages may be different among the stages and dependent upon parameters such as temperatures, humidity and so forth. Sequence control may also be of non-modulated stages or of a mix of modulated and non-modulated stages. The sequence may be utilized for air management systems having humidity control. A user interface 197, similar to interface 30, having a keyboard and a display, may be connected to sequencer 78 for programming, configuring and testing the sequencer and associated controllers on communications bus 84. A personal digital assistant (e.g., PDA 12) may be connected to user interface 197 or directly to sequencer 78 for programming, configuring and testing the sequencer and associated controllers on communications bus 84. The connection of the PDA to interface 197 or sequencer 78 may be via a wire or wireless medium (e.g., RF, infrared or optical fiber). Each thermostat 11 associated with bus 84 may likewise have a user interface 30 and PDA 12 as disclosed herein.

Figure 19:
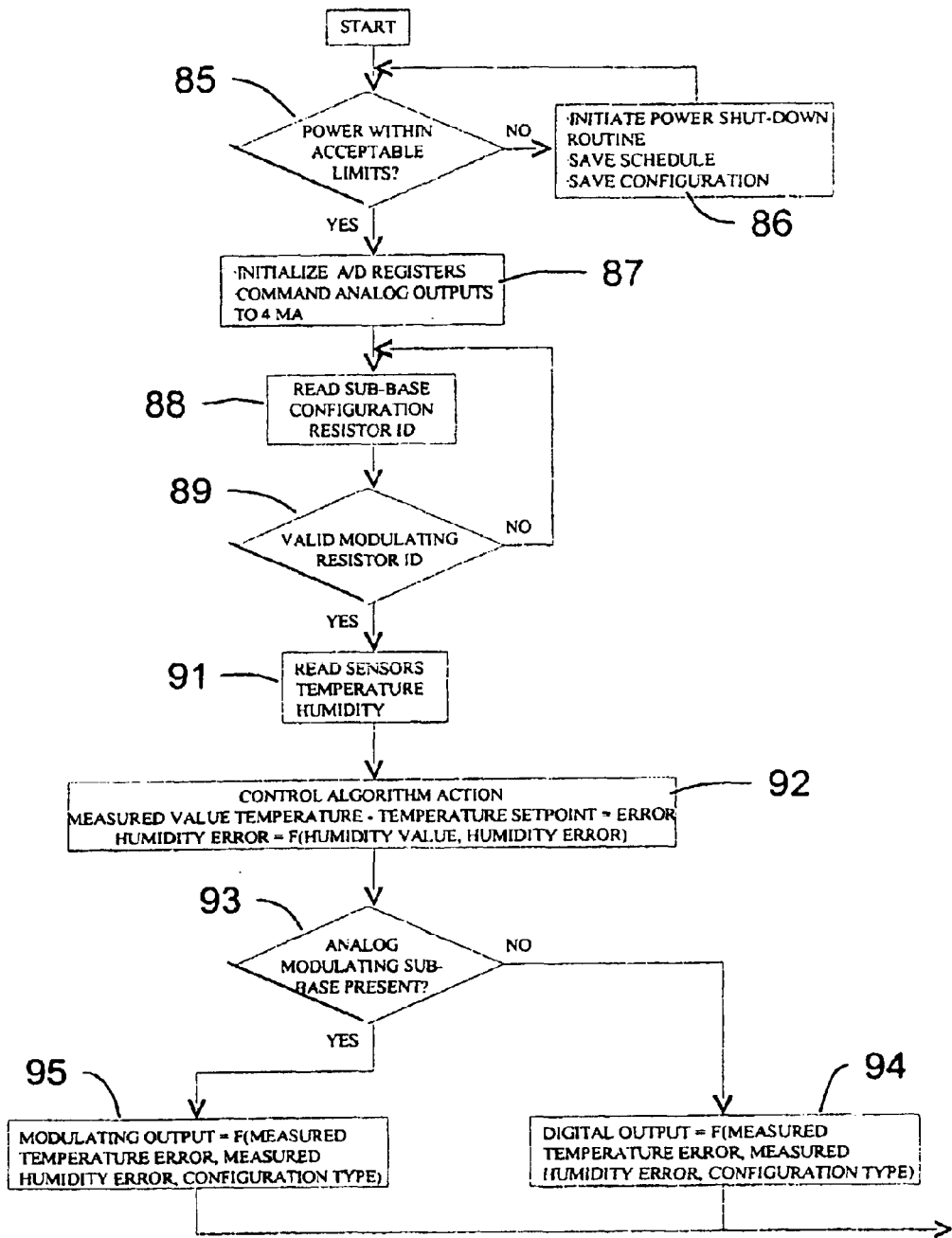
FIG. 19 is a flow diagram of a modulating sub-base sequence.

FIG. 19 is a flow diagram of the modulating sub-base sequence. An input may enter the sequence at decision 85 which asks whether the power is within acceptable limits. If not, a power shut-down may be initiated along with the saving of the schedule and configuration, as indicated in block 86. If the power is within acceptable limits, then the analog/digital (A/D) registers may be initialized and the analog outputs commanded to 4 mA, according to block 87.

The output of block 87 may go to block 88 and cause the sub-base configuration resistor ID to be read. The next question of symbol 89 may be whether the modulating resistor identification (ID) is valid or not. If not, a signal may be sent back to the beginning of block 88 and the process may repeat itself with the same question of validation of the modulating resistor ID. If the resistor ID is valid, then a signal may be sent from decision diamond 89 to block 91 for the temperature and humidity sensors to be read. After these readings, control algorithm action of block 92 may occur. The measured value temperature minus a temperature set point may equal the error, and the humidity error may be a function of humidity value and the humidity high limit. After the action of block 92, an output may go to symbol 93 to ask whether an analog modulating sub-base is present. If not, then a digital output may be a function of measured temperature error, measured humidity error, and configuration type, as in block 94. If so, then a modulating output may be a function of measured temperature error, measured humidity error and configuration type, as in block 95.

Figure 20A:
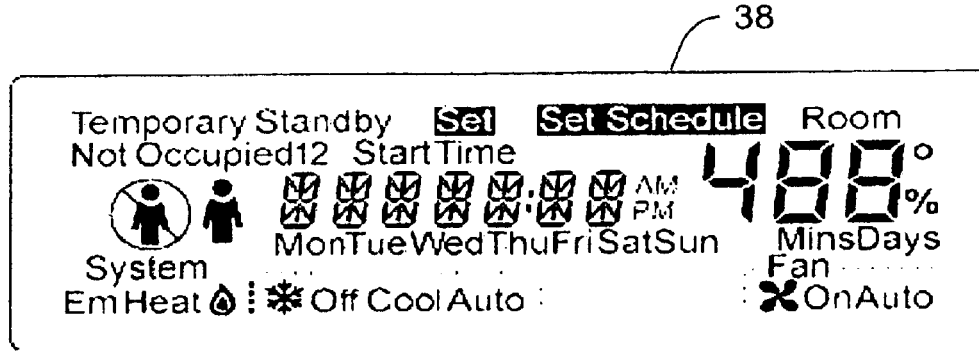
FIGS. 20a and 20b show a display and a thermostat assembly with the display and a keyboard.
Figure 20B:
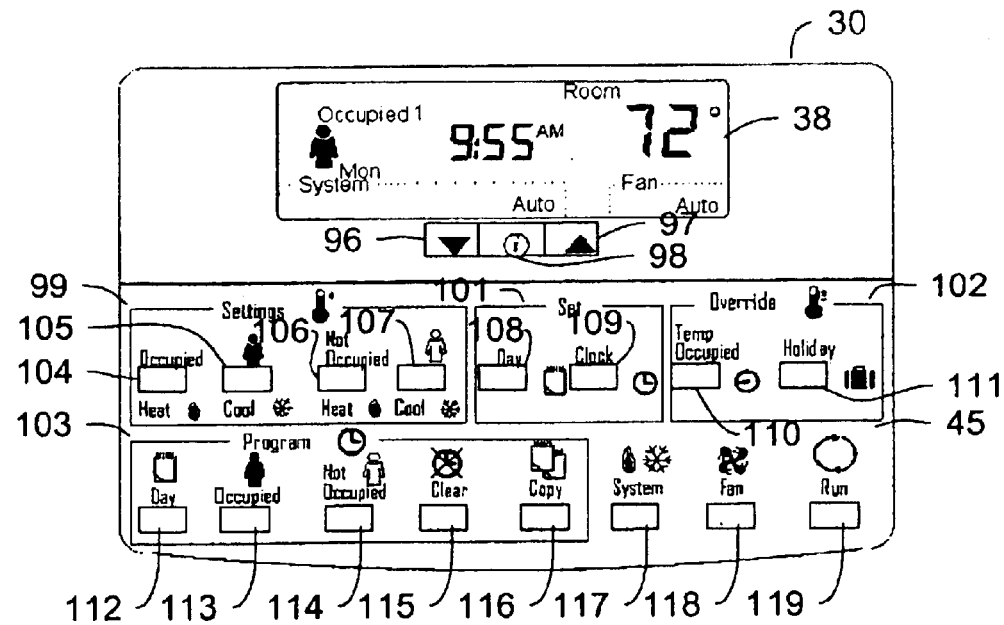

FIGS. 20*a* and 20*b* show an illustrative example of a display 38 and a keypad 45 user interface 30. Keypad 45 may control HVAC equipment often described as a conventional roof top unit (RTU) 40 with gas or electric heat and direct expansion (DX) cooling. There may be 0–3 stages of heat, and up to 6 stages of heating and cooling combined. There may be 0–4 stages of compressor, and up to 6 stages of heating and cooling combined. There may be a single speed fan. An auxiliary relay may be used to enable economizer dampers, TOD or dehumidification. A heat pump roof top unit 40 may have gas or electric auxiliary heat. There may be 0–2 stages of auxiliary heat, 0–3 stages of compressor, a heating or cooling changeover valve, and be configurable for ON for heat or ON for cool. It may have a single speed fan. Also, an auxiliary relay may be used to enable economizer dampers, TOD (time of day) or dehumidification.

Figure 21:
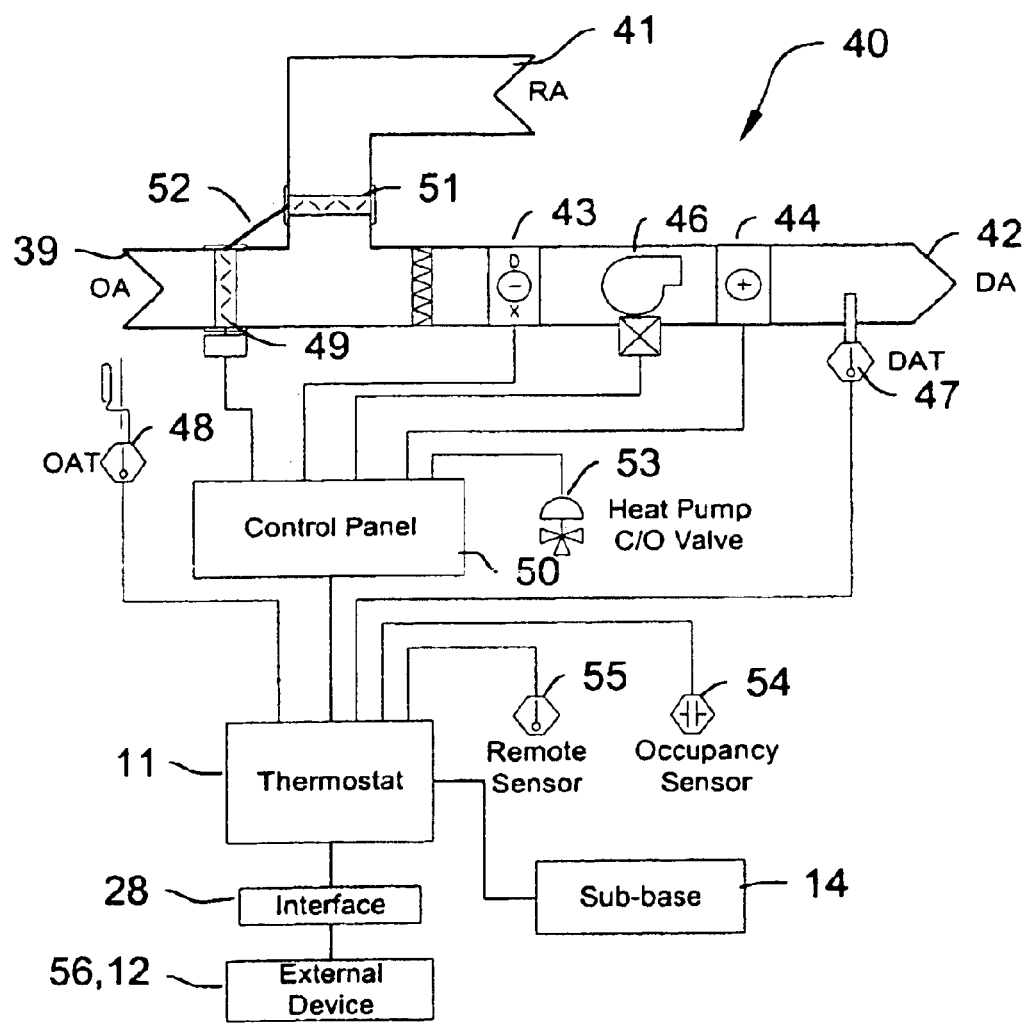
FIG. 21 shows a roof top air management system.

A modulating roof top unit may have a hot water valve or modulating gas heat and/or chilled water valve. FIG. 21 shows a typical roof top unit 40. Roof top unit may have cooling equipment 43 and heating equipment 44. It may also have a fan 46, a DAT 47 and an OAT 48. There may be dampers 49 and 51 to regulate the flow of the outside air and return air to RTU 40. Dampers 49 and 51 may have a common mechanical connection 52 which coordinates their movements relative to each other. A control panel 50 for RTU 40 may be connected to cooling equipment 43, heating equipment 44, fan 46, dampers 49 and 51, and a heat pump cutout valve 53. Control panel may receive control signals from and send signals to thermostat 11. A DAT sensor 47, an OAT sensor 48, an occupancy sensor 54 and a remote sensor 55 may be connected to thermostat 11.

RTU 40 may have a heat enable, cool enable, or 0–2 stages of heat or compressor. The modulating outputs may be always active. They may be always being driven 0–100 percent. When the number of stages is zero, the relay outputs may be used to enable heating or cooling outputs. This means the relay may turn on when the modulating output is nonzero and turn off when the output is zero. Staged action may be used in addition to the modulating outputs. The number of stages may be set to 1 or 2, or more if desired. In this particular case, the relay output(s) may be used for up to 2 stages of heating or cooling. Note that the user might not have both two stages of cooling and two stages of heating. In another example, the user may have modulated heat, a heat pump enable relay and one stage of cooling. Or the user may have modulated heat, a heat pump enable relay, and two stages of cooling. The cooling analog output may be direct or reverse acting. The heating analog output may be direct or reverse acting. The may be a single speed fan. Although a multiple speed fan may be used. There may an auxiliary relay used to enable economizer dampers, TOD or dehumidification.

The hardware of thermostat 11 may have the following configuration, which includes an internal room temperature sensor, an LCD display 38 with back-lighting, a keypad 45, a system and fan switching capability through the keypad, as indicated in FIGS. 20a and 20b. Also, there may be a serial communications link from thermostat 11 to configuration tool 12 (Palm™ OS) and a network communicating sub-base. There may be four onboard relays with one for heat, one for cooling, one for a fan, and one auxiliary relay.

Recognition of the sub-base I/O (input/output) may be through the hardware. The thermostat cover assembly may indicate the sub-base I/O configuration by a resistor located on the sub-base. Each I/O configuration may have a unique resistor value. One sub-base configuration may have modulating outputs. A total of four relays may be available with a thermostat cover assembly and the sub-base. The auxiliary relay may be configured for an economizer, TOD, dehumidification or an additional stage of heating or cooling. There may be a modulating heating output and a modulating cooling output. Also included may be a humidity sensor mounted in the sub-base, a remote room sensor, a remote room humidity sensor, a remote discharge air temperature sensor, a remote outdoor air temperature sensor, and remote occupancy input (digital input). There may be access to the serial communications port on the thermostat. The modulating sub-base may or may not support heat pumps.

An open, short, or out-of-range on the internal or remote room sensor input(s) to the thermostat may cause the outputs to be turned off. The fault detection might be just done on the sensor being used. That is, if the internal sensor is being used, faults on the remote sensor are ignored. The system may provide proportional plus integral plus derivative temperature control.

There may be testability capabilities. The thermostat may cooperate with factory testers such as in-circuit and functional tests to verify its functionality. The industry standard JTAG port will be available for the factory tester to program the flash memory and test the device. Boundary Scan, formally known as IEEE/ANSI 1149.1_1190 is a standard which facilitates testing, device programming and debugging at the semiconductor, board and system levels. The standard came about as a result of the efforts of a Joint Test Action Group (JTAG) formed by several North American and European companies. IEEE Std 1149.1 was originally developed as an on-chip test infrastructure capable of extending the lifetime of available automatic test equipment (ATE). This methodology of incorporating design-for-test allows complete control and access to the boundary pins of a device without the need for a bed-of-nails or other test equipment. The OS label applied to the control represents the features of the control. This product may be designed such that 100 percent of the inputs and outputs can be tested in the factory.

One may interface to a Palm™ OS tool to do installer configurations, set parameters, set schedules and tests, including factory-like testing, and diagnostics. The Palms OS configuration tool has several basic functions installer configuration (defines the equipment attached to the thermostat); parameter modification (gains, set points, and the like), schedule changes, and testing and diagnostics.

Keypad 45 and LCD display 38 user interface 30 may be in the flash memory file (accessed through document management software). Thermostat 11 may have the LCD segments depicted in FIGS. 20a and 20b. FIG. 20a shows the available LCD elements in display 38. There are elements for displaying time, temperature, days of the week, humidity, occupied status, far status, heat and cool status, setting for schedules and times, and so forth. Further, display 38 may be a dot-matrix system with shading of the respective pixels. Display 38 may be a black and white display with a gray scale system, or a color display which is capable of displaying graphics, pictures and symbols, including company or contractor logos. Display 38 may be capable of displaying video-like or television-type pictures. Interface 30 may have a speaker for providing sound associated with video information on display 38. Also, a microphone may be attached to interface 30 for voice instructions or other audio purposes.

FIG. 20b shows user interface 30 with display 38 and keyboard 45. Button or keys 96 and 97 may be used for entering up and down settings, respectively. Key 98 may be used to obtain information. Keypad or keyboard 45 may have a settings group 99, set group 101, override group 102 and a program group 103 of keys. Buttons or keys 104 and 105 may be for the heat and cool temperature set points for occupied periods. Keys 106 and 107 may be for heat and cool temperature set points for unoccupied periods. The day and time of the clock may be set with keys 108 and 109, respectively. Keys 110 and 111 of override group 102 may be used for temporary occupied and holiday schedule selection, respectively. Alternatively, key 111 may be for "Temporary Not Occupied" override, as indicated in Table 31. One may program schedules of occupied and unoccupied times for various days in key group 103. Key 112 may be used to select the day to be scheduled, key 113 may be used for selecting the occupied times and key 114 for selecting the not occupied times for the selected day. Key 115 may be used to clear the set schedule of that day. Key 116 may be used to copy a schedule of one day into another. Other keys of interface 30, include a system key 117 for selecting a cooling or heating system, and a key 118 for putting the fan "on" or on "auto". Key 119 may be used to run the system. Table 31 provides some description of the various keys on keyboard 45.

TABLE 31

| Reference Number | Grouping | Button | Definition |
| --- | --- | --- | --- |
| 96 | Information | Down Arrow | Used for lowering setpoints, days, and times. When setting times or temperatures, holding this key down results in continuously decreasing the time. |
| 98 | Information | ● | Used to obtain information (and settng humidity "high-limit" value) |
| 97 | Information | Up Arrow | Used for raising setpoints, days, and times. When setting times or temperatures, holding this key down results in continuously increasing the time. |
| 104 | Temperature | Occupied Heat | Set Occupied Heat setpoint |
| 105 | Temperature | Occupied Cool | Set Occupied Cool setpoint |
| 106 | Temperature | Not Occupied Heat | Set Not Occupied Heat setpoint |
| 107 | Temperature | Not Occupied Cool | Set Not Occupied Cool setpoint |

TABLE 31-continued

| Reference Number | Grouping | Button | Definition |
|---|---|---|---|
| 108 | Set | Day | Set day of week. Tapping this key when the 'Set Value' segment is on will also increase the current day (same effect as up arrow key) |
| 109 | Set | Time | Set time. Tapping this key when the "Set Value" segment is on will also increase the time in one hour increments |
| 110 | Override | Temporary Occupied | Temporary occupied setting for length of time defined by installer. |
| 111 | Override | Temporary Not Occupied | Set Not Occupied length. User can select length of days ("0"–"99") or "–" for continuous override |
| 112 | Schedule | Day | Selects day schedule to modify |
| 113 | Schedule | Occupied | Selects occupied event start times for specified day. Repeatedly pressing this key toggles between two occupied events. |
| 114 | Schedule | Not Occupied | Selects not occupied event start times for specified day. Repeatedly pressing this key toggles between two not occupied events. |
| 115 | Schedule | Clear Start Time | Clears start time for specified period and day |
| 116 | Schedule | Copy | Copies schedule from one day to another. |
| 117 |  | System | Selects System Mode. Toggles between Em Heat, Heat, Off, Cool, and Auto modes. |
| 118 |  | Fan | Selects mode of fan operation. Toggles between On and Auto. |
| 119 |  | Run Schedule | Resumes running schedule (cancels any Temporary Occupied action, Temporary Not Occupied, or Temporary setpoint change.) |

In system checkout there may be disable delay, test and monitoring from Palm™ configuration tool 11. One may be able to access a manual mode from the Palm™ OS configuration tool. This may allow the user to manually turn on and off or modulate each output to verify wiring.

The electronic thermostat system may consist of two pieces, thermostat 11 and sub-base 14. Thermostat 11 may include a human interface 30 and display 38 for user programming, a microprocessor 61, four relays 74, 75, 76, 77, a space sensor 67, and a power supply. Sub-base 14 may include the equipment control connections, additional relays, optional analog output, and some power supply components. Sub-base 14 is mounted on the wall and thermostat 11 may be mounted on sub-base 14. Different sub-base 14 types may be used for different applications including up to three heat/three cool or two heat/four cool, modulating outputs, dehumidification high limit control, and communications with a building automation system. All sub-base 14 types may be compatible with thermostat 11.

A Palm™ PDA 12 may be connected to thermostat 11 and used to configure or program thermostat 11. Future sub-base 14 types may have the capability of communications to a building automation system via a net connection. The communications port may be used by the factory or a PDA to test the hardware features of the device.

An optional remote wall module may be attached to the device to sense space temperature, control the set point, initiate a schedule override timer, and display the status of the override timer. Optional remote discharge, outdoor air, humidity, and occupancy sensors may be attached to thermostat 11 via sub-base 14.

In the factory, thermostat 11 may be connected to a programming device that programs the flash memory via the industry standard JTAG port. This port may also by used to down load revised software in the field.

There may be control algorithms in thermostat 11. Thermostat 11 may be used to control the temperature and humidity in the controlled space using heating and cooling equipment. The equipment may be conventional with up to three stages of heating and four stages of cooling, or it may be heat pump with up to two compressor stages and two stages of auxiliary heat. In addition economizer options and analog control options are available with some sub-bases. The control algorithm may be customized for various applications using keyboard and display or an external personal digital assistant (e.g., PDA 12).

In the factory test phase, the device may cooperate with the factory tester to test the hardware inputs, outputs, keyboard 45, display 38, and associated equipment. The hardware of thermostat 11 may include certain significant components. Thermostat 11 may use a Texas Instruments Inc. MSP 430 family microprocessor. Processor 61 may contain on chip flash program memory, flash information memory, RAM, microprocessor oscillator, real time clock oscillator (external crystal), timers for real time clock, timers for operating system and pulse width modulation (analog output), digital IO 58 ports for relays/inputs/keyboard scanning, 12 bit analog-to-digital converter (ADC) 59 with an input multiplexer, and an LCD display 38 driver.

The microprocessor 61 port pins may be connected to: keyboard 45 rows (inputs) and columns (outputs); an LCD display 38; eight analog input circuits (one on thermostat 11 and up to seven connected via sub-base 14); one digital input for remote wall module bypass button—connected via sub-base 14; one digital input for occupancy sensor—connected via sub-base 14; transistorized relay drivers (four on thermostat 11 and up to four on sub-base 14); a low pass filter to convert pulse width modulation into analog output voltage (up to two on sub-base 14); one digital output for bypass LED on remote wall module connected via sub-base 14; one digital output to put the power supply into relay power saving mode; a serial input, output, and handshake input used to connected to the personal digital assistant 12, sub-base 14 communications system, factory tester, or tcomm (a specialty development tool); a 32,768 KHz crystal; three volt power derived from a higher voltage power supply (the three volt supply may use a super-capacitor to keep the circuit alive for 48 hours or more after mains power failure); an on chip low voltage detect circuit which may be connected to the mains side of the higher voltage power supply (a detection of low voltage may cause microprocessor 61 to enter a low power mode.

Figure 22:
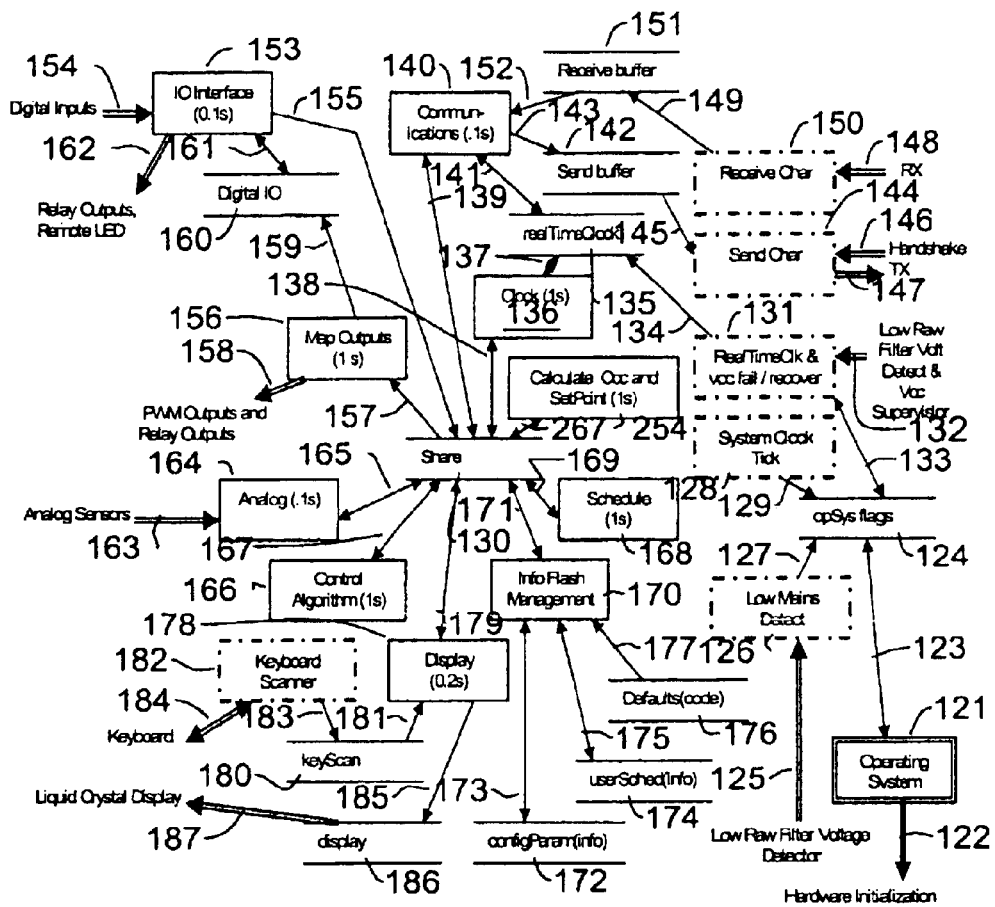
FIG. 22 is a context diagram revealing a process structure in a thermostat.

The context diagram of FIG. 22 illustrates the various processes in thermostat 11. There may be two kinds of tasks: 1) interrupt driven; and 2) operating system driven. The interrupt driven tasks may run when a hardware interrupt calls them. Interrupts do not interrupt interrupts. The operating system tasks may run periodically when an operating system 121 calls them. When no tasks are being performed, operating system 121 may run in an endless loop. The tasks may communicate with one another through shared RAM variables. The memory in this illustration may be regarded as RAM, unless otherwise specified. The code may be written in the C language except that some critical routines or utilities may be written in assembler.

Operating system 121 may have an outgoing hardware connection 122 to hardware initialization. One may note a key of symbols for FIG. 22. A double line block may represent a main( ) system such as operating system 121. A single solid line block may represent a periodic task (time), a dot-and-dash line block may represent an interrupt task, two horizontal parallel line symbol may represent a memory, a single line with an arrow or arrows at at least one end may represent an internal data path and a double line with an arrow at at least one end may represent a hardware connection. There may be a two-way internal data path connection 123 from system 121 to opSys flags memory 124. From a low raw filter voltage detector may be an inward hardware connection 125 and a low mains detect interrupt task 126. Task 126 may have an internal path connection 127 to opSys flags memory 124. A system clock tick interrupt task 128 may have an output to opSys flags memory 124 via internal data path 129. A RealTimeClk and Vcc fail/recover interrupt task 131 may have an incoming hardware connection 132 from a low raw filter voltage detector and Vcc supervisor. Interrupt task 131 may have a two-way internal data path connection 133 with opSys flags 124. From interrupt task 131 may be an internal data path connection 134 to Real-TimeClock memory 135, which may be connected to a clock (periodic task) 136 via a two-way data path 137. Clock 136 may be connected to a central share memory 130 via a two-way data path 138. Calculate Occ and SetPoint periodic task 254 may be connected to share memory 130 via two-way path 267. Share memory 130 may be connected to communications periodic task block 140 via a two-way path 139.

Communications task 140 may be connected to realTime-Clock 135 via a two-way data path 141. Output from communications task 140 may go to a second buffer memory 142 via a one-way data path 143. The output from send buffer 142 may go to send character interrupt task 144 via a two-way data path 145. Task 144 may have an incoming handshake hardware connection 146 so as to indicate when character data may be transmitted out via a TX hardware connection 147. Character information may be received via RX hardware connection 148 to receive character interrupt task 150. This information may go to a receive buffer memory 151 via a one-way data path 149. The information may then go to communications periodic task block 140 via a one-way data path 152. From communications task 140, the received information may go to share memory 130 via data path 139.

ID interface periodic task 153 may receive digital inputs via a hardware connection 154. An output from IO interface 153 may go to share memory 130 via a one-way data path 155. An output from share 130 may go to map outputs periodic task block 156 via a data path 157. Map outputs task 156 may output on a hardware connection 158 PWM outputs and relay outputs. Also, an output from map outputs task 156 may go to a digital IO memory 160 via a data path 159. Such output may go to IO interface task 153 via a two-way data path 161. IO interface 153 may provide relay outputs and remote LED signals on an outgoing hardware connection 162.

Input from analog sensors may go to an analog periodic task block 164 via a hardware connection 163. Analog task 164 may be connected to share memory 130 via a two-way connection 165. A control algorithm periodic task block 166 is connected to share memory 130 via a two-way data path 167. A schedule period task 168 is connected to share memory 130 via a two-way data path connection 169. Information flash management periodic task 170 may be connected by a two-way data path 171 to share memory 130.

A configParam(info) memory 172 may be connected via a two-way data path 173 to information flash management periodic task 170. A userSched(info) memory 174 may be connected via a two-way data path 175 to information flash management task 170. Defaults(code) memory 176 may be connected to information flash management task 170 via a one-way data path 177.

A display periodic task block 178 may be connected to share memory 130 via a data path 179. A keyScan memory 180 may be connected to display task 178 via a one-way data path 181 towards display task 178. A keyboard scanner interrupt task 182 may be connected to keyScan memory 180 via data path 183 in a direction towards keyScan memory 180. Keyboard scanner 182 may be connected to keyboard 45 via a two-way hardware connection 184. Display periodic task 178 may be connected to a display memory 186 via a one-way data path towards display memory 186. The latter may be connected to liquid crystal display 38 via hardware connection 187.

Figure 23:
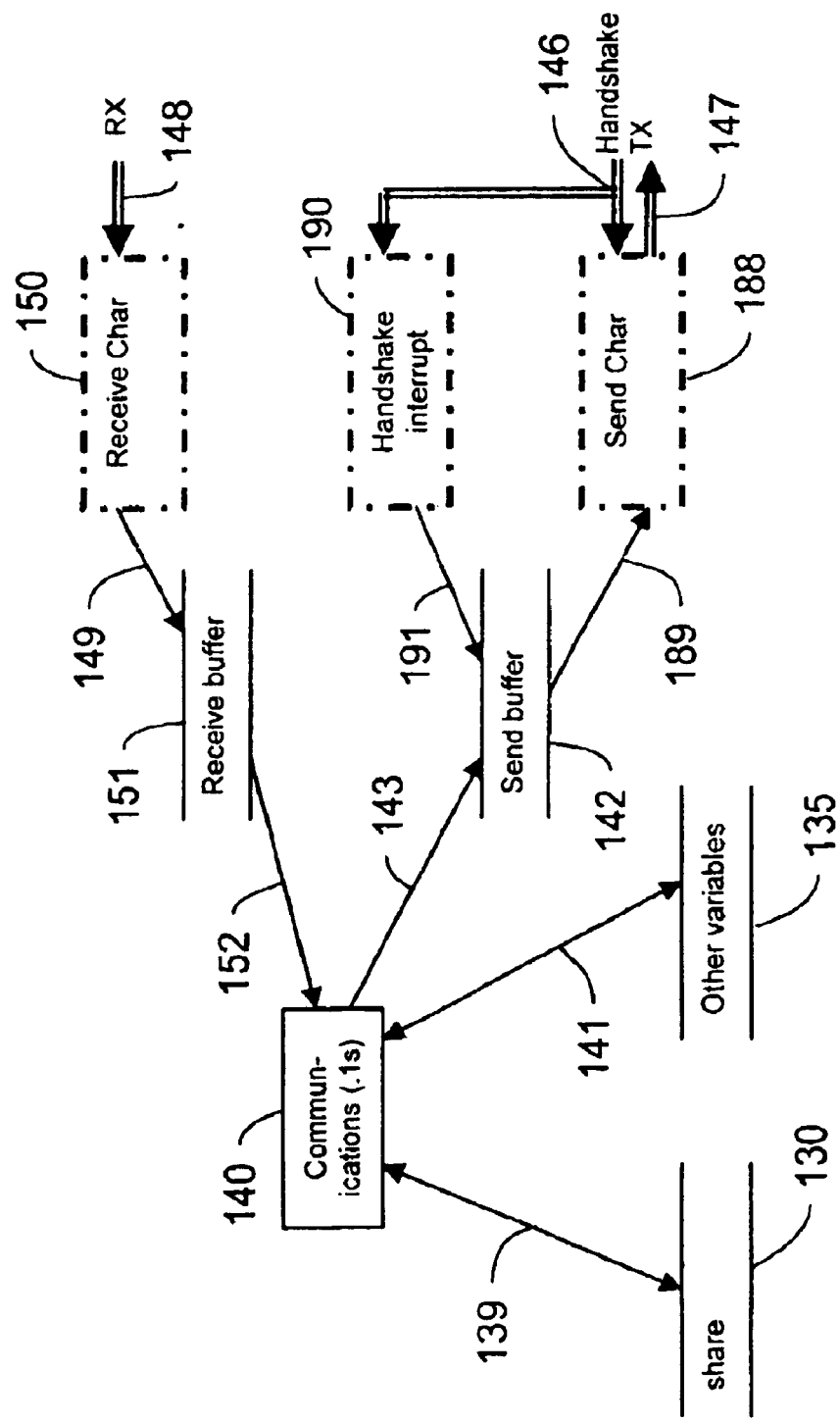
FIG. 23 is a diagram of a transmit and handshake portion of a communications process of the thermostat.

FIG. 23 shows further detail of the "transmit-out" portion of the system in FIG. 22. Send buffer memory 142 may be connected to send character interrupt task block 188 via a one-way data path 189 towards send character task 188. Task 188 may send out character information via hardware connection 147. Handshake related information may be received by send character task 188 via hardware connection 146. Connection 146 also may go to handshake interrupt task 190. Handshake interrupt task 190 is connected to send buffer memory 142 via a one-way data path 191 towards send buffer 142. Data paths 189 and 191 may be represented by data path 145, and the send character task 188 and handshake interrupt task 190 may be represented by send character interrupt task 144 in FIG. 22. Further, realTime-Clock task 135 may have a broader label of "other variables" as the clock may be one of the variables.

The tables below summarize the usage of the relays for each sub-base type and the type of equipment controlled (conventional or heat pump). The modulating output sub-base has two analog outputs in addition to relays. The sub-base type is detected by measuring the voltage set by resistor values on the sub-base. The following table shows the features for conventional equipment of an air management system.

TABLE 32

| Output (internal designation) | Sub-base1 Use As | Sub-base2 Use As | Sub-base3 Use As | Sub-baseMod Use As |
|---|---|---|---|---|
| Fan | Fan | Fan | Fan | Fan |
| Heat1 | Heat 1 | Heat 1 | Heat 1 | Heat 1 |
| Cool1 | Cool 1 | Cool 1 | Cool 1 | Cool 1 |
| Aux | Aux or Heat 2 or Cool2 (note 1 and 2) | Aux or Heat3 or Cool3 (note 1 and 2) | Aux or Heat3 or Cool3 (note 1 and 2) | Aux or Heat or Cool2 (note 1 and 2) |
| Heat2 | n/a | Heat2 | Heat2 | n/a |
| Cool2 | n/a | Cool2 | Cool2 | n/a |
| Heat3 | n/a | n/a | Heat3/Cool4 | n/a |
| Cool3 | n/a | n/a | Cool3 | n/a |
| ModHeat | n/a | n/a | n/a | Modulating Heat |
| ModCool | n/a | n/a | n/a | Modulating Cool |

The designation "n/a" means that the item may not be available for that sub-base configuration. The aux (auxiliary) relay normal function may be one of the following: time of day occupancy signal, economizer enable, dehumidifier hot gas, and simple dehumidification. An additional stage of heating or cooling may be configured using the aux relay.

There may be two analog outputs available when SubbaseMod is used with the thermostat. Microcontroller internal timers may be used to generate a pulse width modulation output. A low pass filter on the sub-base may convert the pulse width modulated outputs to analog current. By connecting an appropriate value resistor, the output may be converted to voltage output. The cycle time may be set at 8 MHz/200 counts (i.e., the frequency is 40 KHz and each counter pulse is 25 microseconds). The duty cycle may be set between 0 and 100 percent. There may be 200 steps in the 0 to 100 percent control range.

Thermostat 11 may communicate with an external device such as a Personal Digital Assistant (PDA), factory tester, PC based development tool, or an optional communicating sub-base. The sub-base in turn communicates with other devices via a digital data network. There may be a software interface between the thermostat and the external device, and the sub-base, including the protocol, and the data structures. There may be an external device and the communicating sub-base connected at the same time. It is not necessary to communicate directly between the sub-base and the external device. There may be a need to coordinate the communications flow from sub-base to thermostat and from external device to the thermostat. The object of the interface may be to share information between the thermostat and the external device (e.g., PDA) or between the thermostat and a communicating sub-base using a simple low cost protocol.

Communications between the sub-base or external device, and the thermostat may be via an asynchronous five wire connection. The connections between the external device and the thermostat may include an input to receive data (i.e., data flowing from the sub-base or external device to the thermostat), an output to transmit data (i.e., data flowing to the external device or sub-base from the thermostat), an input for handshake (i.e., used to tell the thermostat that it is acceptable to send data to the external device), a pass-through connection (i.e., an external service request which may be used by the PDA to request access to the receive data. The latter connection may be between the external device and the communicating sub-base and only passes through the thermostat. There may also be a circuit ground connection.

Information may be passed between the thermostat and the external device using asynchronous characters having one start bit, eight data bits, no parity bit and one stop bit. The start bit is a logic 0 input (i.e., 0 volts) at the common hardware interface. The stop bit is a "logic 1" input (i.e., 3 volts).

The baud rate is 4800 baud. The maximum number of characters per message may be 11 characters. The limitation may be based on the fact that an entity that is exchanging information with the thermostat may not be able to process messages any larger than that at that rate.

The message format is shown below in table 33. The message may be 11 bytes long. The least significant bit of each byte is sent first. The "variable number" byte is the first byte sent and the "CheckSum" is the last byte sent. The same message format may be sent by the thermostat and the external device. The message length is fixed so that the external device will be most efficient on using processor time resources. The processor may become inefficient if the message length is not the same as the length of the message it is expecting.

TABLE 33

| Variable nr | 1 to 8 data bytes | 0 to 7 fill bytes | CheckSum |
| --- | --- | --- | --- |

FIG. 23 shows the elements involved in providing communications with an external device. "Share" is a structure that may contain most of the thermostat global variables. Included in "share" may be configuration parameters, current status, and copies of inputs from the external device. "Share" may be broken into "variables" for transfer to/from an external device. In addition "other variables" may be included in the list of variables shared with the external device.

The receive buffer may contain room for four received messages, the number of buffers currently in use, a pointer to the buffer being used to receive characters, a pointer to the next location to store a received character, and the value of the partially calculated check sum.

The receive character interrupt routine may store characters into the receive buffer as they are received via the hardware UART one character at a time. A universal asynchronous receiver/transmitter (UART) controller may be the key component of the serial communications subsystem of the processor. The UART may take bytes of data and transmit the individual bits in a sequential fashion. At the destination, a second UART may re-assemble the bits into complete bytes. The receive character also may detect the start of the message using the gaps between messages, calculate the checksum, update buffer pointer and count when a valid message is received. If the buffer is full, the receive character interrupt routine may ignore received messages.

The send buffer may contain room for four received messages, the number of buffers currently in use, a pointer to the buffer being used to send characters, a pointer to the next character to be sent, and the value of the partially calculated check sum.

The send character interrupt routine may send characters from the send buffer to the hardware UART one character at a time. It also may calculate the check sum to send, put in four character gaps between messages, and update buffer pointers as messages are completely sent. When the send buffer is empty, or the handshake line is not asserted at the end of a message, the send character interrupt routine may turn it self off.

The handshake interrupt routine may run when the handshake line becomes asserted. If the send UART is turned off and there is data in a buffer, asserting the handshake line causes the first character of a ready send buffer to be sent via the UART.

The communications task may run every 100 milliseconds and perform the following communication tasks. First, if there are any messages in the receive buffer, it may reset the communications timer. If there are any messages in the receive buffer, it may copy them to their destination in local RAM providing their class permits them to be copied. In 100 ms, it is possible to receive 3.2 messages. If there is any space in the send buffer, it may select the next variables to send to the external device and copy them to the send buffer until the send buffer is full. In 100 ms, it is possible to send 3.2 messages. Receiving selected variables may cause a failure detect timer to be restarted. If a failure detect timer times out, the variables may be reset to a default value. Failure detect timers may be intended to provide fail safe operation of selected functions. If an inUse signal is received with the re-programmer code, the communications task may turn off controlled equipment, save configuration parameters and user schedule in INFO flash memory, and call ProgramCodeFlash( ).

The alarmError signal may contain bits indicating that certain errors have been detected in the thermostat and may be viewed via the communication port. Table 34 shows the various alarm fields that may be used in testing and diagnostics.

TABLE 34

| alarmError field | Meaning | What happens in the device on error | Method of displaying error on the device |
| --- | --- | --- | --- |
| almUsrScdCkSum | User Schedule Check Sum Error. Calculated when the user tries to retrieve the user schedule<br>0: User schedule was retrieved successfully<br>1: User schedule was not retrieved successfully | Current schedule continues to be used. | Display will not allow the user to select "yes" to retrieve the saved user schedule. It will display "no" when the user tries to change the selection to "yes" |
| aimCntPrmCkSum | Configuration Parameter Check Sum Error. Calculatod when mains power is restored or upon a reset<br>0: Configuration Parameters were retrieved successfully from non-volatile memory.<br>1: Configuration Parameters were not retrieved successfully from non-volatile memory. The factory default configuration parameters are being used instead. | Factory default configuration is being used.<br><br>atmCntPrmCkSum is set to zero when config 1.installConfig is set to one by the Installer. | No display action |
| aimSub-base Type | Sub-base type error. Read from the sub-base resistive voltage divider in the sub-base<br>0: The sub-base is a valid sub-base type<br>1: The sub-base is not a valifd sub-base type | Thermostat relays and analog outputs are turned out. | No display action |
| aimIOConfig | Output configuration error. Considers sub-base type, heat pump/conventional application. maxCoolStgs, maxHeatStgs.<br>0: The outputs configuration is consistent with the sub-base type selected<br>1: The number of outputs configured exceeds the capability of the sub-base to support them. | In conventional mode, fan and only one stage of heating and cooling is enabled. If modulating sub-base is connected, modulation is activated.<br><br>In heat pump mode, fan and only one compressor (heating or cooling) is available. Auxillary heat is not available. Note: Modulating sub-base is not supported (All outputs turned off) | No display action |
| errDischSensr | Discharge sensor out of range or disconnected.<br>0: Sensor value os OK.<br>1: Sensor is configured to function and is out of range or disconnected. | Discharge air temperature limiting will not be done. | Display shows " - - - " for the value. |
| errRemtSetPt | Remote wall module set point is out of range or disconnected.<br>0: Value is OK.<br>1: Remote wall module set point is configured to function and is out of range or disconnected. | Remote setpoint offset of zero (0) used. | No display action. |
| errNetOdSensr | Network Outdoor air sensor not working.<br>0: Sensor value is OK.<br>1: Sensor is configured to function but is not being updated by the network. | There is no heat/cool lockout. The minimum heat/cool recovery ramps are used.<br>See Note 1. | Display shows " - - - " for the value if the sensor is invalid.<br>See Note 1. |
| errOdSensr | Remote Outdoor air sensor not working.<br>0: Sensor value is OK.<br>1: Sensor is configured to function and is out of range or disconnected. | There is no heat/cool lockout. The minimum heat/cool recovery ramps are used.<br>See Note 1. | Display shows " - - - " for the value if the sensor is invalid.<br>See Note 1. |
| errNetHumSensr | Network Humidity sensor not working.<br>0: Sensor value is OK.<br>1: Sensor is configured to function but is not being updated by the network. | There is no humidity control.<br>See Note 2. | Display shows " - - - " for the value if the sensor is invalid.<br>See Note 2. |
| errRemIHumSensr | Remote Humidity sensor not working.<br>0: Sensor value is OK<br>1: Sensor is configured to function and is out of range or disconnected. | There is no humidity control.<br>See Note 2. | Display shows " - - - " for the value if the sensor is invalid.<br>See Note 2. |
| alarmError.errLoclHumSensr | Local Humidity sensor not working.<br>0: Sensor value is OK.<br>1: Sensor is configured to function and is out of range or disconnected. | There is no humidity control.<br>See Note 2. | Display shows " - - - " for the value if the sensor is invalid.<br>See Note 2. |

TABLE 34-continued

| alarmError field | Meaning | What happens in the device on error | Method of displaying error on the device |
|---|---|---|---|
| alarmError.errNetSpaceSensr | Network space temperature sensor not working. 0: Sensor value is OK. 1: Sensor is configured to function but is not being updated by the network. | There is no ternperature control. See Note 2. | Display shows " - - - " for the value if the sensor is invalid. See Note 2. |
| alarmError.emRemtSpaceSensr | Remote space temperature sensor not working. 0: Sensor value is OK. 1: Sensor is configured to function and is out of range or disoonnected. | There is no temperature control. See Note 2. | Display shows " - - - " for the value if the sensor is invalid. See Note 2. |
| alamError.errLoclSpaceSensr | Local space temperature sensor not working. 0: Sensor value is OK 1: Sensor is configured to function and is out of range or disconnected. | There is no temperature control. See Note 2. | Display shows " - - - " for the value if the sensor is invalid. See Note 2. |

If a network sensor is configured for use, but invalid, then the thermostat processor may look for a valid sensor on the remote terminals. If it is valid it may use the remote as the value. If the remote is also invalid, it may look at the local sensor. If it is valid it may use the local sensor as the value. If all of them are invalid, then "invalid" may be reported as the sensor value and the display will show "---". This allows the user to configure the network (or remote) as the primary sensor and have a backup in case the primary fails. If the network sensor is configured and is invalid, it may report an alarm error. If the remote sensor is configured and is invalid, it may report an alarm error. If the local sensor is configured and is invalid, it may report an alarm error. In other words if the configured sensor is invalid, then it may report an alarm error.

A factory test mode may be used to test the thermostat and a connected sub-base. Components tested in the factory test mode may include keys in the keypad (19 Keys), display segments, four relays on the thermostat board, up to four relays on the sub-base, one wall module LED driver, two Digital inputs (i.e., occupancy sensor and one wall module bypass push button switch), two analog outputs (plus up to two analog outputs on the sub-base where the modulating sub-base is required), eight analog inputs (i.e., the local space temperature on thermostat, the remote space temperature, the remote wall module set point control, the local humidity sensor on sub-base, the remote humidity sensor, the outdoor temperature sensor, the discharge air sensor, and the sub-base identifier), and the communications port (for data in, data out, and the handshake line).

The configuration parameters may be saved in INFO FLASH memory when mains power has failed. There may be verification that when mains power has been restored, the configuration is also restored as saved. This may test the circuitry that senses power failure and the power supply capacitors ability to supply power for a few milliseconds while INFO FLASH memory is being written.

The following may not necessarily be tested by the software. One item is the super capacitor ability to supply power to the device for the rated number of hours after mains power has failed. Clock frequency may be another. A general recommended approach to final factory test may be as follows. Lock thermostat with sub-base into test fixture. Apply power (24 volts AC—set voltage at low end of 24 VAC tolerance). The display should initially turn on all segments after mains power up. The test fixture may communicate with thermostat via communications port and puts it into the factory test mode. The test fixture may press the keys one at a time. Each key may cause certain actions (e.g., provide a LDC display pattern, turn on one relay, set the analog output to certain values, and so on). A vision system may watch the display and reject units having an invalid display. The test fixture may sense digital and analog outputs for proper operation. Simultaneously, the test fixture may connect various analog sensors to the analog inputs and monitors the sensed analog values via the communications port. Simultaneously the test fixture may turn on and off the various analog inputs and monitors the sensed digital states via the communications port.

One may turn off the power. After 5 seconds one may cycle the power back on. Then one may verify that, via the communications port, the configuration was read correctly from INFO FLASH memory into RAM upon power up. There is no need to enter factory test mode. The display should initially turn on all segments after mains power up. Turn off power and report success or failure. Remove thermostat from test fixture. There may be a separate test sequence or just one test sequence for each sub-base type. Also, one may test the outputs and inputs on the thermostat even if they are not present in the particular sub-base type being tested.

To read and view the state of the inputs, one may read the following variables via the communications port. The variables may be read in the normal operating mode or in the factory test mode. In the factory test mode, a filter is turned off so that the analog value changes more rapidly in the factory test mode. Table 35 shows the various variables and what the typical test values may be.

TABLE 35

| Variable | Reads | Typical Values |
|---|---|---|
| rawAnalogA.remoteHum | Remote Humidity | 14880 when input is 10.00 volts |
| rawAnalogA.localHum | Local Humidity | 5460 when input is 1.00 volts |
| rawAnalogA.odTemp | Outdoor Temperature | 13124 when input is connected to 3000 ohm resistor |
| rawAnalogA.discTemp | Discharge Air Temperature | 3796 when input is connected to 10,000 ohm resistor |

TABLE 35-continued

| Variable | Reads | Typical Values |
| --- | --- | --- |
| rawAnalogB.remoteStPt | Remote Set point | 11228 when input is connected to 5500 ohm resistor |
| rawAnalogB.sub-baseSel | Sub-base Selection | 8600 when input is connected to 10200 ohm resistor |
| rawAnalogB.remoteSpaceTemp | Remote Space Temperature | 3796 when input is connected to 10,000 ohm resistor |
| rawAnalogB.localSpaceTemp | Local Space Temperature | 3796 when input is connected to 10,000 ohm resistor |
| status1.occSensor | State of Occupancy Sensor | TRUE when occupancy sensor input is shorted FALSE when occupancy sensor input is open |
| status1.bypassTime | State of Remote Bypass | Set to 180 minutes when the remote bypass input is shorted to ground. Decrements every minute when the remote bypass input is open |

To enter the factory test mode, one may set manMode.manualMode to FactoryTest. In the factory test mode the following may occur. The algorithmic control of the analog and digital outputs is turned off. Instead, the outputs are controlled by the internal factory test software. Every 15 seconds, manMode should be sent to the thermostat or the thermostat will return to Run mode. The LCD and display no longer function in the normal manner. Pressing a key pad button may cause the following action. The output and pattern do not change until another key is pressed.

One may verify that FLASH was written correctly upon mains power fail. When mains power fails, the configuration parameters and schedules are written to INFO FLASH memory as soon as the power failure is detected. The successful writing of INFO FLASH memory generally depends on the charge remaining in the filter capacitors and the super cap.

During the write process at power fail, the following items may occur. First, the check sum of the configuration parameters is calculated. Second: the FLASH is erased. Third, configuration parameters are copied into INFO FLASH memory, and finally, the check sum of the configuration parameters (including schedules) are written to INFO FLASH. Upon return of mains power, if the stored check sum and the calculated check sum agree, the configuration parameters are copied from INFO FLASH into operating RAM. If the calculated and stored check sums do not agree, then the factory default settings are copied into the operating RAM. Also, if they do not agree, alarmError.almCnfPrmCkSum is set to TRUE.

In the factory, when the device is first powered up, INFO FLASH will not have any useful information stored in it, so the calculated check sum will not agree with stored check sum, and alarmError.almCnfPrmCkSum will be set to TRUE. However, when the unit is powered down the first time, INFO FLASH may be written correctly (assuming the power supply is working correctly) and upon power up alarmError.almCnfPrmCkSum will be set to FALSE indicating a successful writing of INFO FLASH. The factory tester should check alarmError.almCnfPrmCkSum after powering the unit up the second time.

One may verify the microprocessor reset button. When the reset button is pressed, the microprocessor will restart itself and the display will temporarily turn on all its segments. Other side effects may include such things as time is lost, alarm bits reset, and all RAM status variables are reset to their default values until the processor updates them to their correct values. If the configuration or schedule has been changed, the changes will be lost.

The manual mode is intended for field use. When the thermostat is in manual mode, the equipment is controlled manually via the communications port. Algorithmic control of the equipment is turned off. The state of the eight relays is controlled individually. The modulated heat and cool outputs are controlled independently. Returning from factory test or manual mode to run mode causes a reset.

The error count variable, errCnt, applies to the diagnostics of the system. The errCnt.rxCkSumErrCnt may relate to receiving messages from the PDA, tcomm, or the sub-base. The message may include a check sum. Thermostat 11 may calculate the check sum and compare it with the check sum in the received message. The errCnt.rxCksumErrCnt may be incremented every time the calculated check sum does not match the received checksum. Check sums may not match if the receiver receives a bit incorrectly or if the start of message at the receiver was received incorrectly. This count might be incremented once in a while but the rate should be low, such as one or two counts in a day.

The errCnt.rxBufferFullCnt relates to receiving messages from the PDA, tcomm, or the sub-base. There may be a receive buffer that has space for four received messages. Received messages may be received using interrupts and placed into the buffer. Once every 100 ms, the Comm. task may run, read the messages and clear the buffer. If a message is received and there is not enough space in the buffer for more messages, then the message may be lost and errCnt.rxBufferFullCnt may be incremented by one. The latter should always be zero. It takes about 25 mB to send one message.

The errCnt.wdtCnt may be incremented if the program starts over and the reason for the reset was a watchdog timer time out (i.e., the program was lost and the watchdog timer caused a reset). The errCnt.wdtCnt should always be zero. Failures may occur due to hardware problems (e.g., reading memory incorrectly) caused by electrical noise which is not very likely because memory is on the same chip as the processor. Failures may also occur due to a code that goes into an endless loop or a corrupted stack after a return from a subroutine call or the like. The watch dog timer may be "hit" once every 100 ms at the end of the tasks for each 100 ms time slot.

The errCnt.flashViolations may be incremented whenever there is a flash violation interrupt. Flash violation may occur if code is running from flash memory and tries to write the same flash memory module at the same time. The errCnt.flashViolations should always be zero. Flash writes may occur during re-programming, power down, and update of user schedule.

Each display state is listed in the following table 36. A description for each state and a table listing actions for each key press follows. In general, a change of display state occurs if a key is pressed or because no key has been pressed for a defined period of time and the information for the previous state is saved. Exceptions may be listed in the description for each state.

TABLE 36

| State | Keypress | Description |
|---|---|---|
| dsRunNormal | keyRun | Display |
| dsHeatOcc | keyHeatOcc | Set Occupied Heat Setpoint |
| dsCoolOcc | keyCoolOcc | Set Occupied Cool Setpoint |
| dsHeatNotOcc | keyHeatNotOcc | Set Not Occupied Heat Setpoint |
| dsCoolNotOcc | keyCoolNotOcc | Set Not Occupied Cool Setpoint |
| dsSetDay | keySetDay | Set Day of Week |
| dsSetTime | keySetTime | Set Time of Day |
| dsTempOcc | keyTempOcc | Set Temporary Occupied Override |
| dsTempNotOcc | keyTempNotOcc | Set Temporary Not Occupied number of days |
| dsSetSched | keySchedDay, keySchedOcc, or keySchedNotOcc | Set Schedules |
| dsSchedCopy | keySchedCopy | Copy schedule from one day to another |
| dsTempStpt | keyinfo, keyUp, or keyDown | Set Temporary Setpoint |
| dsInfo | keyinfo | Display information screens |
| dsInstaller | keyRun and keySchedCopy | Set Installer configuration options |
| dsTestMode | keyRun, keySystem, and keyFan | Enter Test Mode (no delays of heating and cooling stages) |
| dsGetFactorySched | keyRun and keySchedClear | Restore factory schedules from flash memory to current schedules |
| dsGetUserSched | keyinfo and keySystem | Restore user defined schedules from flash memory to current schedules |
| dsSaveUserSched | keyinfo and keySchedCopy | Save current schedules to user define schedules in flash memory |
| dsFactoryConfig | keyRun and keySchedClear | Restore factory configuration |
| dsShowAll | Power up | Show all LCD segments for 2 seconds |
| dsShowLocked | — | Display 'LOCKED' or 'MANMODE' for 1 second |

The test mode may be the dsTestMode. Pressing the combination key press ('scheduled day', 'schedule occ' and 'scheduled unocc) for 'Test Mode' may allow the user to disable time delays between stages to minimize time to test the wiring and operation. The following information may be displayed:

'Set' segment—'NO TEST'.

Pressing the Up and Down keys may toggle the selection between 'IN TEST' and 'NO TEST' and save to the variable share.sysMode.disabledelays. The 'IN TEST' will disable delays. 'NO TEST' is normal operation. After 10 minutes with no key pressed, the thermostat will change back to normal operation or 'NO TEST'. The following is the test mode table for the dsTestMode.

TABLE 37

| Keypress | Actions: |
|---|---|
| keyNone | Increment NoKeyPressTimer. Change state to dsRunNormal after 5 minutes. Set share.sysMode.disableDelays to 'NO TEST' after 10 minutes. |
| keyDown | Toggle shar.sysMode.disableDelays ('IN TEST' or 'NO TEST') |
| keyDown & keyHold | N/A |
| keyInfo | Change state to dsinfo |
| keyUp | Toggle share.sysMode.disableDelays ('IN TEST' or 'NO TEST') |
| keyUp & keyHold | N/A |
| keyHeatOcc | Change state to dsHeatOcc |

TABLE 37-continued

| Keypress | Actions: |
|---|---|
| keyCoolOcc | Change state to dsCoolOcc |
| keyHeatNotOcc | Change state to dsHeatNotOcc |
| keyCoolNotOcc | Change state to dsCoolNotOcc |
| keySetDay | Change state to dsSetDay |
| keySetTime | Change state to dsSetTime |
| keyTempOcc | Change state to dsTempOcc |
| keyTempNotOcc | Change state to dsTempNotOcc |
| keySchedDay | Change state to dsSetSched Initialize sbDisplayDay to current day of week Initialize sbDisplayEvent to event Occupied 1 |
| keySchedOcc | Change state to dsSetSched Initialize sbDisplayDay to current day of week Initialize sbDisplayEvent to event Occupied 1 |
| keySchedNotOcc | Change state to dsSetSched Initialize sbDisplayDay to current day of week Initialize sbDisplayEvent to event Not Occupied 1 |
| keySchedClear | N/A |
| keySchedCopy | N/A |
| keyRun | Change state to dsRunNormal.* |
| keyInstaller | Change state to dsInstaller.* |
| keySaveUserSched | Change state to dsSaveUserSched |
| keyGetUserSched | Change state to dsGetUserSched |
| keyGetFactoySched | Change state to dsGetFactorySched |

*One may set the share.statual.bypassTime and share.statual.daysLeftKeypadHoliday to 0.

Thermostat 11 control algorithm may provide for control of 15 various kinds of commercial HVAC equipment. More specifically it may be designed to control constant volume packaged roof top units used for single zone space temperature conditioning. A provision may also be provided to reduce humidity in the zone if it exceeds a high limit. Configuration parameters may allow for the control to be for single stage, multistage or modulating heating and cooling in conventional or heat pump units. The control is capable of automatically switching between heating and cooling as required if AUTO is selected as the run mode. The fan and an auxiliary output may also be controlled depending on configuration choices.

Figure 24:
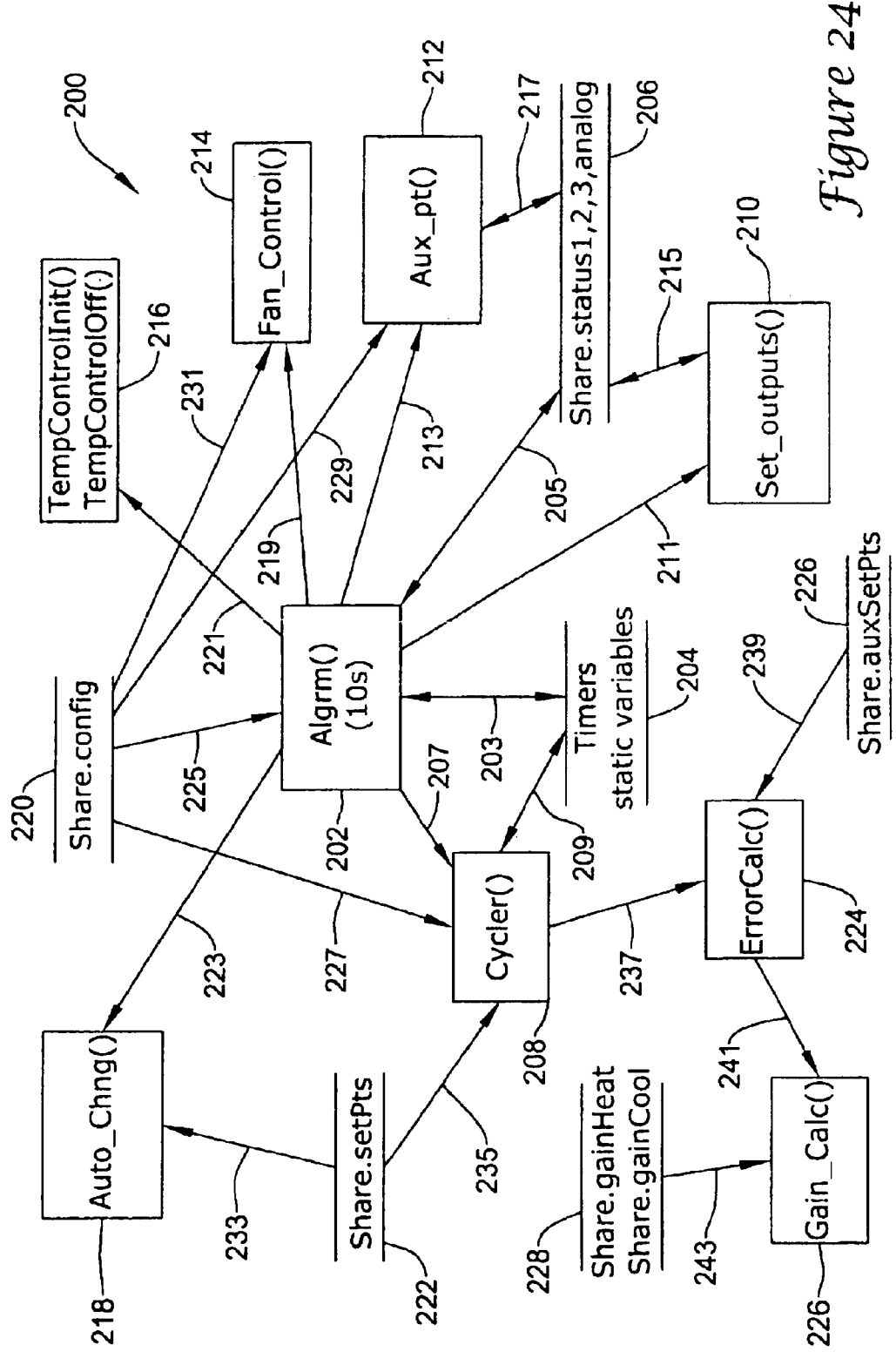
FIG. 24 shows an overview of an algorithm mode relative to the thermostat.

FIG. 24 shows an algorithm module 200 overview. Algrm( ) function 202 may be connected to timers and static variables memory 204 via a two-way data path 203, and connected to a share.status 1, 2, 3, analog memory 206 via a two-way data path 205. Algrm( ) function 202 may be connected to a Cycler( ) function 208 via a one-way data path 207 towards Cycler( ) function 208. Cycler( ) function 208 may be connected to timers and static variables via a two-way data path 209. Algrm( ) function 202 may be connected to a Setoutputs( ) function 210 via a one-way data path 211 towards Set_outputs( ) function 210. Algrm( ) function 202 may be connected to an Aux_pt( ) function 212 via a one-way data path 213 towards Aux_pt( ) function 212. Share.status 1, 2, 3, analog memory 206 may be connected to Set_outputs( ) function 210 via a two-way data path 215, and connected to Aux_pt( ) function 212 via a two-way data path 217.

Algrm( ) function 202 may be connected to TempControlInit( ) and TempControlOff( ) functions 216 via a one-way data path 221 towards functions 216. Algrm( ) function 202 may be connected to an Auto_chng( ) function 218 via a one-way data path 223 towards function 218. Share.config memory 220 may be connected to Algrm( ) function 202 via a one-way data path 225 towards function 202. Share.config memory 220 may be connected to Cycler( ) function 208 with a one-way path 227 towards function 208. Share.config memory 220 may be connected to Aux_pt( ) function 212 via a one-way data path 229 towards function 212. Share.config memory 220 may be connected to Fan_Control( ) function 214 via a one-way data path 231 towards function 214.

Share.setPts memory 222 may be connected to Auto_chng( ) function 218 via a one-way data path 233 towards function 218. Share.setpts memory 222 may be connected to Cycler( ) function 208 via a data path 235 towards function 208.

Cycler( ) function 208 may be connected to an Error Calc( ) function 224 via a one-way data path 237 towards function 224. A Share.auxSetPts memory 226 may be connected to Error Calc( ) function 224 via a one-way data path 239 towards function 224. Error Cal( ) function 224 may be connected to a Gain_Calc( ) function 226 via a one-way data path 239 towards function 226. A Share.gainHeat and Share.gainCool memory 228 may be connected to Gain_Calc( ) function 226 via a one-data data path 243 towards function 226.

Algrm( ) function 202 may be called every 10 seconds from the operating system task scheduler. It may read the commanded system mode and space temperature sensor input to arbitrate the effective run mode of thermostat 11. Also, the configuration may be read to determine which control features to perform and the resultant "logical" control commands which are generated and written to the status RAM (random access memory) variables. The commands may be logical in that they generically list the run mode (heat or cool) and the number of stages of heat and cool that should be active. A separate function called from the task manager may be responsible for reading the logical control output commands from status RAM and driving the physical outputs appropriately based on sub-base type and output configuration.

Looking further at the Algrm( ) 202 function overview, one may note that if the manual mode command is factory test or manual, or the manual mode command is run and the system mode command is system switch=off, or the space sensor is invalid, then the logical control outputs may be set to initialization values and no other action is taken. If the manual mode command is run and the system mode command is system switch=heat or cool, then Cycler( ) function 208 may be called with the effective mode set accordingly so that the proper set points may be used to calculate the space temperature error and its sign. If the manual mode command is run and the system mode command is system switch=auto, then Auto_chng( ) function 218 may be called to calculate the proper effective mode (heat or cool) and thus the proper set points before Cycler( ) function 208 is called. After Cycler( ) 208 runs, then Set_outputs( ) function 210 may be called to take the Cycler( ) function 208 output and, based on the configuration, set the control status variables appropriately. Likewise, based on the configuration and the Cycler( ) function 208 output status, the Fan_Control( ) function 214 and the Aux_pt( ) function 212 may be called to set their logical output values per the control scheme selected. All the timers associated with the control algorithm may be kept in this function. These may be the four stage timers (one per possible stage), the interstage timer, the start-up fan delay timer and the dehumidify flag timer. When the disable delay ("test mode") is selected, all of the control algorithm timers that delay action may be kept cleared.

Figure 25A:
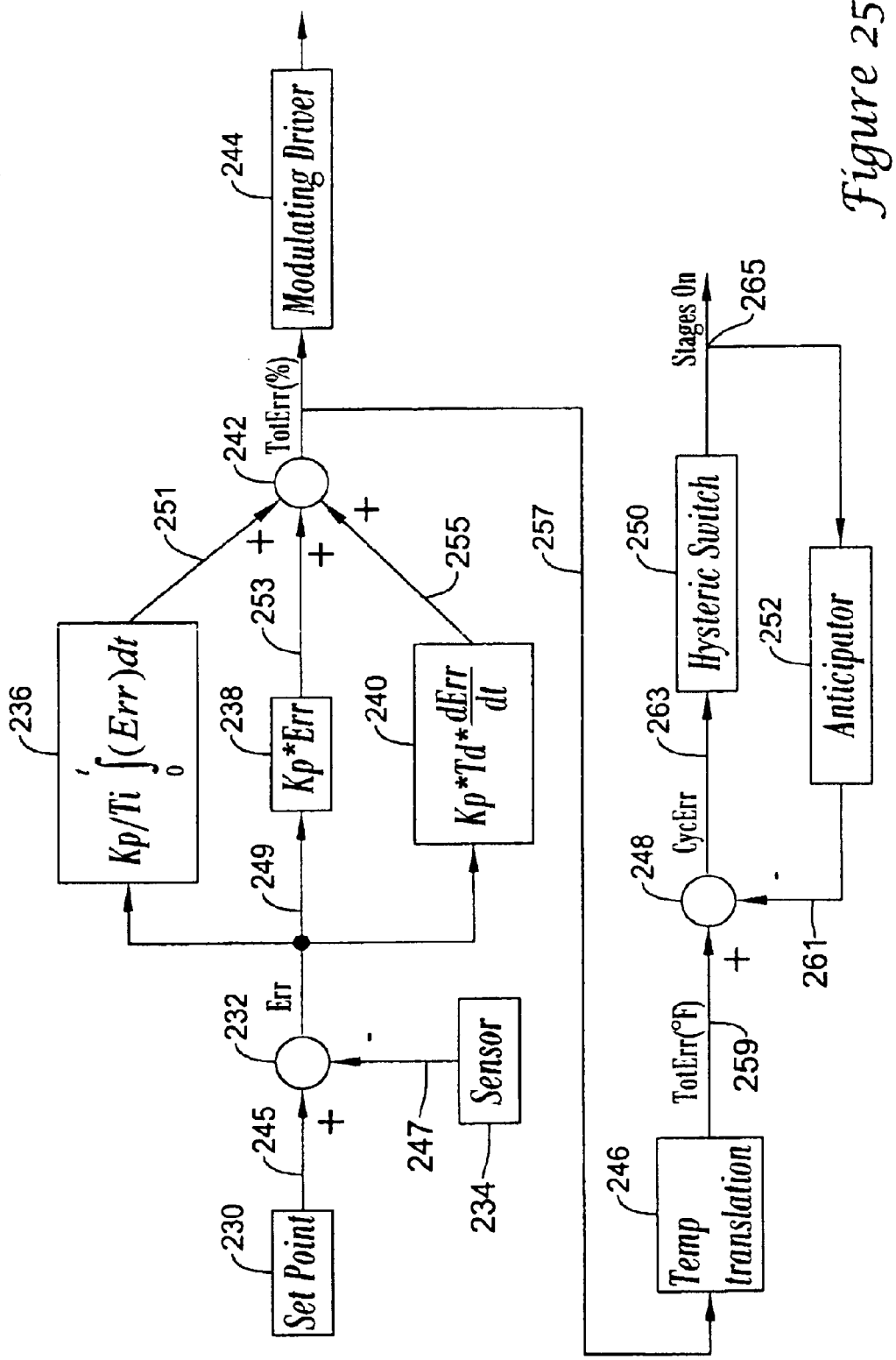
FIGS. 25a and 25b show details of a function in the algorithm shown in FIG. 24.

Cycler( ) function 208 may be implemented in the control block diagram of FIG. 25a. An output 245 from a set point 230 may go to a junction 232. An output 247 from a sensor 234 may go to junction 232. Output 247 may be subtracted from output 245 at junction 232 to result in an error signal output (Err) 249 which may go to the inputs of a "Kp/Ti$_0$ ∫ (Err)dt" function block 236, a "Kp*Err" function block 238 and a "Kp*Td*(dErr/dt)" function block 240. Outputs 251, 253 and 255 from function blocks 236, 238 and 240, respectively, may be added at junction 242 to result in a total error (TotErr(%)) output 257 in terms of percentage. Output 257 may go to a modulating driver 244.

Output 257 may go also to an input of a temperature translation block 246. Block 246 may convert the total error signal 257 from percent to a total error (TotErr(° F.)) output signal 259 in degrees Fahrenheit. Signal 259 may go to junction 248. In junction 248, a feedback signal 261 may be subtracted from signal 259 resulting in a cycler error (CycErr) signal 263 which may enter an input of a hysteretic switch block 250. Block 250 may output a "stages on" signal 265. Signal 265 may go to an anticipator function block 252. Block 252 may output feedback signal 261.

The temperature translation step may perform the function of TotErr(° F.)=TotErr(%)/100*AntAuth*stages. The purpose of temperature translation 246 may be to turn the PID (proportional integral differential) error in percent, which is used to drive modulating outputs if they are present, into PID error in degrees F which is the classic input into the multistage Cycler. This error in degrees F. Can now be added to the anticipator 252 accumulator, which is also tracked in degrees F. Now when the Cycler Error (CycErr) 263 which is the PID Error plus the anticipator 252 is fed into the hysteretic switch 250, the classic cycling behavior of a thermostat may occur. Built into this conversion may be the selected anticipator authority (default of 4 degrees F. per stage). The cycle rate constants that are selected as part of the configuration are calculated for the default anticipator authority (4 degrees F. per stage) only. Under most circumstances the anticipator authority will not be changed, but under special circumstances changing the anticipator authority may result in different cycling rates than listed in the selections.

The anticipator function 252 may be Antic=Antic+(stgs*AntAuth-Antic)*(1-e$^{\sqrt{Tch}}$). It may provide for automatic cycling by including a fictitious temperature error based on the current number of stages active as follows: stgs=current stages active set by the algorithm; AntAuth=anticipator authority (heat per stage in deg F); T$_{cph}$=time constant calculated to provide configured (cph) cycles per hr equipment cycling rate; and t=time between calls of the Cycler( ) function 208.

Cycler( ) function 208 may call Error Calc( ) 224 to obtain the total PID error in percent, which may be limited to +/−200%. It then may convert the percentage into degrees F. by dividing by 100 percent and multiplying by 4 degrees F. per configured stage. The total error in degrees F. may then be combined with the standard anticipator 252 action before putting it through a multistage hysteretic relay 250 function which drives the stage logic.

Figure 25B:
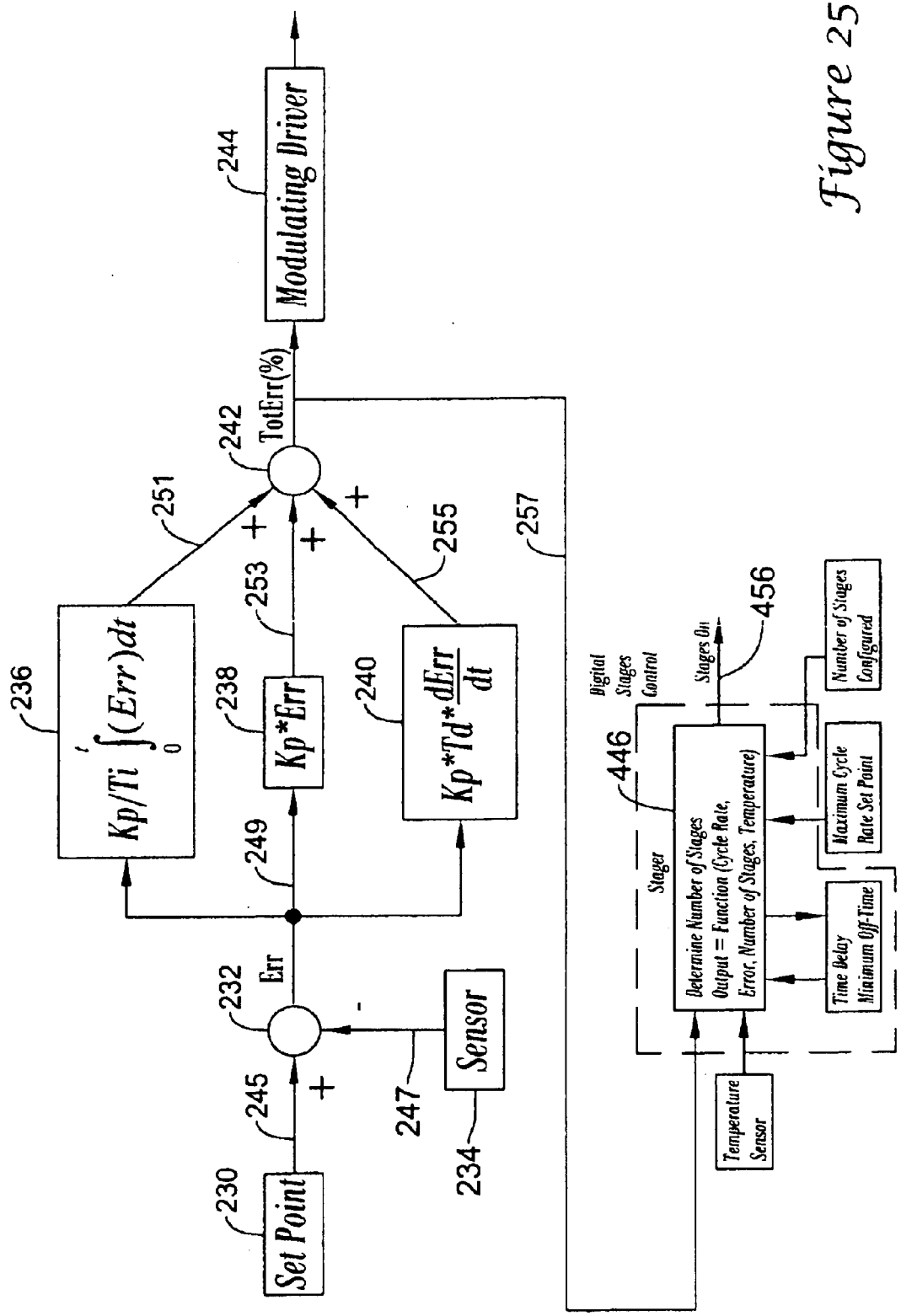

In FIG. 25b, output 257 may also go to an input of a stager block 446. Stager block 446 may convert and proportionally adjust the cycling rate for the digital stages, and control the number of stages requested based on the configuration of cycle rate, the number of stages configured, sensed temperature, time delay minimum time and total error. Output 465 of block 446 may provide a "stages on" signal for the individual heating and cooling stages.

Along with the hysteretic relay output and/or minimum on time, minimum off time and interstage delay times may also be enforced before a stage is added or subtracted from the stages active command that is the output of this function. This function also may set the status of the dehumidify flag (dehumidActive). It may use both a minimum on timer and a 5 percent hysteresis for turning off the flag once it is set.

If the sensed humidity is above the programmed high limit the flag may be set. Only after the humidity is 5 percent below the high limit set point for the min on time will the flag be reset. The minimum on time may also be variable based on the occupancy mode when the high humidity set point reset strategy is configured. If the high humidity set point reset strategy is configured, and the current occupancy mode is unoccupied, the dehumidActive flag min on time may be 20 minutes; at all other times it may be set to 5 minutes.

The Error Calc( ) function 224 may call the Gain_calc( ) 226 to convert the gain configuration parameters into the proper units and fixed point offset to be directly used in the PID error calculation. It then may calculate the base PID error as TotErr 257 in percent. This may be used to drive the modulating output if it is configured. The secondary function performed may be the discharge air limit function. If the discharge air limit function is active then if the discharge air is within 5 degrees F. of the limit the TotErr is reduced proportionally down to 0 as it approaches the limit. If the discharge temperature is over the limit, TotErr is set to 0, integration is stopped and a flag is set to enable Cycler( ) 208 to turn off a stage and prevent other stages from coming on.

Thermostat 11 may communicate with an external device 56 and an optional communicating sub-base 14. External device 56 could be a personal digital assistant (PDA) 12, factory tester, or a PC-based development tool. Only one external device might be connected at a time. Sub-base 14 in turn may communicate with other devices via a digital data network. It may be possible to have an external device 56 and communicating sub-base 14 connected at the same time. There may be no need to communicate directly between sub-base 14 and external device 56. There may be coordination of the communications flow from sub-base 14 to thermostat 11 and from external device 56 to thermostat 11.

Figure 26:
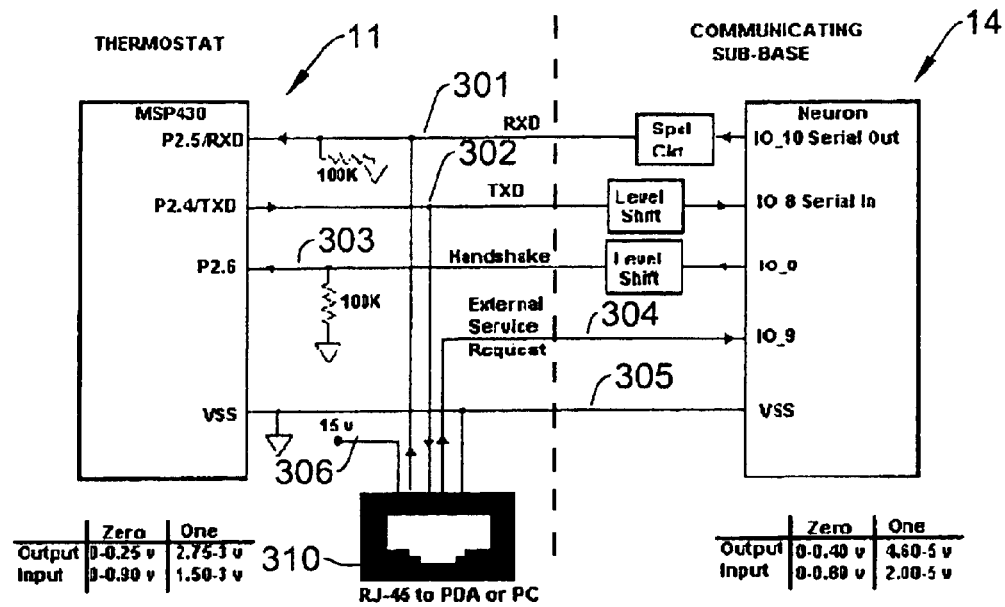
FIGS. 26 and 27 reveal the various connections between the thermostat, sub-base and an external device such as a PDA.
Figure 27:
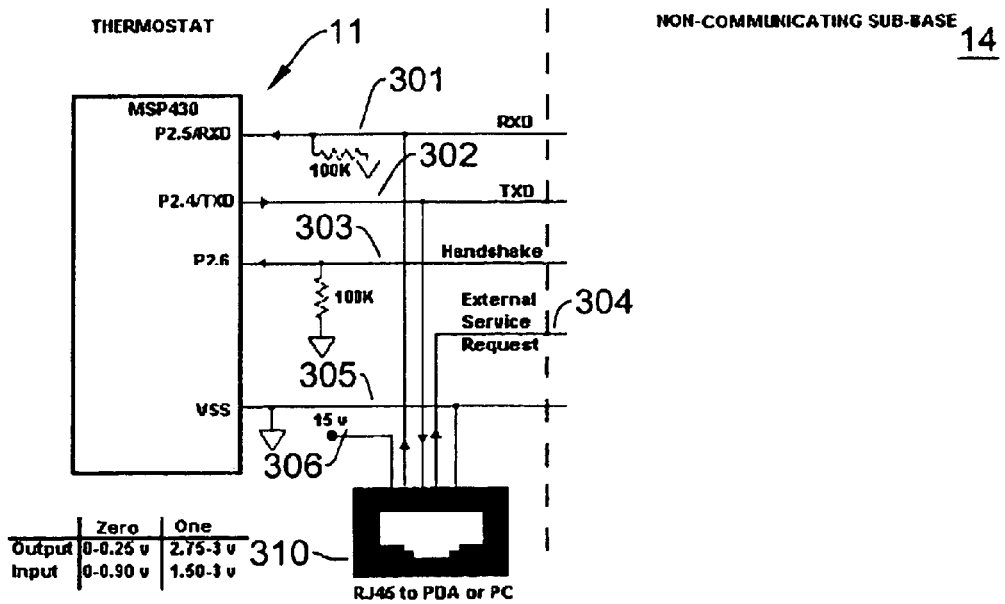

One object of the interface is to share information between thermostat 11 and the external device (PDA) or between thermostat 11 and a communicating sub-base 14 using a simple low cost protocol. Communications between sub-base 14 or external device 56, and thermostat 11 may be typically via an asynchronous five wire connection. FIGS. 26 and 27 reveal similar connections. The connections between external device 56 and thermostat 11 may include an input to receive data (i.e., data flowing from the sub-base or external device to the thermostat) on line 301, an output to transmit data (i.e., data flowing to the external device or sub-base from the thermostat) on line 302, an input to handshake (i.e., used to tell the thermostat that it is acceptable to send data to the external device) on line 303, and a pass through connection for an external service request (i.e., used by the PDA to request access to the receive data) on line 304. The latter connection may be between external device 56 and communicating sub-base 14, and only pass through thermostat 11. Another connection may be a circuit ground on line 305. A 15 volt supply line 306 may be present. Lines 301, 302, 304 and 305 may be connected to external device 56 via a connector 310.

Information may be passed between thermostat 14 and external device 56 using asynchronous characters having one start bit, eight data bits, no parity bit and one stop bit. The start bit is a logic 0 input (0 volts) at the common hardware interface. The stop bit is a "logic 1" input (3 volts). The baud rate may be 4800 baud.

Data may be sent in both directions at the same time (a full-duplex operation). Thermostat 11 may receive data at any time. There may be thermostat transmitter flow control via handshake circuit. Generally, data may be sent from thermostat 11 only when the handshake input is asserted. Communicating sub-base 14 may control the flow of data to it. External device 56 may send and receive at the same time. When external device 108 56 requests service by asserting an external service request, communicating sub-base 14 may assert a handshake line 303 so that the data may be sent continuously by thermostat 11. If sub-base 14 is non-communicating, handshake line 303 may be asserted continuously, so that an external device 56 may send and receive data at the same time. FIGS. 26 and 27 show a communicating sub-base 14 and a non-communicating sub-base which is blanked out to indication non-functionality.

Thermostat 11 may receive flow control via an external service request circuit line 304. Either communicating sub-base 14 or external device 56 may send data to thermostat 11 at any time. However, both typically do not send data at the same time. The external service request circuit via line 304 may be used to select the active sender on the thermostat 11 receive circuit.

When the external service request is not asserted, communicating sub-base 14 may be allowed to communicate with thermostat 11 in both directions, using the handshake circuit via line 303 to control data flow from thermostat 11 to sub-base 14. When external device 56 asserts external service request (using the RTS circuit on the external device's port) via line 304, communicating sub-base 14 may be allowed to complete the message it is currently transmitting, before it asserts handshake line 303 and ceases communications with thermostat 11. External device 56 then may communicate with thermostat 11 in both directions until external device 56 unasserts the external service request. Note that sub-base 14 typically does not listen to transmit data while external service request is asserted since handshake is also asserted. When sub-base 14 is a non-communicating sub-base, then external device 56 may still assert an external service request, and wait for at least one message time before sending on the thermostat 11 receive circuit via line 301.

The handshake input to thermostat 11 microprocessor 61 may control whether or not thermostat 11 sends information to external device 56. When sub-base 14 is a non-communicating sub-base, the handshake input may be pulled to "active" by a resistor on thermostat 11. Thermostat 11 may send information continuously on TXD of line 302, one message after another with the required gap between messages. When sub-base 14 is a communicating sub-base, the handshake input may be set to active by sub-base 14 whenever it is able to receive a message. Thermostat 11 may send information on TXD line 302 whenever the handshake input is active.

When a communicating sub-base 14 is connected, then sub-base 14 may periodically send the sub-base variable to thermostat 11, with sub-base.connected=1. An external device 56 may never send sub-base 14 to thermostat 11. This flag may let an external device 56 know that a communicating sub-base 14 is present.

The in Use (i.e., in use) variable may be used to indicate that an "in Use session" with an external device, a remote network tool or network work station is in progress. The inuse.by may also be used to initiate programming flash memory. An "in Use session" may involve any of the following: an external device (Palm Personal Digital Assistant)–inUse.by=2; a read/write thermostat configuration using a PDA; a read/write schedule using a PDA; a status report via a PDA (optional at the discretion of the PDA designer); and manual control via a PDA.

An "inUse session" may be started by either the external device or the communicating sub-base when the other device (i.e., a sub-base or external device) could interfere with a process begun by the first device. The external device may have priority over the sub-base. If a sub-base has initiated an "inUse session", the external device may cancel the sub-base session and initiate its own session. If an external device has already established an "inUse session", the sub-base (and its associated network tool) may not be allowed to start an "in Use session".

The external device located next to the thermostat should have priority over a network tool that may be located in another room or even hundreds of miles away. Some related "inUse Session" scenarios may or may not involve some of the following examples. For instance, it may not be necessary for the external device to start an "inUse session" to just read any variables. It may not be necessary for the sub-base to start an "inUse session" just to read any variables or write sub-base, comSchedOcc, comTimeIn, sysMode, or comIn. All of these variables may be either overhead variables (sub-base) or connected to some other network variables that may be bound to other devices.

It may be necessary for the external device to start an "inUse session" to read the varCONFIG variables, allow a user to modify them, write them to the thermostat, and then monitor their effects. That any time the PDA is connected to the thermostat, and the PDA is actively performing the Honeywell Palm software, it should start an "inUse session" and set manMode to 0. The external device may start an "inUse session" by writing inUse.by=2. Table 38 may provide more "inUse session details.

TABLE 38

| inUse.by | Meaning | Communicating sub-base | External Device |
|---|---|---|---|
| 0 | Not in an "inUse session" | May send any variables to the thermostat. | Variables may not be sent to the thermostat except for inUse. |
| 1 | The remote network is in an "inUse session" with the thermostat via the communicating sub-base | May send any variables to the thermostat. Note: When nvInUse (a network variable) is updated to non-zero by a network tool, and inUse is 0, then the sub-base writes, inUse.by = 1. | Variables may not be sent to the thermostat except for inUse. |
| 2 | The external device (such as a PDA) is in an "inUse session" with thermostat | May send only varWRITE class variables to the thermostat (except manMode and inUse). Note: The sub-base sets nvInUse (an e-bus mechanism variable) to 64129 when it sees that inUse.by is 2 to prevent a network tool from attempting to put the thermostat into manual mode or commission the device. | May send any variables to the thermostat. |
| 3 | The flash programmer is requesting to reprogram the thermostat firmware | When the external device is the re-programmer, the sub-base may not send or receive any thing. The sub-base may reprogram the thermostat using the re-programmer protocol. | External device uses the re-programmer protocol to download load the memory image. When the sub-base is reprogramming the thermostat, the external device should be disconnected or disabled. |

Table 39 provides variable information relating to the alarm error system.

TABLE 39

| Variable Description and Notes | VarNamefields.txt |
|---|---|
| User Schedule Check Sum Error. Calculated when the user tries to retrieve the user schedule 0: User schedule was retrieved successfully 1: User schedule was not retrieved successfully | alarmError.aimUsrScdCkSum |
| Configuration Parameter Check Sum Error. Calculated when mains power is restored or upon a reset 0: Configuration Parameters were retrieved successfully from non-volatile memory. 1: Configuration Parameters were not retrieved successfully from non-volatile memory. The factory default configuration parameters are being used instead. | alarmError.aimCntPrmCkSum |
| Sub-base type error. Read from the sub-base resistive voltage divider in the sub-base 0: The sub-base is a valid sub-base type 1: The sub-base is not a valid sub-base type | alarmError.aimSub-baseType |
| Output configuration error. Considers sub-base type, heat pump/conventional application. maxCoolStgs, maxHeatStgs. 0: The outputs configuration is consistent with the sub-base type selected 1: The number of outputs configured exceeds the capability of the sub-base to support them. | alarmError.aimIOConfig |
| Discharge sensor out of range or disconnected. 0: Sensor value is OK. 1: Sensor is configured to function and is out of range or disconnected, | alarmError.errDischSensr |
| Remote wall module set point is out of range or disconnected. 0: Value is OK. 1: Remote wall module set point is configured to function and is out of range or disconnected. | alarmError.errRemtSetPt |
| Network Outdoor air sensor not working. 0: SensorValue is OK. 1: Sensor is configured to function but is not being updated by the network. | alarmError.errNetOdSensr |
| Remote Outdoor air sensor not working. 0: Sensor value is OK. 1: Sensor is configured to function and is out of range or disconnected. | alarmError.errOdSensr |
| Network Humidity sensor not working. 0: Sensor value is OK. 1: Sensor is configured to function but is not being updated by the network. | alarmError.errNetHumSensr |
| Remote Humidity sensor not working. 0: Sensor value is OK. 1: Sensor is configured to function and is out of range or disconnected. | alarmError.errRemlHumSensr |
| Local Humidity sensor not working. 0: Sensor value is OK 1: Sensor is configured to function and is out of range or disconnected. | alarmError.errLoclHum.Sensr |
| Network space temperature sensor not working. 0: Sensor value is OK. 1: Sensor is configured to function but is not being updated by the network | alarmError.errNetSpaceSensr |
| Remote space temperature sensor not working. 0: Sensor value is OK. 1: Sensor is configured to function and is out of range or disconnected. | alarmError.errRemtSpaceSensr |
| Local space temperature sensor not working. | alarmError.errLoclSpaceSensr |

TABLE 39-continued

| Variable Description and Notes | VarNamefields.txt |
|---|---|
| 0: Sensor value is OK. | |
| 1: Sensor is configured to function and is out of range or disconnected. | |

The thermostat configuration may be identified and then the commissioning process may be run through valid operational modes with inputs and set points temporarily manipulated while waiting for the delays built into the controller to verify operation. The PDA based Online Diagnostics may automatically discover the thermostat configuration, turn off normal controller delays, temporarily override sensor inputs and set points, verify proper output action including monitoring the discharge air temperature for the resulting temperature behavior based on the equipment stages activated.

Figures 28A, 28B, 28C, 29A, 29B, 29C:
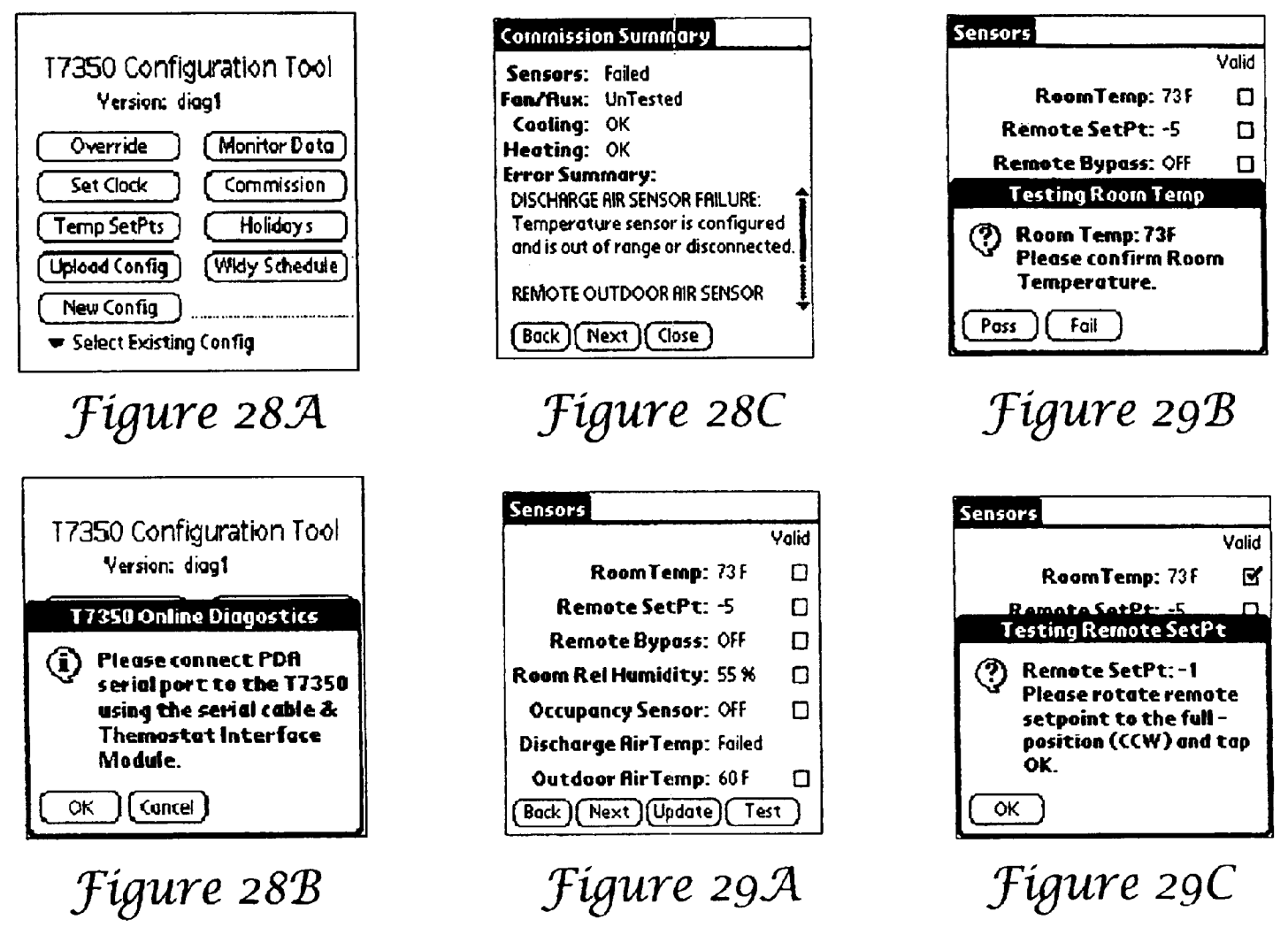

Problems discovered may be reported, automatically recorded and the original operating parameters may be restored. This means that less expertise may be required by the technicians sent to install and trouble shoot thermostat installations To begin the commissioning startup, the user may tap on the commission button on a PDA screen as shown in FIG. 28a. The next screen may prompt the user to connect the PDA 12 serial port to thermostat 11, as in FIG. 28b. Then the configuration tool (i.e., PDA 12) may upload the thermostat model and current configuration from the thermostat. A commission summary screen appears as revealed in FIG. 28c. This screen may appear after an analysis of the thermostat configuration. Navigation through the commissioning process by the user may be accomplished with the "Back" and "Next" buttons. The diagnostics may be executed in a logical order of sensors, fan/auxiliary process, cooling process and heating process. The status of each step of the diagnostics process may be reported as "OK", "UnTested" or "Failed". An error summary may report known problems (via thermostat diagnostic messages) and summarize all session related messages.

The "Next" button may navigate the user to the sensors screens shown in FIGS. 29a–29f. In FIG. 29a, the sensors screen may summarize the status of sensor/input diagnostics. Sensor data may be displayed in a context sensitive format using the actual thermostat model and configuration data to mask irrelevant sensor tests. Of the buttons on the screen, the "Update" button may update sensor data values, "Back" button may navigate to the previous screen, "Next" button may navigate to the "Fan" screen, and the "Test" button may initiates the automatic sensor diagnostics test sequence.

Figures 29D, 29E, 29F, 30, 31A, 31B:
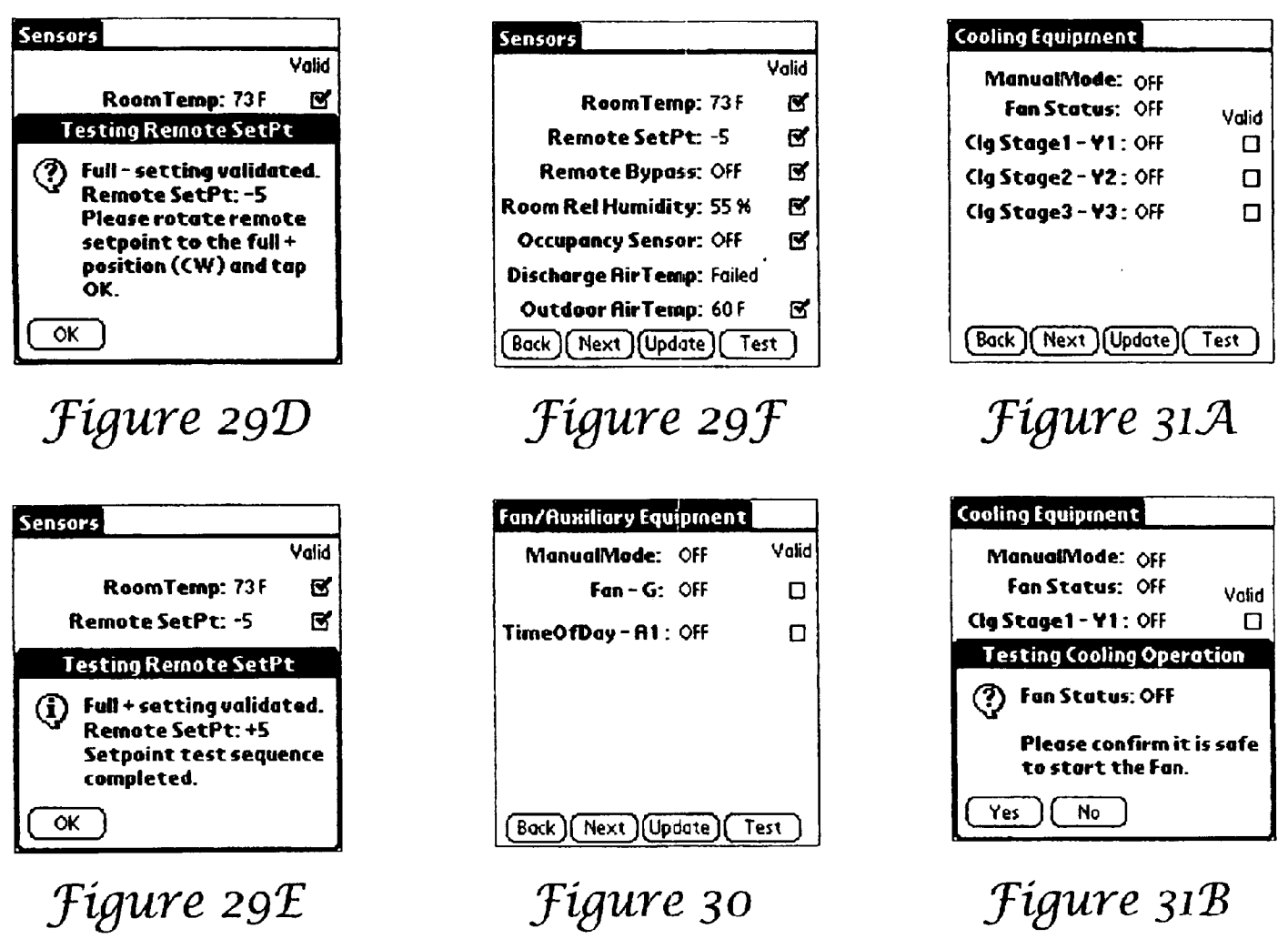

As a result of tapping the Test button on the sensors screen, one may get a reading testing the room temperature data value which may be confirmed or not by tapping the "Pass" or "Fail" button on the screen of FIG. 29b, respectively. As a result of tapping the "Testing Room Temp" Pass button, the diagnostics may move to the remote SetPoint test sequence, which begins with the screen in FIG. 29c. The user may tap the "OK" button after positioning the remote SetPoint knob to the full CCW position. As a result of tapping the Testing Remote SetPt OK button, the diagnostics tool may validate the Remote SetPt value at full CCW, as indicated in the screen of FIG. 29d. Then one may be instructed to position the remote SetPoint knob to the full CW position. As result of tapping the Testing Remote SetPt OK button, the diagnostics tool may validate the Remote SetPt value at full CW. Then the user may tap the OK button in the screen of FIG. 29e to proceed with remaining sensor diagnostics. In a similar fashion, all of the sensor inputs may be validated. At the end of the sensor diagnostics sequence, configuration tool 12 may indicate the status of all relevant (hardware model and user configuration) sensors, as in the screen of FIG. 29f. All Error messages may be recorded on the diagnostics summary screen.

The user may tap the Next button to navigate to the Fan/Auxiliary screen of FIG. 30. The Fan/Auxiliary Equipment screen may summarize the status of the Fan/Aux output diagnostics. Output data may be displayed in a context sensitive format using the actual thermostat model and configuration data to mask irrelevant output tests. Tapping the Update button may update the data values. The Back button may navigate the user to the previous screen. The Test button may initiate the automatic Fan/Aux diagnostics test sequence. The Next button may navigate the user to the first cooling screen in FIG. 31a.

Figure 31C:
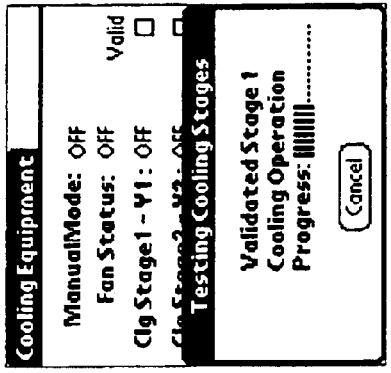
Figure 31D:
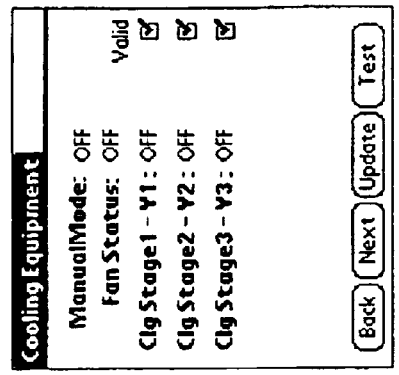
Figure 31E:
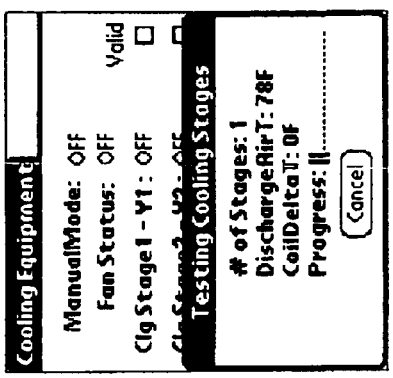
Figure 31F:
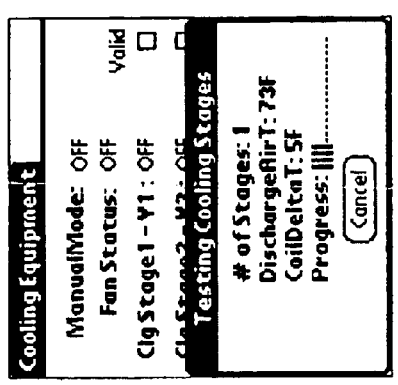
Figure 31G:
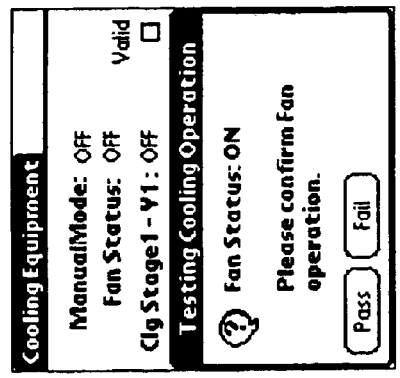
Figure 31H:
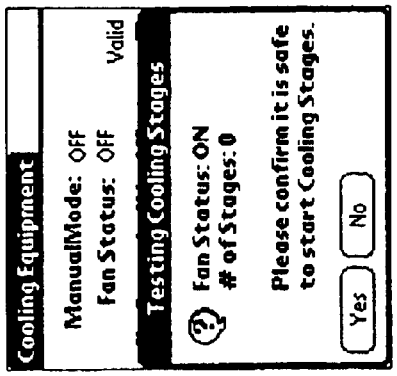

The Cooling Equipment screen may summarize the status of the cooling output diagnostics. Output data may be displayed in a context sensitive format using the actual thermostat model and configuration data to mask irrelevant output tests. In this screen the Update button may update data values, the Back button may navigate to the previous screen, the test button may initiate the automatic Cooling diagnostics test sequence. The Next button may navigate the user to the Heating screen. In FIG. 31b, the screen asks whether it is safe to start the fan. And if so, then the Yes button may be tapped and a screen of FIG. 31c may appear. The user may tap the Test button on this screen and confirm that the fan is running by tapping the Pass button. The next screen to appear may be that of FIG. 31d, asking if it is safe to start the cooling stages. The user may tap "Yes" to confirm that it is safe to start the cooling stages. The screens of FIGS. 31e and 31f may appear, respectively. Here, configuration tool 12 may collect and analyze data. The data collected may include the time interval on the progress line, the entry and discharge air temperatures over the time interval and the cooling coil delta temperature which may be the difference between the coil entering and discharge air temperatures. After this process, tool 12 may validate the cooling stage under test as in the screen of FIG. 31g. All of the remaining stages may be likewise checked out. FIG. 31h shows a completion of the cooling equipment validation.

Tapping the Next button, one may get the Heating Equipment screen of FIG. 32a, which may begin with the checkout of the heating stage 1. The Heating Equipment screen may summarize the status of heating output diagnostics. Output data may be displayed in a context sensitive format using the actual 20 thermostat model and configuration data to mask irrelevant output tests. On this screen, the Update button may update data values, the Back button may navigate the user to the previous screen, and the Next button may navigate to the summary screen. The Test button may initiate the automatic heating diagnostics test sequence, which may start with the screen in FIG. 32b. The user may tap "No" to indicate that fan airflow is not required for stage 1 heating. Such airflow may be typical for baseboard heat installations. The next screen may be that in FIG. 32c asking whether it is safe to activate the heating stage contact. The user may tap "Yes" to confirm that activation. That heating stage may be turned on, which is indicated by the screen of FIG. 32d. After checking to see in the heating stage is actually on, the user may then tap "Pass" to validate the stage 1 heating. A screen of FIG. 32e may next appear indicating that the heating tests have been completed. Wiring and connections between the controls and fan, heating, cooling, air flow process, interfaces and other items may be tested and validated.

Figure 33:
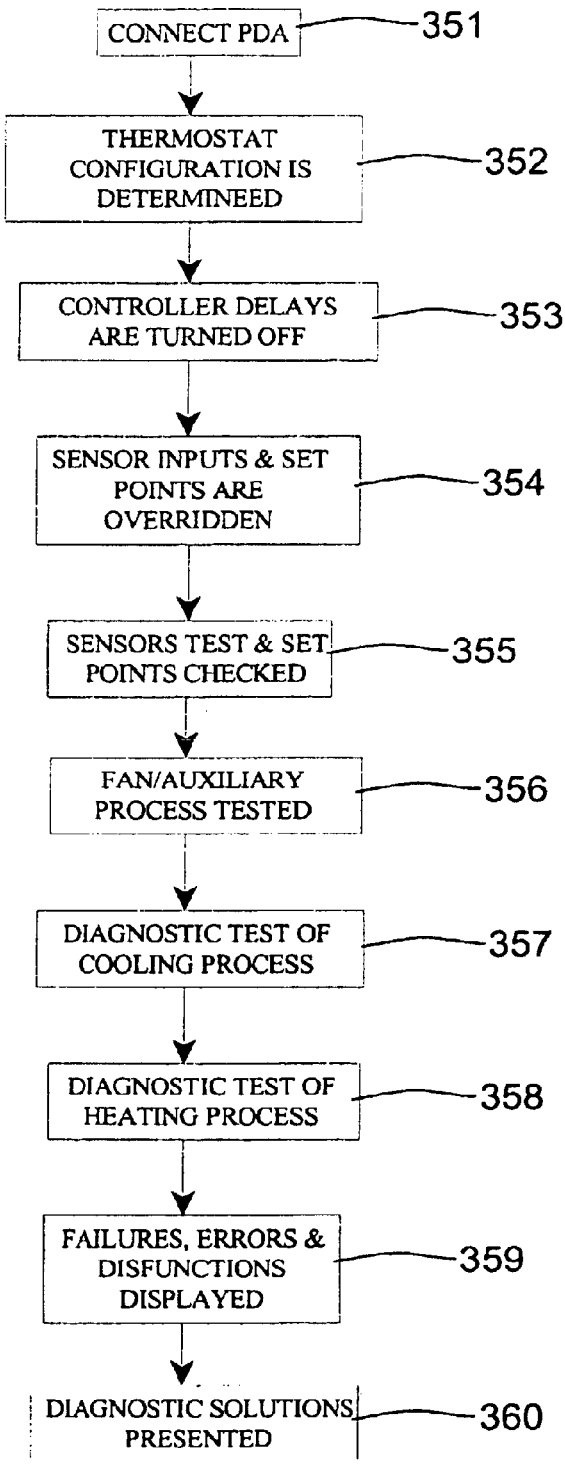
FIG. 33 is a flow diagram of an illustrative diagnostic test sequence for a thermostat system.

FIG. 33 is a flow diagram of an illustrative diagnostic test sequence for a thermostat system. In block 351, one may connect PDA 12 to thermostat 11 and upload the configuration identification as in block 352. The normal controller delays may be turned off as in block 353. Block 354 shows the sensor inputs and set points being overridden. Then the sensors may be tested and the set points checked in block 355. The fan/auxiliary process may be tested in block 356. The cooling process may be tested in block 357 and the heating process may be tested in block 358. Then the noted failures, errors and dysfunctions of thermostat 11 may be displayed on PDA 12 as in block 359. In block 360, diagnostic solutions may be presented.

Although the invention has been described with respect to at least one illustrative embodiment, many variations and modifications will become apparent to those skilled in the art upon reading the present specification. It is therefore the intention that the appended claims be interpreted as broadly as possible in view of the prior art to include all such variations and modifications.

What is claimed is:

1. A method for verification of operation of an air management controller system having a thermostat, comprising:
   connecting a personal digital assistant to the thermostat;
   uploading configuration information from the thermostat to the personal digital assistant;
   executing diagnostics relative to sensors, fan process, cooling process and heating process, with the personal digital assistant;
   reporting results of the diagnostics as OK, untested or failed for the sensor, the fan process, the cooling process and the heating process;
   turning off normal controller delays; and
   temporarily overriding sensor inputs and set points; and
   wherein the turning off the normal controller delays and temporarily overriding sensor inputs and set points are performed prior to executing the diagnostics.

2. The method of claim 1, wherein executing the diagnostics relative to the sensors comprises:
   confirming a room temperature data value;
   validating a remote set point value;
   confirming a room relative humidity value.

3. The method of claim 2, wherein executing the diagnostics relative to the cooling process comprises:
   confirming that a fan is running;
   validating the cooling process; and
   validating cooling equipment of the cooling process.

4. The method of claim 3, wherein executing the diagnostics relative to the heating process comprises confirming activation of a heating stage.

5. The method of claim 3, wherein connecting the personal digital assistant to the thermostat is performed with a wireless medium.

6. A method for verification of operation of an air management controller system having a thermostat, comprising:
   connecting a personal digital assistant to the thermostat;
   uploading configuration information from the thermostat to the personal digital assistant;
   executing diagnostics relative to sensors, fan process, cooling process and/or heating process, with the personal digital assistant;
   reporting results of the diagnostics as OK, untested or failed for the sensor, the fan process, the cooling process and the heating process;
   turning off normal controller delays; and
   temporarily overriding sensor inputs and set points; and
   wherein the turning off the normal controller delays and temporarily overriding sensor inputs and set points are performed prior to executing the diagnostics.

7. An apparatus for diagnosis of a thermostat system, comprising:
   a personal digital assistant (PDA) connected to a thermostat of the thermostat system; and
   a program in a memory for diagnosis of the thermostat system;
   wherein:
   the PDA performs the following tasks;
   uploading a thermostat configuration;
   disabling delays of functions in the thermostat system;
   overriding sensor inputs and set points; and
   tasting sensors, a cooling process and a heating process.

8. The apparatus of claim 7, wherein testing sensors comprises:
   confirmation of temperature values as indicated by the thermostat; and
   validation of set points.

9. The apparatus of claim 8, wherein the testing of sensors further comprises validation of relative humidity values as indicated by the thermostat.

10. The apparatus of claim 9, wherein the testing of the cooling process comprises:
    initiating a cooling test;
    confirming a running of a cooling fan;
    collecting data on time intervals, cooling coil temperatures and discharge air temperatures; and
    determining from the data whether the cooling process is satisfactory or not.

11. The apparatus of claim 10, wherein the testing of the heating process comprises:
    initiating a heating test;
    selecting a type of heating;
    confirming a running of the fan if needed for a selected type of heating;
    activating a heating stage; and
    validating an output of heat from the heating stage.

12. The apparatus of claim 11, wherein the PDA is connected to the thermostat via an infrared connection.

13. A method for testing a thermostat system via a personal digital assistant (PDA) comprising:
    uploading configuration information about the thermostat system to the PDA;
    turning off controller delays;
    overriding sensor inputs and set point;
    testing sensors, fan, and cooling and heating equipment; and;
    reporting the working status of the sensors, fan, and cooling and heating equipment.

14. The method of claim 13, wherein the testing of the sensors comprises:
    validating indications of temperature sensors in various locations;
    validating values of temperature set points for a sample of set point settings;
    validating temperature set points for at least one setting; and
    validating indications of at least one humidity sensor.

15. The method of claim 14, wherein the testing of the fan comprises:

turning on the fan via the PDA;
verifying that the fan is on;
turning off the fan via the PDA; and
verifying that the fan is off.

16. The method of clam 15, wherein the testing of the cooling equipment comprises;

turning on the fan via the PDA;
confirming operation of the fan;
turning on the cooling equipment via the PDA;
collecting time and temperature data about the cooling equipment; and
determining whether operation of the cooling equipment is adequate.

17. The method of claim 16, wherein the testing of the heating equipment comprises:

making a determination whether the fan is to be operating or not, and effecting a fan operational status according to the determination;
turning on the heating equipment;
collecting time and temperature data about the heating equipment; and
determining whether operation of the heating equipment is adequate.

18. The method of claim 17, further comprising displaying a report of the testing of the sensors, set points, fan, cooling equipment and heating equipment.

19. The method of claim 18, further comprising restoring original operating parameters to the thermostat system.

20. The method of claim 19, wherein the PDA is connected to the thermostat system via a wireless medium.

* * * * *